United States Patent
Seitz et al.

(10) Patent No.: US 6,246,831 B1
(45) Date of Patent: Jun. 12, 2001

(54) FLUID HEATING CONTROL SYSTEM

(75) Inventors: David E. Seitz, Conroe; David Paul Sharp; Thomas Lamson Harman, both of Houston; Louis J. Everett, College Station; Rodney H. Neumann, The Woodlands, all of TX (US)

(73) Assignee: David Seitz, Houston, TX (US)

( * ) Notice: Subject to any disclaimer, the term of this patent is extended or adjusted under 35 U.S.C. 154(b) by 0 days.

(21) Appl. No.: 09/334,337

(22) Filed: Jun. 16, 1999

(51) Int. Cl.$^7$ ........................................ F24H 1/10
(52) U.S. Cl. .................... 392/486; 219/497; 219/483; 392/466
(58) Field of Search .................. 392/465, 466, 392/479, 480, 481, 484, 485, 486, 487, 488, 489; 219/483, 497

(56) References Cited

U.S. PATENT DOCUMENTS

| | | | |
|---|---|---|---|
| 3,175,075 | * 3/1965 | Nord et al. ........................... | 392/484 |
| 3,909,588 | 9/1975 | Walker et al. . | |
| 4,031,352 | * 6/1977 | Oosterberg ........................... | 219/497 |
| 4,320,285 | * 3/1982 | Koether ................................ | 219/497 |
| 4,337,388 | 6/1982 | July . | |
| 4,638,147 | 1/1987 | Dytch et al. . | |
| 4,829,159 | 5/1989 | Braun et al. . | |
| 4,920,252 | 4/1990 | Yoshino . | |
| 5,128,517 | * 7/1992 | Bailey et al. ........................ | 219/497 |
| 5,216,743 | 6/1993 | Seitz . | |
| 5,479,558 | 12/1995 | White et al. . | |
| 5,504,306 | 4/1996 | Russel et al. . | |
| 5,710,408 | * 1/1998 | Jones ................................... | 219/497 |
| 5,763,858 | * 6/1998 | Jones ................................... | 219/497 |
| 5,789,723 | * 8/1998 | Hirst ................................... | 219/497 |
| 5,811,764 | * 9/1998 | Hirst ................................... | 219/497 |
| 5,866,880 | 2/1999 | Seitz et al. . | |
| 5,928,546 | * 7/1999 | Kramer et al. ....................... | 219/497 |
| 6,047,108 | * 4/2000 | Sword et al. ........................ | 392/466 |
| 6,080,971 | * 6/2000 | Seitz et al. ......................... | 392/485 |

\* cited by examiner

Primary Examiner—Teresa Walberg
Assistant Examiner—Fadi H. Dahbour
(74) Attorney, Agent, or Firm—Browning Bushman

(57) ABSTRACT

An improved system, method and apparatus for control of an instantaneous flow-through fluid heater system is disclosed. The control incorporates a logic control method providing modulation of power in small steps to a plurality of heating elements retaining responsiveness to closed-loop control needs without inducing light flicker. Further, the life of the coils of heating circuit electromechanical relays are extended by energizing the coils with a pulse-width-modulated drive decreasing in duty cycle and thus the latent coil heat when an increase in mains voltage is sensed. The life of the contacts of same relays are extended by inhibiting heating element triac drive immediately upon sensing loss of relay coil power, such as by an over temperature limit switch opening, thus ensuring that relay contacts open with zero heating element current. In addition to the software "watch-dog timer" internal to the microcontroller, a redundant fail-safe circuit external to the microcontroller prevents a program lockup condition from leaving any heating element triac or relay drive in an energized state. A combination of control hardware and program provide self-diagnostic detection of an inoperative thermistor, stuck relay, or a failed triac or heating element. An improved means of sensing water level is disclosed incorporating a low-level, high frequency signal, allowing detection of non-conducting distilled water and the reliable detection of water in the presence of main-frequency currents as would exist in ungrounded sheathed heating elements with electrical leakage or as would exist with bare-elements.

29 Claims, 59 Drawing Sheets

Visual Indicator

SSTAT3

| CHANNEL SCAN SEQUENCE | MUX VALUE |
|---|---|
| 0 → | 000 00 |
| 1 | 001 00 |
| 2 | 010 00 |
| 3 | 011 00 |
| 4 | 100 00 |
| 5 | 101 00 |
| 0 → | 000 01 |
| 1 | 001 01 |
| 2 | 010 01 |
| 3 | 011 01 |
| 4 | 100 01 |
| 6 | 110 01 |
| 0 → | 000 10 |
| 1 | 001 10 |
| 2 | 010 10 |
| 3 | 011 10 |
| 4 | 100 10 |
| 7 | 111 10 |

Fig. 26I

A / D STATE MACHINE
RAM VARIABLE USED

| Variable | Description |
|---|---|
| SSTATE | Value 0 .. 8, holds SSS machine next state |
| DATA8 | Data sent to A / D Converter for command |
| COUNTER | General purpose loop counter |
| OUTDATA24 | 24 bit data written to A / D converter |
| INDATA24 | 24 bit data read from A / D converter |
| MUX | 5 bits used to select A / D channel |
| STALL | Timeout counter for A / D Converter response |
| CALOFF | Calibration offset |
| BUTTON | Used as individual flags [ expand from src code ] |
| GLOBAL | Used as individual flags [ expand from src code ] |
| POINTER | Called fsr in listing |
| CONFIG | Used as individual flags [ expand from src code ] |
| TPOT | 0 - 255 value of setpoint pot |
| MOIST | Digitized reading from moisture sensor |
| SOUND | Flags for audible annunciator [ expand from src code ] |
| VOLTS | Digitized reading from mains voltage tap |

EEPROM VARIABLE USED

| | |
|---|---|
| POT_MULTIPLIER | |
| CONFIG | |
| CALIBR [0] ... CALIBR [4] | Calibration Offsets |

Fig. 26r

FLUID HEATING CONTROL SYSTEM

FIELD OF THE INVENTION

The present invention generally relates to the controls for a flow-through heating apparatus for the instantaneous heating of fluids, and more particularly relates to an improved control which may include an optimized power modulation algorithm, a method for low power standby control, a method of extending the operating life of heating circuit electromechanical relays, a redundant fail-safe circuit, a self-diagnostic capability with audible-visual annunciator, and an improved method of sensing water level.

BACKGROUND OF THE INVENTION

U.S. Pat. No. 3,909,588 issued to Walker et al. discloses an electric fluid heater using electrodes immersed in an electrically-insulated flow-through tank with controls sensing both fluid temperature and heating electrode current.

U.S. Pat. No. 4,337,388 issued to July discloses a rapid-response water heating and delivery system incorporating water heating means, water temperature sensing means, and proportional integral derivative (PID) method of closed loop control.

U.S. Pat. No. 4,638,147 issued to Dytch et al. discloses a microprocessor controlled flow-through water heater regulating heating power by switching combinations of heating elements of different wattages.

U.S. Pat. No. 4,829,159 issued to Braun et al. discloses a method of switching electrical heating elements loads to reduce switching transients by energizing all loads neither switched off nor full on in sequence.

U.S. Pat. No. 4,920,252 issued to Yoshino discloses a temperature control method for a plurality of heating elements by allocating a required actuating time within one cycle of a predetermined length of time.

U.S. Pat. No. 5,216,743 issued to Seitz discloses a thermoplastic heat exchanger for a flow-through instantaneous fluid heater including a control system using temperature comparisons.

U.S. Pat. No. 5,479,558 issued to White, Jr. et al. discloses a flow-through tankless water heater with a flow-responsive control means.

U.S. Pat. No. 5,504,306 issued to Russell et al. discloses a tankless water heater system incorporating a microprocessor based control sensing water outlet temperature, accepting an option remote temperature-setting means and providing control of heating elements by applying power in fractions of a power line cycle.

U.S. Pat. No. 5,866,880 issued to Seitz et al. discloses using a plurality of heating elements wherein each of the elements receives a substantially equal amount of power and the delay between each element being powered is no more than 32 half cycles.

Electric flow-through fluid heaters, which are often described as electric tankless fluid heaters, heat fluids as they pass through the heat exchanger. The objective of such heaters is to heat fluid as it enters and passes through the heat exchanger to the desired setpoint by the time it is dispensed at the outlet of the heater. In concept, this process is relatively simple to achieve in closed loop systems in which the operating parameters for flow and temperature can be predetermined.

In this type of application, control of the heater may theoretically be accomplished with standard Proportional Derivative Control (PID) algorithms. Additionally, since many applications are commercial or industrial, one is conventionally not limited by the lack of availability of sufficient electrical service for these applications.

In residential water heating, however, one is presented with an entirely different set of conditions. The process of heating fluids in a flow-through heater can be quite dynamic and requires very responsive and precise control of temperature—not only for the user's comfort but also for safety. Over the years, many efforts have been made to design the "perfect" residential "flow-through" or "tankless" water heater. These efforts have been plagued with a myriad of problems relating to the use of conventional flow detection devices that were unreliable and often failed early due to exposure to highly diverse and aggressive water conditions. A number of other problems arise in fluid heaters as described hereinbelow.

Problem 1. The standard method of temperature control in a fluid heater attempts to regulate the output temperature of the fluid, Tout, based on a reference temperature. In many cases, the reference input is a constant temperature called the setpoint, Tsp. In a single-input (inlet fluid at temperature Tin), single-output (outlet fluid) system, the heater attempts to maintain the temperature of the output fluid equal to the setpoint, or Tout=Tsp. In a heater application, it is assumed that Tin is less than Tout. Flow measurement can provide "feed forward" information to facilitate control. Conventional flow measurement devices such as turbines are expensive and can be adversely affected by water conditions. The classical feedback method of achieving this regulation is to first measure the outlet temperature and compute an error as the difference ERROR=(Tsp−Tout). Using some control scheme, such as PID (Proportional Integral Derivative) the system attempts to reduce the error to zero so that ERROR=0 for steady-state fluid flow.

Several problems plague standard control schemes when they are applied for temperature control of fluid in a tank. First, there is a delay between the application of heat and the sensing of a change in temperature in the fluid. Secondly, such systems are typically very sensitive to changes in the components of the system or the presence of noise in the measurements of temperature, causing errors in the measurement of the temperatures that are used by the system. For example, if accurately calibrated thermistors are used initially to measure temperatures, they can change characteristics with age causing the measurements to be in error. Finally, because of system lag time, these systems are generally not effective in controlling the outlet fluid temperature in the presence of disturbances, such as a rapid change in fluid flow rate.

Problem 2. The Seitz et al U.S. Pat. No. 5,216,743 addressed the use of temperature differential to detect flow/no flow conditions and developed a means for not only detecting these conditions but also monitoring temperature gradients by periodically heating the water to maintain low-energy use in standby conditions. A major drawback of Seitz et al's teaching is in the selection of temperature sensing devices, i.e. thermistors. Seitz et al refer to the use of commodity-type thermistors which inherently vary greatly in their resistance one to another and therefore the resulting temperature measurements vary. The result of this variation impacts the temperature measurements which are used to provide responsive control of shutdown of power at "no flow," as well as start up "in flow," and the ability to establish the small temperature gradients necessary for maintaining the standby condition.

Even when the fluid temperature is the same in the heater, the resulting temperature reading obtained from these types of thermistors can differ one to another, for example, by as much as 5 degrees Fahrenheit or more. In most tankless water heaters, differential temperatures measured between two thermistors are used for temperature regulation. Because of the variations in characteristics, such as resistance versus temperature, between one thermistor and another, an inaccurate difference in temperature readings generally exists. In order to compensate for these variations, the control parameters usually include temperature thresholds for temperature measurements. These temperature thresholds are often required to be much greater than desirable. These higher thresholds, coupled with the difference in characteristics between the thermistors, result in widely different performance between one fluid heater and another. In a heater where the deviation in accurate temperature measurement between thermistors is small, the shutdown is more precise and faster, thereby reducing temperature overshoot at shutdown. The response to flow conditions is also shorter, thereby avoiding an obvious delay in providing initial hot water. The energy required to maintain smaller temperature gradients in standby is also reduced.

When the heater's thermistors resistance and resulting temperature measurements vary substantially, as will often be the case with commodity type thermistors, the reverse is true. Then the heater's response to shutdown is longer overheating the water, and the response to flow is longer delaying the start of fluid heating thus delaying the delivery of initial hot water. In standby conditions, the heater will be maintaining an artificial higher threshold to maintain the required temperature gradient and thus be using more energy to heat the water.

One partial solution to these problems might be to individually and manually attempt to match the thermistors with nearly identical characteristics. This cost of this process reduces the benefits in cost of using commodity-type thermistors, particularly in large volumes. Another approach would be to use high-quality thermistors whose characteristics have very close manufacturing tolerances, but these types of thermistors can be quite costly.

Problem 3. Most patented technology directed to control methods for activating the heating elements for flow-through water heaters teach some form of modulation of power to the heating elements. For whole house "flow-through" fluid-heating applications, large wattage heating elements, i.e., 5,500–7,000 watts, are required.

During conditions of variation in fluid flow rate, it is not at all unusual for the modulation of power to a plurality of large wattage elements to vary by 5–10%. These variations in power are inherent in flow-through residential water heaters. In such applications, pressure changes are frequent, particularly in rural homes where water is supplied by a private water well. In the private water well system, as the pressure in the pressure tank drops, the water pump starts in and increases the pressure to maintain the desired water pressure. The desired water pressure is manually set by setting the pressure switch points in the water system's pressure regulator. Changes in pressure as the water pump is cycling result in changes in the flow rate of the water. The changes in water flow cause the flow-through water heater's control system to modulate the power to the heating elements, in wide swings, attempting to track the demand required by the flow changes. In many cases, the home will be served by an older or undersized electric power transformer. The addition of the modulated water-heating load will result in significant variations in line voltage. These types of electric power conditions are quite common in older homes, rural homes, and manufactured housing.

As power to the heating elements is modulated, the voltage variations occur at frequencies that are particularly disturbing, causing "flicker" in the lighting circuits. U.S. Pat. No. 4,829,159 to Braun recognizes the importance of reducing flicker. A method is disclosed for controlling maximum power drawn by the total number of activated heating elements in an oven by independently varying the duty cycles of each individual element. The heating elements are differently sized, with some heating elements being of a much higher wattage than other heating elements. Braun uses different wattage heating elements and "gently" turns related heating elements "on" and "off" within time periods that would not perform in a satisfactory manner for a flow-through water heater application. In order to minimize flicker, the heating elements are controlled to obtain sequential activation (current consumption) of each of a plurality of heating elements independently of one another in an interlinked fashion such that when one load (heating element) is switched off, the next load (heating element of a different wattage) is switched on. Braun uses elements of different wattages and individually differs the duty cycle of each, so that he can obtain an average desired power level while maintaining interlinking of loads during the switching of power to such loads.

Seitz et al in U.S. Pat. No. 5,866,880 teach flicker control through a unique "power sharing" method of control. Seitz' control system adds substantially the same amount of power sequentially to each element by activating a first heating element and then a second within not more than 32 half cycles. Seitz teaches that the switching load from the modulation of a plurality of heating elements should be limited to the maximum coincident load added or removed from the fluid heater's total load. This coincident load is limited to the incremental load change resulting from an individual heating element's power being sequentially added or removed at a single ac half cycle, to or from the total existing load of all the elements.

Problem 4. In fluid heating systems, it is desirable to minimize energy usage during a "standby" condition when there is no fluid flow. This requires accurate temperature measurement. In a flow-through heater, the ability to detect changes in temperature typically requires several seconds. This is because of the time constants for thermistor response combined with delays in other system components. This is particularly true when one is using commodity type thermistors such as the type offered by General Automotive number 25502 as used by Seitz et al and referred to in U.S. Pat. No. 5,216,743. As described in Problem 2 hereinabove, thermistor characteristics, one thermistor to another, vary substantially for these and most thermistors.

Seitz et al's U.S. Pat. No. 5,216,743 teaches a method for maintaining a temperature gradient to be used to control the energy consumed during "standby" conditions. Unless the control method takes into consideration the need to pulse energy in very small increments over a period of several seconds to allow the system to actually begin to detect and respond to very small, i.e. one (1) degree temperature changes, it would be inherent for the control system to require higher differential temperature thresholds. These higher temperature thresholds require the heater control to add more energy than is needed, heating the water to a higher temperature than is necessary. Since the rate of loss of temperature through the heat exchanger increases as the fluid is heated higher in relationship to the ambient temperature of its environment, it would be desirable to precisely maintain small temperature thresholds. Furthermore, without the ability to maintain such small temperature differences, small drips from the hot water fixture will require the heater to cycle more often and will result in larger and unnecessary energy consumption.

Problem 5. Most commercially available fluid heaters have few diagnostic features. The user finds out he has a problem only after the heater has failed and that's usually at the most inopportune time. In worse cases, heaters are located in areas such as the attic or other location not easily inspected by the user. If the heater or its related plumbing starts to leak, the user may not know about it until substantial water damage has occurred. When a thermostat or other temperature-measuring device fails in a flow-through fluid heater, conventional systems depend on over temperature devices (high limit thermostats) to disengage power to the elements. In a high wattage flow-through heaters, the fluid may reach very dangerous levels within a shorter period of time than the response time for most of these high limit temperature devices. It is for this very reason that pressure relief valves are required in most storage tank heaters. Even so, there unfortunately are many serious injuries each year caused by fluid heaters that have ruptured as a result of an over temperature condition caused by failed temperature and pressure sensing devices.

Problem 6. Level detection circuitry has been used to verify that there is a safe level of fluid within the heat exchanger. Seitz et al in U.S. Pat. No. 5,216,743 disclose level detect circuitry that operates by conducting a small amount of current through the water at the ac line frequency. If water is at the proper level, a conductive sensor in fluid contact will deliver current through the water to a ground source also in fluid contact. This approach is particularly dependent for its reliability on the impedance of the water. Since the impedance of water varies greatly throughout the world, this approach is inherently subject to occasional unreliability. Furthermore, an electric heating element, adjacent to the water level probe, may have a corroded sheath causing electrical leakage into the water. Such a circuit may erroneously indicate insufficient water level because in an electrical flow-through water heater, electrical current from the leaky element to ground will register as a small voltage on the probe. The ac voltage will be sensed, rectified and, if it is above the water level detection threshold, i.e., of 2.2 volts, will cause the heater to shutdown due to an erroneous water level detection fault.

Problem 7. Residential water heaters are manufactured to operate at a predetermined range of set-point temperatures. Generally one can manually adjust the temperature set point. Given the diversity of hot water applications within a home or business there is a need for the user to be able to remotely adjust the set-point temperature.

Problem 8. Any flow-through water heater having sufficient power to take care of the requirements for a whole house in areas in which the ambient water can drop as low as 40 degrees Fahrenheit requires available power to provide a minimum input of 75,000 btu. An electric water heater with a capacity of at least 22,000 watts or 22 kW is required. The possible current demand from a 22 kW electric heater operating at 240 volts is approximately 92 amperes. Many homes built within the last 10 years, do not have more than 125 amperes service available to the house. Under National Electric Code Article 220-31, a method is provided to calculate the total load requirements for adding load to an existing dwelling. Such a water heater's load can be calculated at a demand factor of 40% by virtue of diversity of use and reduces the water heater's load requirements for load calculations. Nevertheless in areas where there exist large air conditioning or electric space heating loads in homes, it is very unlikely to be able to install a 22 kW heater in a home without increasing the electrical service to the home. Upgrading a homes electrical service is an expensive process and has eliminated a large section of the existing residential retrofit market for such high wattage electric flow heaters.

Other Problems. Another consideration for residential hot water use is the fact that the limitation in quantity of useable hot water from a storage tank heater in itself governs how long a family member may stay in the shower using hot water. When a flow-through water heater of sufficient capacity is used, however, the only limitation on hot water availability is its maximum flow rate capability. Given this fact it would be very desirable to be able to limit remotely and by personal code the actual time allocated to various family members for a single show.

Because water heaters are, as previously mentioned, often times located in attics or other remote locations, it would not only be desirable to have self diagnostic features in the water heater but also the ability to remotely be advised of a fault or failure.

The disadvantages of the prior art are overcome by the present invention.

SUMMARY OF INVENTION

The present invention provides a system, method and apparatus for heating a flowing fluid. The fluid may be heated to a desired temperature as the fluid flows through a plurality of heating chambers containing electric heating elements. The temperature of the outlet fluid is precisely controlled by a novel control method, embodied in the program of a microcontroller on the heater's circuit board. The heating chambers are sized to contain the heating elements and for adequate fluid flow therethrough. No excess fluid storage in the heating chambers is needed nor desired.

The temperature setpoint reference method incorporated in this invention allows very accurate control over a wide range of variation in inlet fluid temperature, flow rate, and changes in the system components that measure temperature. The heater's control program is thus more robust than previous fluid heaters in that this fluid heater has both good disturbance rejection and low sensitivity to errors in temperature measurement.

In the preferred embodiment, thermistors are used for measuring fluid temperature. It is particularly useful to use low-cost commodity type thermistors such as those used to monitor water temperatures in automobile engine blocks. The disadvantage in the past of the use of such thermistors is that there is often a significant deviation in the accuracy of one thermistor compared to another. For the present application, this deviation can represent as much as a 5 degree difference in the temperature value between thermistors measuring the same temperature. This difference does have a significant effect on the performance of a heater control system. This is particularly serious when the temperature relationship between different thermistors is used for control, emergency shut down, sensing flow/no flow conditions, and for maintaining temperature gradients in a standby condition.

A power modulator is used to apply power in half cycle intervals to the plurality of heating elements for responsive fluid heating while controlling AC power supply voltage variations which cause electric lights to flicker.

The invention further requires very little power in the standby condition with no fluid flow. This is due to the accurate measurement of temperatures within the heater and the method used to detect flow or no flow of the fluid.

The invention has self-diagnostic capability as well as emergency shutdown protection. A combination of hardware and software (program) of the embodiment of the invention provide self-diagnostic detection of an inoperative component such as for example, a temperature sensor, relay, triac, heating element, etc. An improved water-level sensing circuit is disclosed which utilizes a low-level, high-frequency signal that enables reliable flow detection in low-conductivity fluids and fluids in the presence of currents at the AC power supply frequency caused by electrical leakage from an ungrounded heating element sheath or a heating element electrode exposed to the fluid through a damaged sheath. The embodiment of the invention utilizes both a software "watchdog" timer, which is part of the microcontroller program, and a fully redundant emergency shutdown circuit. This circuit prevents a program lockup condition from leaving any heating element triac or relay coil energized, i.e., inadvertently applying undesired power to a heating element. Further, the relay contact life is extended by opening the relay contacts when there is substantially zero heating element current therethrough. This is accomplished by inhibiting heating element triac drive immediately upon sensing loss of relay coil power. A condition requiring the relays to be de-energized may be caused by an over-temperature limit switch opening, or other system malfunction or shutdown.

The system has a bidirectional serial port that can be used for communication with the microcontroller. There is standardized software such as a terminal emulator, or any standard ASCII communication software that will read a serial data stream. As the heater operates, the program makes its internal data available to external devices or modules. The ability to transmit back to the heater will allow commands to be sent to the heater program. In the preferred embodiment, these commands can be used for diagnostics, to change control parameters such as base temperature and setpoint span, or power thresholds for load shedding. Also, the serial port can be used for custom temperature recording, logging, kilowatt (KW) usage, and other actions. In addition, it is a feature of this invention that the serial communications information can be used to couple this fluid heating system to networks, other devices, displays, and controls to allow this fluid heater to act as a master or slave to a larger system of peripherals. It is contemplated and within the scope of the invention that any form of computer communications may be used such as for example but not limitation, Universal Serial Bus (USB), Ethernet, FireWire, infrared, fiber optics, and the like.

Multiple Chamber Temperature Regulation

One or more fluid chambers are contemplated, each fluid chamber having at least one heating element therein. Temperature sensors are also contemplated in each of the plurality of fluid chambers. Whenever a change in the flow rate of the fluid passing through the plurality of chambers occurs, the temperature of the fluid in each of the chambers may vary significantly from the steady-state temperature between chambers. A problem exists that if fluid temperature is only measured at the outlet of the last heating chamber, a significant temperature variation (too hot or too cold) may occur due to the slow response time of the heating system. An embodiment of the invention solves this undesirable temperature variation by determining a deviation from a calculated temperature setpoint compared to the value of the sum of temperatures measured in each chamber. When there is a deviation (plus or minus), the temperature controller receives temperature information sooner than it would if only the outlet temperature is referenced to a set point temperature. Thus, the controller may quickly respond to temperature changes and modify its calculation of the value of POWER being sent to the power modulator.

For example in the embodiments of the invention, a calculated setpoint may be determined by the formula:

$$CSP = A \times T_{rise} + B \times T_{in}$$

where CSP is the calculated setpoint, $T_{rise}$ is the temperature difference between the desired outlet temperature and the actual inlet temperature ($T_{in}$), A is a constant of 2.5 and B is a constant of 4 for a four chamber embodiment, or A is a constant of 1.5 and B is a constant of 2 for a two chamber embodiment. A deviation may be calculated by the formula:

$$\text{Deviation} = CSP - \Sigma T_n$$

where $T_n$ is the temperature in chamber n, with n=1, 2, 3, 4 for a four chamber embodiment and n=1,2 for a two chamber embodiment. When the Deviation is a positive value, a larger value for POWER may be needed; when the Deviation is a negative value, a smaller value for POWER may be needed; and when the Deviation is approximately a zero value, the calculated value for POWER may be just right.

Thermistor Matching and Calibration

In the embodiment of the invention, thermistors are used to measure the temperature of the inlet fluid and the temperature at various points in the heater. Thermistors are commercially available that are held to a given tolerance about some standard. Thermistors of the same material tend to have variation from unit to unit in offset but the shape of the temperature versus resistance curve does not vary much. For this reason, some amount of selection of like thermistors is possible that will result in matching the characteristics of the thermistors over the temperature range of interest. In the heater, it is desirable to have the thermistors measure closely the same as each other. One function of the heater is to develop a thermocline in one of the chambers. If the thermistor in the top of a chamber is several degrees in disagreement with the temperature measured by the thermistor in the bottom of the chamber, particularly if the top one reads low, developing a thermocline will be a problem. Mismatched thermistors also present a problem when trying to determine the amount of temperature rise due to an element.

Whether the thermistors are purchased with the required tolerance or whether they are tested after receipt and sorted by tolerance, the thermistors can be entered into the production process with known characteristics. While thermistors are available with sufficiently tight tolerances, it is desirable to be able to adjust for those thermistors that are out of bounds of the required tolerance. This is desirable because of aging of the thermistors, replacement of a bad thermistor with one from another production lot, or simply to allow for using wider tolerance parts in production. By running water at a constant temperature through the heater while the heating elements are disabled from applying power, each of the thermistors will attain substantially the same temperature, but perhaps with slight variations. The exact temperature of the water, measured by an accurate temperature measuring device, can then be used to correct the variations for use by the heaters control program. Those thermistors that read high can have a correction factor subtracted from their reading. Those thermistors that read low can have a correction factor added to their reading.

Power Modulator

In operation, the heater's microcontroller program calculates the required power to be delivered to the heating elements. In a preferred embodiment of the invention, power is controlled by a power modulator program running in the microcontroller. A power value from the control program represents a desired power value and is passed to the power modulator program. The desired power value will be referred to hereinafter as "POWER." An input signal to the microcontroller is developed that pulses upon each zero-crossing of the line frequency of the main voltage supply. The line frequency is nominally 50 Hz or 60 Hz so the signal is 100 Hz or 120 Hz. The power modulator program synchronizes to this input signal and switches power to the heating elements at the zero-crossings of the supply voltage waveform. Large instantaneous steps in power are a necessity when driving heating element loads that switch on or off on the zero crossing of the supply voltage waveform. For example, a 7,000 watt heating element that is switched on for one-half cycle is a 7,000 watt step in power, or at 240 volts a 29 ampere step in current. Because an electric supply voltage source impedance is not zero, the voltage from the source will be modulated as the load is modulated. The effect of modulating the source voltage may be apparent in other appliances that receive power from the same source, most particularly indoor lighting.

Where it is possible to minimize the voltage drop in the voltage source by improving the performance of the power transformer and reducing series resistance of the wiring that services the facility, the modulation of the voltage source will be minimized. The type of lighting is also a factor in the human perception of the modulation. In incandescent lights, the fineness of the filament is a factor. Both for flourescent and incandescent lighting, the voltage modulation is more visible if the voltage supply is below nominal. The closer the lighting is operating to its nominal voltage, the less visible will be the voltage modulation.

The power modulator technique described herein makes the best of the tradeoffs available. The amplitude and frequency of the modulation are both important factors in perceptible light flicker. However, the amplitude of the power steps to the heating elements is less controllable then the frequency (repetition) of the se steps since there are fewer options available. The frequency or repetition of these power modulation steps has more options.

From a human visual perspective, the rate at which the voltage to an electric lamp changes amplitude is what is noticeable. In a lamp, the 60 Hz sinewave voltage waveform gets transferred into light through the equivalent of an absolute value transfer function. Just like with full-wave rectification, the ripple frequency is at 120 Hz. Most people do not normally perceive a 120 Hz frequency. Frequency components added below 120 Hz, become more noticeable the lower they are, until they become very low in frequency. Thus, the high frequency modulation components in lighting preferable should be at the line frequency (50, 60 Hz) and double the line frequency (100, 120 Hz), or greater to avoid "flicker."

A feature of the present invention is the power modulator program that generates frequency components at the line frequency (and possibly harmonics thereof) or below 2 Hz.

An objective of the invention is that the power modulator preferably does not generate modulation frequencies between 2 Hz and the line frequency, thus annoying lamp flicker is not created during operation thereof. However, by not generating the mid-frequency components between 2 Hz and the line frequency, there is the spurious result of applying more odd half-cycles of the AC voltage to the heating elements, than even half-cycles, or vice versa. If the power modulator favored loading odd half-cycles more than even half-cycles, for instance, the source transformer would be affected by a direct current (DC) bias which causes an undesirable magnetization current in the transformer. It is best to operate the transformer in the middle of its B-H curve so that the transformer does not saturate. Otherwise, two undesirable side effects occur. One effect is the appearance of a power modulation component at ½ the line frequency that may cause annoying lamp flicker. The other effect is that a slight decrease in power transfer occurs when operating the transformer off the center of its B-H curve.

Another objective of the invention is that the power modulator program equalizes the DC bias by reversing the polarity of the load current waveform, thereby averaging out any DC component generated by operation of the power modulator.

In two preferred embodiments of the present invention, either two or four heating elements are used, one in each of two or four heating chambers, respectively. It is contemplated and within the scope of the invention that one or more heating elements may be used and contained in one or more heating chambers. The power modulation program produces various "modes" or "patterns" of power application that serve to cause the heating elements to be energized. These modes define the sequence for energizing the heating elements. Further, the power modulation modes of this invention produce no modulation frequency components below the line frequency or above 2 Hz, there are preferably 5 modulation modes for the two-element embodiment and 9 modulation modes for the four-element model (these modes also include zero power and full power). Another feature of the invention is supplying equal power to each of the heating elements (power sharing). Power sharing to the heating elements may also be performed by the power modulation program.

The frequency components produced by the above mentioned power modulation modes that are high frequency will be referred to hereinafter as "high frequency modes." To produce these different high frequency modes, each heating element may be switched on for an equal amount of time over the period of eight half-cycles (for the four-element model) and over a period of four half-cycles (for the two-element model).

The maximum power that the power modulator can deliver is a function of how many heating elements are utilized in the fluid heater and the wattage of each element. In the preferred embodiment, the elements are preferably each of the same wattage, though different wattage heating elements are contemplated and with the scope of the present invention. For purposes of example but not limitation, it is convenient to express power in terms of arbitrary units that are maximum of 30 counts per each heating element. The value that is passed to the power modulator, hereinafter called "POWER," is a value in counts that may range from 0 to 60 in the case of the two-element heater and can range from 0 to 120 in the case of the four-element heater. While the units for the variable POWER are arbitrary, it is convenient to use this range of numbers. If for example but not limitation, each of the heating elements has a capacity of 7,000 watts, there is approximately a one-to-one correspondence between the value POWER and the amount of amperes delivered since one count is for example, about 0.97 amperes at 240 volts.

A separate control program calculates a new value for POWER each ½ second and passes POWER to the power modulator program. If POWER ranges 0 to 60 and 0 to 120, respectively, for the two and four element embodiments, the control program can specify power to a resolution of 1.7% and 0.83%, respectively. The following description explains how the 25% resolution and 12.5% resolution (two and four heating elements, respectively) of the high frequency power modulator is used to provide the 1.7% and 0.83% resolution specified by POWER.

The power modulator program dithers between adjacent high frequency modes in order to deliver an average amount of power approaching the required POWER value. The power modulator program is able to resolve the power output to 15 times the high frequency power modulator's resolution when averaged over 7.5 seconds (15 half-seconds). Since 7.5 seconds is much shorter than a typical fluid heater system response time, this variation will not significantly cause a noticeable fluid temperature variation. Variations of up to 15 seconds are acceptable, although variations of 7.5 seconds or less are desirable. The power modulator program of the present invention then has resolution on the order of 1% which translates to about 1 degree Fahrenheit without introducing significant variation in the fluid temperature output.

Continuing with the example, the power modulator program is able to control the power modulator to produce an average power output to one part in sixty or one part in one-hundred-twenty for a two or four element system, respectively, as follows. First, the power modulator program determines which mode to repeat over the next ½ second period of time. Since the power value (POWER) calculated by the control program will usually not happen to be the exact amount of power delivered by one of the power modes, the power modulator program includes a means of computing the error. The error is defined as the difference between the desired power and the delivered power. The power modulator drives the error to zero by dithering between two modulation modes above and below the desired power level. By dithering between these two modes, the modulator delivers an amount of power that averages out to be equal to the POWER. Preferably up to 15 half-second periods, or 7.5 seconds, is used to resolve the power delivered by selection of the modes to be equal to the power dictated by POWER. The power modulator program performs the following steps, every ½ second, expressed in pseudo-code:

MODE=POWER DELIVERED
POWER DELIVERED=INTEGER[(POWER+REMAINDER)/15]
REMAINDER=(REMAINDER+POWER)−15*POWER DELIVERED

The above sequence of code executes each time a new value of POWER is provided from the control program. The MODE, or high frequency modulation sequence, will be POWER/15 since REMAINDER, at first, will be zero. So, for example, if POWER=60, then MODE=4 and if POWER=15, then MODE=1.

If POWER is not a multiple of 15, MODE will be the integer part of POWER/15; that is, the remainder of the division is truncated. This is where the value REMAINDER may be utilized to cause the MODE to dither to the next higher mode. The value REMAINDER accumulates the difference between the power desired, POWER, and the power delivered, which is 15 times MODE. This difference is the error value which indicates how much the power delivered was under or over the desired value. REMAINDER accumulates the error in such a way that it represents the power that 'remains' to be delivered and that is why it is added to the present POWER demanded.

While the above sequence determines a new value for MODE every half a second, the high frequency modulator is called every half-cycle of the line frequency. Assume a program named MODULATOR, for example, drives the heating element switches (triacs or thyristors) to cause a new element activation pattern each time it is called. Every half-cycle of the line-frequency the following steps can execute in the power modulator program:

CALL MODULATOR(MODE, PHASE)
PHASE=MODULO_8[PHASE+1]

The program MODULATOR generates the element drive sequence pattern given in the tables above. MODULATOR is passed two parameters, MODE and PHASE, which dictate the element switching sequence according to these tables. Since there are sixty half-cycles in one-half second, at 60 Hz, the modulator would only be able to complete 7.5 groups of 8 patterns. The power modulator program is designed instead to always permit the 8 phases to complete before running the part of the power modulator program that runs each ½ second.

An advantage of this method is that it may be implemented as a program in the microcontroller, it may and is preferably locked to the line frequency, is repeatable, and requires no adjustments. The power output resolution is fine, consistent and linear.

To one skilled in the art, an extrapolation of this technique into similar implementations can be performed. Examples have been shown for heater's with two elements and four elements. Other configurations utilizing one or more number of elements are derivable from the techniques shown. It is desired in the preferred embodiment of the invention to limit high-frequency components that are below the line frequency. To one skilled and taught the techniques disclosed herein, the allowance of a lower frequency component(s), say 40 Hz, will result in an increase in the number of allowed modes. These additional modes will be closer together, making the rough resolution less coarse. If the resolution is less coarse, it will take less time than the example above, using 7.5 seconds, to resolve the delivered power to the desired amount. In the preferred heating modes shown, the 7.5-second variation that could show up in output fluid temperature typically does not appear as a 'ripple' in the output temperature at the point of use. A reason is that 7.5 seconds is much shorter in time than a typical fluid heater system time constant. Another reason is that the amount of intermixing of fluid in each chamber and intermixing in the plumbing and plumbing thermal capacitance is sufficient to minimize any ripple in temperature that may be caused by a 7.5 second variation.

Diagnostics and Emergency Shutdown

The invention may incorporate a number of safety features including self-diagnostics and emergency shutdown circuits. The self-tests may occur periodically while the heater is operating. The frequency of the tests could range from every half-second, say for testing the thermnistors, to a month or more for components such as the Triacs.

Insufficient Heat From Element, Element Wattage Determination.

While the heater is running, a timer is preloaded anytime that power being delivered to the heating elements falls below some minimal predefined amount. Quarter power is a sufficient amount. Then the timer is decremented, when non-zero, at a fixed rate. If the timer is zero while power is applied, this condition is equivalent to power being continuously greater than quarter power for the amount of time preloaded into the timer. Twenty seconds is sufficient for a preload time value. To conserve microcontroller memory space, it is preferred to test one element at a time. At the same time that the timer is preloaded, an accumulator is cleared. Then the temperature rise, measured in the chamber corresponding to the element under test, is added to the accumulator at regular intervals. When the timer reaches zero, the accumulated value is compared against a threshold. If the element is not delivering sufficient heat to the water or the measured power is not correct, the accumulated value will be below that threshold. Other thresholds can be set, as well, to detect other anomalies or to determine what size elements are installed. The fact that there is an insufficient temperature-rise or incorrect power can be an indication of: an open element, unconnected wire, relay stuck open, fault in relay drive, faulty Triac or faulty Triac drive, or tripped circuit breaker on the power panel, corresponding to that element.

Relay Stuck Closed Test

While the fluid heater is in standby, and preferably after being in standby for a sufficient time that temperatures are close to ambient, the microcontroller's diagnostic program can determine that a relay has stuck (closed) contacts. In a heater in which the AC power supply is single phase, the control preferably provides two relays for each heating element. One relay is connected to one side of the supply line (L1) and a second relay is connected to the other supply line (L2). For the microcontroller program, relays connected to L1 are identified as one bank of relays and those connected to L2 as another bank of relays.

First, one and only one bank of relays is turned on. Then for each element, one at a time, the Triac is turned on for a short period of time. Full power for ½ the AC cycle time is a convenient and sufficient amount. The temperature measured by the appropriate thermistor, located in proximity to the element is compared before and several seconds after the Triac is turned on. A temperature rise indicates that the relay in the other bank must be closed. This test is repeated while turning on the other bank while the first bank is off. This way, each relay can be tested for being stuck closed. If a relay is found to be stuck closed, the heater could indicate that this fault was found by an aural or visual indicator to be described hereinbelow. Alternatively, the microcontroller could shutdown the heater if a fault occurs.

Triac Shorted Test

Similar to the stuck-relay test is the shorted Triac test. While the heater is in standby and no standby heat is being called for, the contacts of the relays of both relay banks are closed for ½ cycle. If a temperature rise is measured, this is an indication of a Triac being on unintentionally. While this test is performed, it is presumed that there is no flow of fluid in the heater so the heated fluid in a chamber will rise to the upper chamber thermistors. As in the stuck-relay test, only the upper thermistors are used in this test.

AC Voltage on a Heating Element Sheath

A probe in the water, close to each element can be useful in detecting that a heating element sheath is broken, allowing direct communication between the electrified element and the water. A high impedance amplifier connected to the probe will be generally shunted to ground through the water and produce no signal output. For example, if the sheath is broken, a current passing through the water to ground may produce a voltage drop in the water that can easily be detected by the amplifier. For this means to detect any bad element, a separate pickup probe is positioned between each element and the closest metallic ground placed in the water to that element. The same technique is very effective when the sheath itself is used as the probe.

Watchdog Circuit for Emergency Shutdown

The invention incorporates a so called "watchdog circuit" for emergency shutdown if the microcontroller fails during heater operation. The microcontroller latches the relay drive signal in a latch (tri-state D-type flip-flop) that has tri-state output capability. The outputs of the latch thus can be HIGH, LOW, or in a high-impedance state. Input to the latch integrated circuit chip is a signal that enables the latch output drive. When the latch output is not enabled, the latch output is in high impedance state. The output from the latch is incapable of turning on the relay drive transistor when it is in the high impedance state. The microcontroller outputs pulses under program control to turn on a relay. The pulses are coupled from the microcontroller to a transistor base through a capacitor. When a pulse is received through the capacitor by the transistor, the transistor collector circuit is pulled to ground potential due to the transistor momentarily switching on for the duration of the pulse from the microcontroller.

The fact that the signal is capacitively coupled presents the requirement that the signal from the microcontroller must be pulsed in order to turn the transistor on again. If the signal from the microcontroller freezes in the HIGH or LOW state, the transistor will go off and stay off. The transistor collector circuit drives the enable signal to the latch chip. The enable signal, being negative logic, must be held LOW to enable the latch output. A capacitor connected to the enable signal-line to ground serves to hold the enable signal LOW for several milliseconds after the transistor pulls the enable signal to ground potential. A resistor in this same circuit, pulls the enable signal HIGH and slowly charges the capacitor so that if the transistor does not keep the capacitor discharged, the enable signal will eventually go HIGH which disables the latch output signal. The result of this circuit is that the program running in the microcontroller must cause the microcontroller to generate pulses periodically and with sufficient frequency to turn on the relay outputs. The program is structured so that a 'health check' of the program operation passes predetermined criteria before the program will command pulses to this "watchdog" circuit. This circuit comes into play to disable heater drive outputs to the relays and the Triacs. The outputs are disabled when the microcontroller is in an undefined state during power up and power down or in some fault state due to a program bug, hardware fault, etc. Any malfunction in the microcontroller that results in its inability to maintain a stream of pulses to the "watchdog" circuit will cause the outputs to be disabled.

Low-Water Level Sensing

Water level sensing in a prior art heater was accomplished by capacitively coupling is a nominal 18 volt r.m.s. signal, from the secondary of a 36 volt transformer, into the water through a metallic probe. The equivalent source resistance of about 500,000 ohms and the capacitor value being 0.1 uF allowed the 50 Hz or 60 Hz sine wave to be coupled into the fluid (water). Assuming that the water represented a very low impedance, the amount of current through the water was about 36 microamps. If the water impedance was high enough, a voltage developed on the probe where the water impedance makes a voltage divider with the source impedance of 500 kohms. Given a detection threshold of 1.5 volts DC, and with rectification and filtering causing a voltage drop of about 0.7 volts, the impedance of the water must be less than about 70,000 ohms in order to be detected. While this is an effective means of water level detection, it is prone to indicate insufficient water level when, in fact, the water level is fine.

If an electric heating element, adjacent to the water level probe, has a voltage on the sheath causing electrical current leakage into the water, this circuit may indicate insufficient water level. The reason for this is that an electrical current flow through the water from the leaky element to ground will register as a small voltage on the probe. The voltage will be picked up and rectified and if it is above the water-level detection threshold, it will cause the heater to shutdown due to a water level detection fault. According to the embodiment of the present invention, an improved means of determining water level detection that is not prone to be falsely triggered by voltage on the sheath of an element, is disclosed herein. A means of separately detecting corroded elements is also described herein.

Water-Level Sensing System

A means of sensing water level by measuring the AC impedance of the water is utilized. A high-frequency square-wave oscillator signal, nominally 32 kHz, is applied through a resistor and then through a series capacitor, to a metallic probe in the water at the top of the heating chamber. The node that exists where the capacitor and the resistor connect together is also connected to the input of a comparator. The output of the comparator is provided as a digital input to the microcontroller. When the probe is in contact with the water, and that water is in contact with a ground potential, the capacitor charges to the average voltage of the excitation waveform. The excitation waveform is the nominal 32 kHz square wave signal at a 5-volt logic level that has an average voltage of 2.5 volts. Given that the resistor and capacitor RC time constant is much lower in frequency than the high frequency waveform, an average DC value of nominally 2.5 volts will exist at this node. Placing the comparator threshold below this voltage, and given that the comparator does a Boolean inversion, the output of the comparator will be consistently or predominately LOW as long as the water contacts the probe. The microcontroller can then determine that the water level is sufficiently high with a consistently or predominately LOW signal input from the comparator.

If the water does not make contact with the probe, the capacitor allows the high-frequency signal to pass to the comparator. Stray capacitance at the comparator input will deteriorate the waveform. However, the comparator produces approximately a square wave at the output and subsequently the microcontroller will determine that the water level is low by sensing this approximate square wave instead of a consistently or predominately LOW signal. When more than one probe is used, it is convenient to use a CMOS NAND gate as a combination comparator and negative OR gate. Since the threshold of CMOS is close to ½ of the Vcc, there is an improvement that can be made in the microcontroller program to provide added noise immunity. The sensing by the microcontroller of the comparator output can be synchronized with the input square wave so as to sample the comparator output at appropriate times to determine if an output square wave is present. It is advantageous to pick the resistor and capacitor values so that they pass very little of line frequency. The reason for this is that stray electric fields in the water due to a failed or damaged heating element can cause a signal to be injected into this circuit. By making the capacitor small enough in value, the line frequency will be blocked. If the resistor value is 150,000 ohms, the injection of current is about 24 microamperes RMS. If the coupling capacitor is 0.005 microfarad, the rejection of 60 Hz will be due to the capacitor exhibiting more than 500,000 ohms of impedance.

Setpoint Potentiometer vs. Remote Control

In operation, the microcontroller's program determines the desired temperature setpoint of the output fluid by sensing the position of a potentiometer setting on the heater's circuit board. In addition, the serial communication capability of the invention allows other devices to communicate with the heater so that parameters can be read or written. One such parameter is the temperature that corresponds with the potentiometer lowest position, representing the "base" temperature. Another parameter is the potentiometer span. Both of these parameters may be stored in non-volatile memory. The span parameter can specify zero, ten degrees, twenty degrees, or forty degrees, for example. Then if the most counter-clockwise potentiometer position is set via the parameter to 110 degrees F., and the span is set to 20 degrees F., the potentiometer will span from a minimum of 110 degrees F. to a maximum of 130 degrees F. In addition, by setting the span to zero via the communications messaging, the potentiometer setting is 'over-ridden' since its position is ignored when the span is defined as zero, and thus the setpoint value is equal to the parameter assigned to the base temperature. This is a flexible means of allowing the potentiometer to be over-ridden by remote command and also to allow for the potentiometer range to be defined remotely. In manufacturing, the heater can be configured for different applications by setting these two parameters and storing them in non-volatile memory.

Very Low-Power Standby Program

The purpose of the very low-power standby program is to allow the embodiment of the invention to quickly recognize a flow of water and transition into a heating mode thereby producing hot water almost immediately. This program operates automatically by using the fact that less dense warm water rises above more dense cooler water.

Water is not flowing during the standby condition. Since the water is stationary, warmer water rises to the top of the fluid heater. For as long as water is stationary and above ambient temperature, the temperatures at the top of the heater will be above the temperatures at the bottom. The difference between the temperature measured by the thermistor at the top of the heating chamber and the thermistor at the bottom of the heating chamber is called the temperature gradient. The gradient is positive as long as water is warmer at the top.

There are three values of the temperature gradient that are important. The three important gradients are called the zero, the lower and the upper limit, respectively. The zero limit corresponds to a gradient of zero. The specific values of the lower and upper limits may be somewhat arbitrary. Both the lower and upper limits are positive values with the upper value being larger than the lower. Specific values chosen for the limits will influence the energy consumption during standby and the program's sensitivity to identifying the start of water flow.

When the fluid heater transitions from heating with water flowing to standby with water stationary, the water inside the heater is above the ambient temperature because it has been partially heated. After the water stops flowing, a large positive temperature gradient quickly forms. As time passes, heat is transferred from the stationary water to the ambient air and the temperatures fall toward ambient, decreasing the temperature gradient. Eventually the gradient falls to less than the lower limit.

When the temperature gradient falls below the lower limit, a small amount of current is applied very slowly, i.e. 1 ampere for a period of ½ the AC cycle each second, to a heating element to allow the resulting temperature rise to be timely detected within the system's lag time. Thus, the actual energy applied to the water to maintain the gradient is minimized Provided the water flow remains zero, this small amount of heating increases the temperature gradient.

The small amount of heating continues until the temperature gradient rises to the upper limit. If the upper temperature gradient is small, there is little energy above ambient in the fluid and therefore there is very little energy lost to the surroundings.

When flow begins, the warmer water at the top of the heater is carried away from a thermistor at the top of a chamber, causing the temperature gradient to decrease. If the flow rate is very small, such as a drip caused by a leaking faucet, some of the flow moves through bypass holes in the top of the heater chambers. Because the water bypasses a chamber through these holes, the temperature measured at the bottom thermistor remains relatively constant while the inlet water causes the temperature at the top thermistor to decrease, thereby decreasing the temperature gradient. As long as the small drip continues and the flow bypasses the chambers, the temperature gradient will remain nonnegative and the heater will not leave standby. This is a significant advantage over standard water heating systems. The only wasted energy during a drip flow is the small energy injected to maintain the temperature gradient below the upper gradient limit.

If fluid flow is larger than a drip, the flow pulls the warm water from the top of the heater toward the bottom as the fluid progresses from tube to tube through the heater. Due to the flow in the first chamber, the temperature measured by the top thermistor drops toward the inlet temperature and the bottom thermistor warms thereby decreasing the temperature gradient. As the gradient drops below the lower limit, the small amount of heating begins in an attempt to raise the gradient to the upper limit. As the small amount of energy warms the water, the flow pulls the warming water downward faster than the density change can drive it upward. The result is that the gradient soon becomes negative indicating a flow of water and the end of the standby condition.

Load Shedding

Using the communications capability of the invention, it is possible to monitor or control other appliances or systems. The embodiments of the present invention may be used in conjunction with other electrical appliances such as an air conditioning compressors, kitchen oven, dishwasher, pool heater, or electric space heating, and the like. Communications between the embodiments of the present invention and other electrical appliances via communications and control circuitry may enable these electrical appliances to function with an electrical service that would normally be inadequate to provide all the power requirements if all of the electrical appliance loads were connected at the same time. When the embodiments of the present invention are being used for a shower or bath function, then a higher priority could be given to the heater than for example an air conditioner or electric heat strip. Embodiments of the present invention may be used for different purposes in a home or business and thus may have different use priorities. For example, shower and bath hot water would have a higher priority than heating water for a radiant-floor heating system.

Reliability of the Relays and Other Issues

Relays are used on the heater's circuit board to enable or disable the power circuits to the heating elements. In the heater, these relays are tested during heater operation to provide greater reliability and safety.

Heater Power Relay Driver

Heater power relays in the preferred embodiment of the invention are driven in a way to make operation more reliable and more fail-safe than in prior designs. If the supply voltage rises well above nominal, the relay coils would overheat if not for the linear regulation of voltage to the relay coils. The transistor that performed the linear regulation was heat-sinked because of the potentially high amount of power it would have to dissipate. Relays, being electromechanical, generally have a lower Mean-Time-Between-Failure (MBTF) than electronic components. In the heater circuits, relay contacts, when closed, connect the AC supply by conductors, designated L1 and L2, for one heating element to the Triac that supplies current to the element. The relay coils are controlled by a transistor, herein designated as a "drive transistor." Innovation in the area of increasing relay reliability is disclosed herein.

In the prior art, the drive transistor, if it failed shorted, would cause both 'L1' and 'L2' supply voltages to be available across the Triac and load, thus compromising the disconnection means they would normally give. In the embodiment of the present invention a small change in drive configuration adds redundancy and allows for detection of a single point of failure before it becomes a problem.

Relay Configuration.

Two sets of relay contacts isolate the Triac and load from the AC main power conductors 'L1' and 'L2'. Functionally, the relays are not required in the heater, however, the isolation provided by the relay guards the Triac from transients when the heater is not applying power to the heating elements. When Triacs fail, they are more likely to fail shorted. The relay contacts serve as a back-up disconnection means if the Triac should fail shorted. Since there are two relay contacts for each Triac, there is redundancy in this arrangement. If one drive transistor activated the two relay coils, the single point of failure of the single drive transistor would cause both relay contacts to stay closed. This condition would result in a loss of redundancy. For this reason, one transistor drives the relays associated with the 'L1' line, and another transistor drives the relays associated with 'L2' line.

Relay Coil Current

The preferred type of relay is the sealed type F relay that is designed for 85 degree C. operation. As the temperature of a relay increases, the magnetization decreases. As the drive is increased to make up for the decreased magnetization, the coil temperature increases which works against the magnetization. To avoid relay overdrive, the line voltage is monitored by the microcontroller. The relay coil drive transistor is modulated with a pulse-width-modulation (PWM) signal generated in the microcontroller. When the relay is first closed, the first nominally $1/10^{th}$ second of relay coil drive is applied with a PWM signal at 100%. If the line voltage is below the nominal voltage, the PWM is continued at 100%. Otherwise, the PWM follows a de-rated proportion so that the coil current is maintained at an average amount that is sufficient to meet the relay specification.

The PWM signal for modulating the relay drive transistor is further modulated according to the phase of the line signal. Near zero crossings, a full-wave rectified DC voltage is below nominal and the PWM signal is driven at 100%. As the rectified DC voltage passes nominal, the PWM signal may be driven at less than 100%. Many algorithmic methods may be employed here to accomplish the same thing. It is preferred that the rectified voltage is not filtered with capacitance so that the de-rating of power described above is performed within each half-cycle. A straightforward method is to apply 100% duty cycle until the voltage gets above a given threshold. Above that threshold, a linear de-rating can be put into effect that is a function of the measured voltage. To accomplish this, it is necessary to be able to have a representation of the rectified voltage. It is preferred that similar results can be accomplished without the extra analog to digital conversion of the rectified voltage, at a sample rate that allows multiple samples within a half cycle of the line frequency. It is sufficient to have an average value representing the line voltage and then output the PWM signal based on timing that is synchronized with the line frequency. As line voltage is nominal, the PWM signal may be 100%. As the line voltage exceeds nominal, the PWM signal can be reduced to a lower percentage for a duration that matches with the peak of the rectified voltage.

Relay Activation Sequencing

The mechanical lifetime of a preferred relay typically is 10 million close-open operations. If large currents and voltages are interrupted by the contacts, this life specification must be de-rated. If the relays are not switching energized loads, the life is equal to the mechanical life. Operated 100 times a day, which represents very heavy household use, 10 million cycles is equivalent to 270 years. Because of the "snubber" suppressor) circuit across the Triac, a small load does appear on the relay contacts even if the Triac is turned off when the relay is switched. The large load of the heating element is not switched by the relay because the microcontroller only switches the relays on before the Triac is turned on. Likewise, on turning off, the Triac is turned off first, then the relays. When the limit switch interrupts power to the relay coils, the microcontroller senses this condition and turns off the Triac before the relay coil field collapses. When power is lost, the same mechanism keeps the relay contacts from sparking: the loss of relay voltage is sensed in time for the Triac to be switched off. In order for this to be accomplished, the microcontroller is equipped with the inputs which sense that the voltage supplying the relay coils has fallen. Since the relays will hold in for at least 10 mS, the microcontroller must sample this input often enough to act on it in time to turn off the Triacs. When not using filter capacitors on the relay coil supply voltage, the pulsating DC must be synchronously sampled so that the voltage is sensed away from the zero-crossing. Alternately, the sensing can be filtered either with a capacitor or digitally, but in either case, the delay introduced may be such that the relay will open before this condition is recognized and the Triac will not be turned off before the contact opens.

Flow Computation Method

A method of indirectly measuring flow uses a temperature sensor and heater power data. This method relies on the ability to store a time history of temperature and power data and uses the basic relationship of heat transfer to compute the flow rate.

Other and further features and advantages will be apparent from the following description of presently preferred embodiments of the invention, given for the purpose of is closure and taken in conjunction with the accompanying drawings.

DETAILED DESCRIPTION OF THE PREFERRED EMBODIMENTS

Figure 1:
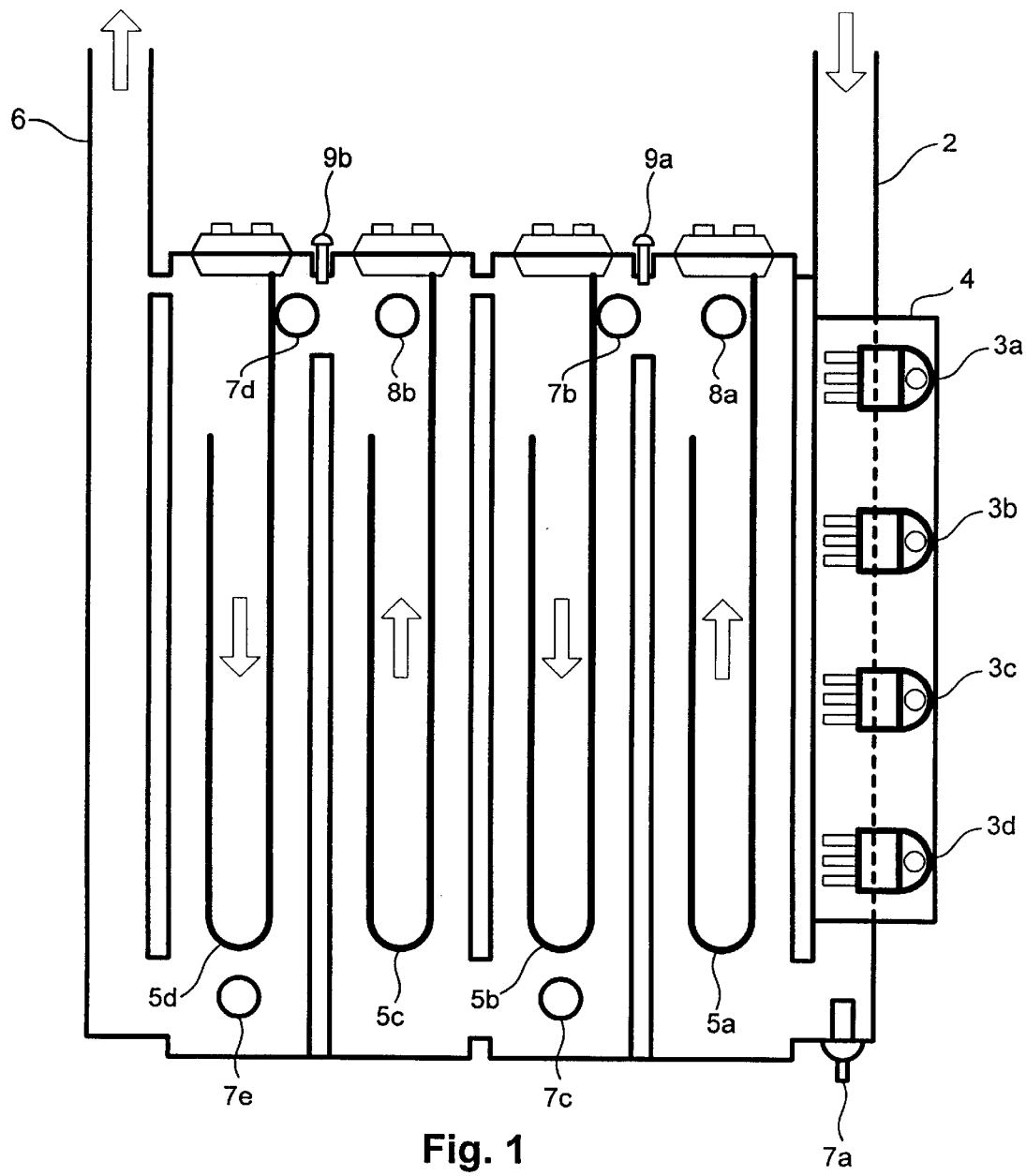
FIG. 1 generally depicts a schematic elevational view of a preferred embodiment of the invention illustrating four heating chambers of a flow-through heating apparatus.

Referring now to the drawings, the details of the preferred embodiments of the present invention are schematically illustrated. Like elements in the drawings will be represented by like numbers, and similar elements will be represented by like numbers with a different lower case letter suffix. Referring now to FIG. 1, a schematic elevational view of a preferred embodiment of the present invention having four heating chambers in a flow-through heating apparatus is illustrated. A fluid heating apparatus generally indicated by the numeral 1000 comprises a heat exchanger 1 which provides substantially instantaneous heating of fluids entering inlet pipe 2. The fluid entering inlet pipe 2 cools triacs 3a–3d which are thermally mounted to a heat sink 4, and follows a serpentine path past U-shaped heating elements 5a–5d, and after being heated, exits outlet pipe 6. The triacs 3a–3d preferably have for example but not limitation, ratings of 600 volts and 40 amperes. A commercially available part for the triacs 3a–3d may be part number Q6040K7 available from Teccor Electronics, Inc., of Irving, Tex. Thermistors may be used for temperature sensors 7a–7e, and provide a predictable change in resistance for a given change in temperature. The thermistor temperature sensors 7a–7e may be for example, part number 25502, available from BWD Automotive Specialties of Selma, Ala. Over temperature limit switches 8a and 8b preferably open when fluid temperature reaches 160° and 180° Fahrenheit, respectively, and may be for example part numbers 2455RM-87160003 and 2455RM-87160001, respectively, available from Elmwood Sensors of Pawtucket, R.I. Fluid level detection electrodes 9a and 9b sense the presence of fluid at the top of the heating chambers when fluid provides electrical continuity between electrodes 9a and 9b and the electrically grounded cases of temperature sensors 7a–7e.

In the preferred embodiment, five temperatures are measured by the thermistors 7a, 7b, 7c, 7d, 7e in FIG. 1 as the four-chamber fluid heater operates. These are designated, $T_{in}$, T1, T2, T3, and T4. In atwo chamber embodiment, T3 and T4 are zero. $T_{in}$ is the temperature of the inlet fluid with anominal range of 40 to 85 degrees Fahrenheit. T1, T2, T3, and T4 are the temperatures measured by thermistors in each chamber, respectively, with T4 being the outlet fluid temperature so that $T4=T_{out}$. The object of the control program is to bring the temperature T4 to the setpoint temperature $T_{sp}$ as rapidly as possible when the fluid is flowing. $T_{sp}$ nominally is 120 degrees Fahrenheit, although the value can be adjusted in the system.

The key to reducing the effects of disturbances and changes in components such as thermistors is to average the temperatures T1, T2, T3, and T4, yielding $$T_{avg}=(T1+T2+T3+T4)/4 \tag{1}$$

and use this average as the basis for the regulation of the temperature of the outlet fluid. Letting the temperature rise between the temperature of the inlet fluid and that of the outlet fluid be designated $$T_{rise}=T_{sp}-T_{in}, \text{ with } (T_{sp}>T_{in}) \tag{2}$$

an equation of the form $$CSP=A \times T_{rise}+B \times T_{in} \tag{3}$$

is used to compute a Calculated Set Point (CSP) where A and B are constants determined by the number of chambers in the heater. The value CSP is an unnormalized value that takes into account the required temperature rise and the inlet fluid temperature. The equation may be used to allow the control program for the heater to regulate the temperature of the output fluid.

For an N chamber embodiment, the constants in Equation 3 are calculated as follows:

$$A=(\Sigma n)/N \text{ for } n=1,2,\ldots N \text{ and } B=N \tag{3a}$$

As a example of the use of Equation 3 for temperature regulation, A=10/4=2.5 and B=4 in the four-chamber embodiment of the heater. Further, let the temperature rise in a chamber be designated $\Delta T_i$, where i=1, 2, 3, or 4. An assumption confirmed by experience is that for equal wattage elements in each chamber, the temperature rise in each chamber is approximately the same so that $\Delta T_1=\Delta T_2=\Delta T_3=\Delta T_4=\Delta T$. The average temperature in Equation 1 thus can be expressed in terms of the inlet fluid temperature and the rise in each chamber as $$T_{avg}=(T1+T2+T3+T4)/4=[4 \times T_{in}+(\Delta T+2\Delta T+3\Delta T+4\Delta T)]/4=T_{in}+2.5 \times \Delta T \tag{4}$$

Since $T4=T_{in}+4 \times \Delta T$, is the fluid outlet temperature, the temperature T4 is to be made equal to the setpoint temperature $T_{sp}$ by the heater's control program.

Assuming the setpoint temperature, $T_{sp}$, is a constant, Equation 3 for CSP can also be expressed in terms of nominal temperatures as $$Tcsp=[2.5 \times (T_{sp}-T_{in})+4 \times T_{in}]/4=0.625 \times T_{sp}+0.375 \times T_{in} \tag{5}$$

where Tcsp is called the Calculated Setpoint Temperature and will typically differ from $T_{sp}$, the required outlet fluid temperature. This equation is used by the control program of the four-chamber embodiment to regulate the outlet temperature.

Considering Equation 5, $T_{sp}-T_{in}=4 \times \Delta T$ when the setpoint temperature is achieved. Thus, the first expression in Equation 5 can be written $$Tcsp=[2.5 \times (4 \times \Delta T)+4 \times T_{in}]/4=T_{in}+2.5 \times \Delta T \tag{5a}$$

which is the same expression as Equation 4 for the average temperature. Thus, when $$T_{avg}=Tcsp \tag{6}$$

the outlet fluid temperature, T4, will be at the setpoint temperature $T_{sp}$. Thus, the system is able to regulate the outlet fluid temperature accurately without waiting for an independent measurement of T4 to reach the desired setpoint.

Temperature regulation Equation 3 may be included in a control scheme in which a constant, fluid output temperature $T_{sp}$, the "setpoint.," is desired as discussed above. In this case, said temperature regulation equation consists of a reference value to which variable values can be compared to provide a rapid and accurate determination that the setpoint temperature has been achieved before such setpoint temperature is measured at the outlet of the fluid heater. A control setpoint which control setpoint is derived from the values of a combination of temperature rise from ambient required to achieve set point ($T_{rise}$) and the ambient water temperature $T_{in}$. Said control set point referred to as the "Calculated Set Point" or CSP. CSP provides a reference value which value is compared to the value of variable sum of temperature measurements from a plurality of temperature sensors. When said value of the sum of the individual values of the temperature measurements equals the value of the CSP, the fluid in the fluid heater has been heated sufficiently such that the output temperature shall achieve setpoint.

Figure 2:
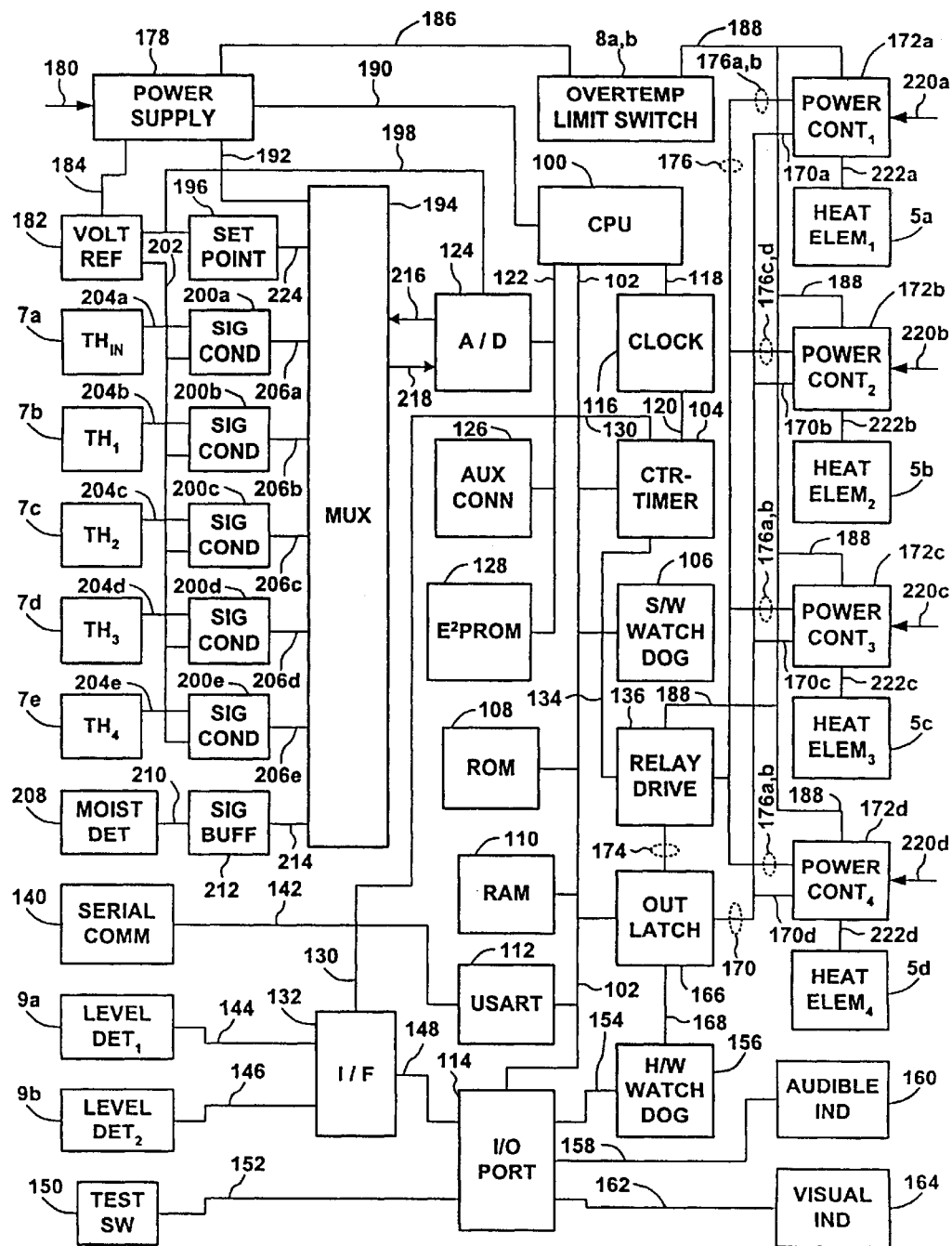
FIG. 2 is a system schematic block diagram of the preferred embodiment of the invention.

Referring now to FIG. 2, a system schematic block diagram of the preferred embodiment of the invention is illustrated. A CPU 100 is in electrical communication over control, address and data bus 102 with programmable counter-timer 104, software watchdog timer 106, ROM 108, RAM 110, universal synchronous/asynchronous receiver-transmitter (USART) 112, input-output (I/O) port 114, and output latch 166. Clock 116 preferably operates for example but not limitation at 4.194304 MHZ, and provides timing for CPU 100 over line 118 and also provides a fixed frequency source over line 120 to the counter-timer 104. CPU 100 is also in electrical communication over serial peripheral interface (SPI) bus 122 with A/D converter 124, auxiliary connector 126, andEEPROM 128. Counter-timer 104 preferably provides a 32.768 kHz signal over line 130 to level detect interface 132; provides a pulse-width modulation (PWM) signal over line 134 to relay drive 136; and provides clock pulses over line 138 to software watchdog timer 106.

Serial communications port 140 is in electrical communication over line 142 with USART 112; level detection electrode 9a is electrically connected over line 144 to interface 132 and level detection electrode 9b is electrically connected over line 146 to interface 132 which is in turn connected over line 148 to the I/O port 114. A switch 150, designated as a "Multifunction Pushbutton" is electrically connected over line 152 to the I/O port 114. The I/O port 114 provides signals over line 154 to hardware watchdog timer 156; provides signals over line 158 to audible indicator 160; and provides signals over line 162 to visual indicator 164. Output latch 166 receives an enable signal from hardware watchdog timer 156 over line 168. Output latch 166 transmits power modulation signals over bus 170 to power control circuits 172a–172d; and transmits relay control signals over bus 174 to relay drive 136. Relay drive 136 energizes relays incorporated in power control circuits 172a–172d over bus 176.

Electrical power for the controls enters low-voltage power supply 178 over line 180. Power supply 178 preferably provides a regulated Vcc of +5 volts to energize heater control circuitry including voltage reference 182 over line 184; provides unregulated +24 volts over line 186 to over temperature switch 8, and then to power control circuits 172a–172d and relay drive 136 over line 188; provides a logic-level signal at the AC power mains frequency (50 or 60 Hz), as an interrupt signal to CPU 100 over line 190; and provides an analog voltage signal proportional to power mains voltage (via transformer) to analog multiplexer 194 over line 192. Voltage reference 182 provides a stable source of +2.50 volts to A/D converter 124 over line 198 and set point potentiometer 196 over line 198; and provides a stable source of +0.15 volt to temperature sensor signal conditioning circuits 200a–200e (illustrated specifically in FIG. 3) over line 202. Output of set point potentiometer 196 is transmitted to analog multiplexer 194 over line 224.

Temperature sensors 7a–7e are electrically connected to signal conditioning circuits 200a–200e, respectively, over lines 204a–204e, respectively. Outputs of signal conditioning circuits 200a–200e are connected to inputs of analog multiplexer 194 over lines 206a–206e, respectively. Optional moisture detector 208 consists of two electrodes of interdigitated metallic fingers on an insulating substrate and may be mounted below or in the same enclosure as the heat exchanger 1 (FIG. 1), thus registering electrical conductivity when exposed to moisture. Moisture detector 208 is electrically connected over line 210 to signal buffer 212 and thence to analog multiplexer 194 over line 214. Analog multiplexer 194 receives digital select signals from A/D converter 124 over line 216 and transmits the selected analog signal to A/D converter 124 over line 218.

Power control circuits 172a–172d receive electrical power, typically from 208 to 240 volts AC at 50 or 60 Hz, over lines 220a–220d, respectively; and transmit electrical power over lines 222a–222d to heating elements 5a–5d, respectively. CPU 100, counter-timer 104, clock 116, software watchdog timer 106, ROM 108, RAM 110, USART 112 and I/O port 114 may be integrated into a single-chip microcontroller such as for example, part number 16C63 available from Microchip Technology, Inc., of Chandler, Ariz. A/D converter 124 may be part number CS5529-AP available from the Crystal Semiconductor Products Division of Cirrus Logic Inc of Austin, Tex. Analog multiplexer 194 may be part number 74HC4051N and is available from many semiconductor manufacturers. Output latch 166 may be part number 74HC374N and is available from many semiconductor manufacturers.

Testings Monitoring and Configuration Using a Serial Port

The system has a bi-directional serial port 140 (FIG. 1) built in that can be used for communication with the microcontroller. There are standardized software packages such as a terminal emulator, or any standard ASCII communication software that will read a serial data stream, for example, at 2400 baud, No parity, 8 bit, with 1 stop bit set. As the system operates, it makes its internal data available to external devices or modules. The ability to transmit back to the heater will allow additional commands to be sent with measured results and changes to the control of the fluid heater. In the preferred embodiment, these commands can be used for diagnostics, to change control parameters such as base temperature, offset, setpoint control potentiometer 196 span, and other controls of the option boards such as power thresholds for load shedding, custom temperature recording, logging, kilowatt (KW) usage, and other actions. In addition, it is a feature of this invention that the serial communications information can be used to couple this fluid heating system to networks, other devices, displays, and controls to allow this fluid heater to act as a master or slave to a larger system of peripherals. It is contemplated and within the scope of the invention that any form of computer communications may be used such as for example but not limitation, Universal Serial Bus (USB), Ethernet, FireWire, infrared, fiber optics, and the like.

Figure 3:
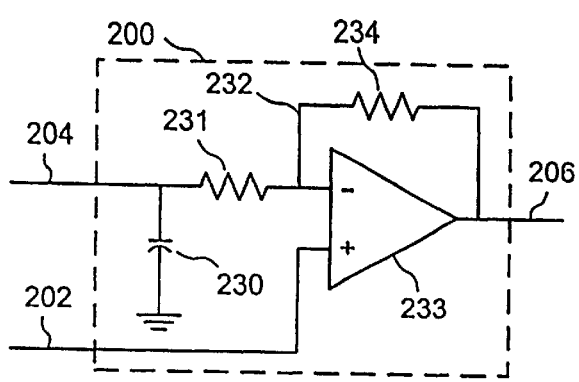
FIG. 3 is a schematic diagram of a temperature sensor signal-conditioning circuit.

Referring now to FIG. 3, a schematic diagram of a temperature sensor signal conditioning circuit is illustrated. A temperature sensor signal conditioning circuit 200 comprises input line 204; reference voltage line 202 connected to the non-inverting input of operational amplifier (op amp) 233; radio-frequency filter capacitor 230 preferably of nominal value 0.1 microfarad connected between input line 204 and ground; input resistor 231 of preferably nominal value 100 ohms connected between input line 204 and the inverting input node 232 of op amp 233; and feedback resistor 234 of nominal value preferably of 2200 ohms connected between non-inverting input node 232 and the output of op amp output 206. Op amp 233 may be one-fourth of a general-purpose quad operational amplifier package and may be part number LM324N, available from many semiconductor manufacturers.

Figure 4:
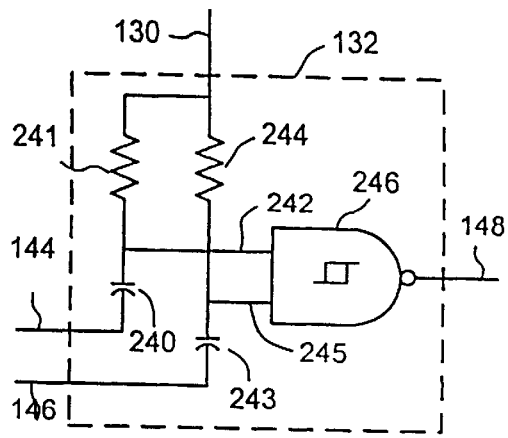
FIG. 4 is a schematic diagram of a fluid-level detection circuit having alternating current noise rejection.

Referring to FIG. 4, a schematic diagram of a fluid level detection circuit having alternating current noise rejection is illustrated. The fluid level detection circuit and program may operate by checking a value in a counter. Normally, the counter is reset periodically to 255. If the circuit of FIG. 4 provides decrementing counts to this counter, when the counter reaches 240 (or a decrease in value of approximately 6.25%) the error is set and a level detect shutdown is performed. As long as water is present at both sensors, the unit will heat fluids. Node 130, resistor 241 of nominal value 150 kohm, node 242, and capacitor 240 of nominal value 100 picofarad in series with fluid level detector line 144 form a first voltage divider at a first input node of a two-input Schmitt trigger-type NAND gate 246. In a like manner, node 130, resistor 244 of nominal value 150 kohm, node 245, and capacitor 243 of nominal value 100 picofarad in series with fluid level detector line 146 form a second voltage divider at a second input of gate 246. When fluid is in contact with fluid level electrodes 9a and 9b of FIG. 1, lines 144 and 146, respectively, are maintained near an AC ground potential causing resistor 241 and capacitor 240 and resistor 244 and capacitor 243 to integrate independently the 32.768-kHz square wave signal of 50% duty cycle on line 130 and present the integrated or average values to inputs 242 and 245 of gate 246. The square wave of line 130 has an averaged value of 50% of the control system Vcc power supply or +2.5 volts. When both inputs to gate 246 are above a predetermined threshold voltage of about 2.2 volts, output 148 goes to a logic low level, signaling that fluid is detected at both electrodes 9a and 9b. Conversely, if either fluid detection line 144 or 146 is open, output 148 emits a square wave of inverted polarity from that of line 130, sensible at I/O port 114 by the program (firmware)executed from ROM 108 by CPU 100. Two-input Schmitt trigger-type NAND gate 246 is one-fourth of a logic package and may be part number 74HCT132N, available from many semiconductor manufacturers.

Figure 5:
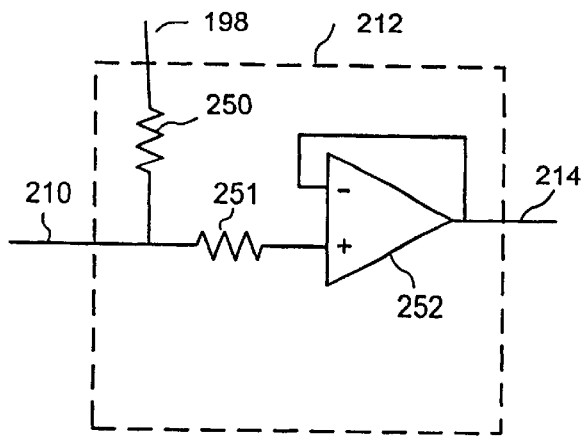
FIG. 5 is a schematic diagram of a moisture detection circuit.

Referring to FIG. 5, a schematic diagram of a moisture detection circuit is illustrated. The moisture detect circuit may be an LM324 op-amp 252 wired as a buffer reading through the input isolation resistor 251, its input voltage being the 2.5 volt reference 198 through a 1 Megohm resistor 250. If the interdigitated metallic fingers have any conductivity therebetween due to water on them, they will conduct and the voltage output will drop. When the processor reads the data value of the sensor from the MUX 194 and determines the value to have dropped, a moisture detect flag will be set and the appropriate shutdown performed by shutting power down and opening the relays. The program will also set an alarm flag causing a continuous tone to be emitted from audible indicator 160.

Relay Enable/Disable Circuit

The relays on the circuit board allow power to be applied to the fluid heating elements only when the contacts are closed. The state of a relay contact is controlled by two inputs to a 2-input AND gate 260a–260d (74HC08 or equivalent). For a relay contact to be closed, an output bit for each relay 174a–174d from the latch of the Emergency Shutdown circuit (FIG. 7) must be a logic HIGH and simultaneously a signal 134 from the processor must be a logic HIGH at the inputs of the AND gate. When both inputs are HIGH, the relay contacts are closed by the Relay Enable/Disable circuit which controls the relay-coil drive circuits 176a–176d. This is the case in normal operation of the fluid heater. Conversely, if either the signal from the processor134 or the output bits of the latch 174 are not HIGH, the Relay Enable/Disable circuit will cause the relay contacts to open. Thus, no power will be applied to the elements.

In the preferred embodiment, the signal 134 to the Relay Enable/Disable circuit is actually a Pulse Width Modulated (PWM) signal set at 100% duty cycle. Thus, while the processor operates normally, this signal is a logic HIGH and relays can be enabled. Varying the duty cycle of the PWM signal would cause the relay contacts to close when the signal is tHIGH and open when the signal is LOW, thus providing more precise control of the power to the heating elements for some applications. Similarly, setting the PWM duty cycle below the level that will hold the relays on, the effect will be to remove power from the elements for additional safety redundancy. Reducing long-term heating of the relays provides more reliable operation and saves energy.

For safety, the relays are disabled (contacts open) during initialization of the microcontroller program and when power to the microcontroller is interrupted for any reason.

Figure 6:
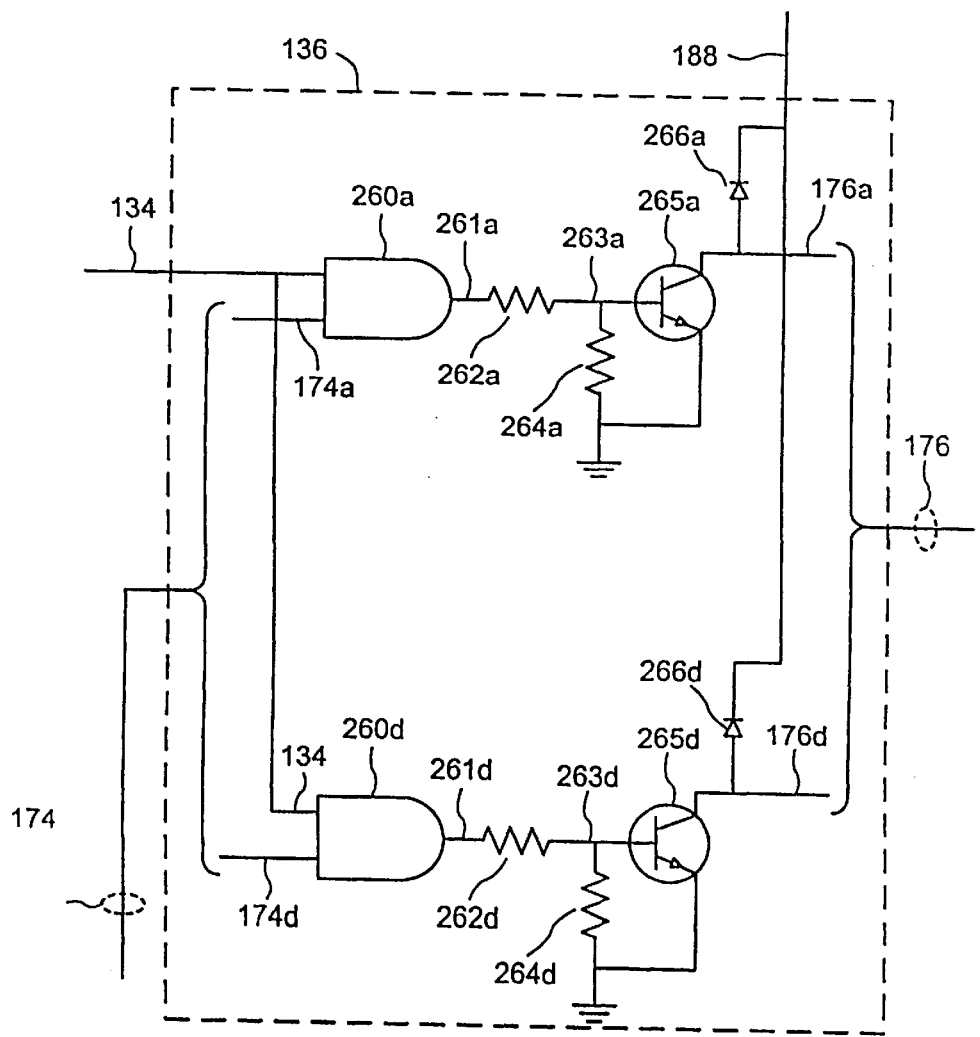
FIG. 6 is a schematic diagram of a relay enable/disable circuit.

Referring to FIG. 6, a schematic diagram of a relay enable/disable circuit is illustrated. The relay enable/disable circuit provides a method of controlling the amount of drive current to the relay coils by having the processor 100 place a value in a counter which will auto-decrement and gate off the relays for the remainder of the count time. Since this is an 8 bit counter, full power is $FF_h$ and ½ power is $7F_h$. The relay drive 136 gates relay control signals on bus 174 in accordance with the PWM signal from the processor/counter-timer on line 134 from outputs 261a–261d of AND gates 260a–260d, respectively, driving base terminals 263a–263d of output transistors 265a–265d through series resistors 262a–262d and base-emitter bias resistors 264a–264d. Output transistors 265a–265d drive relay lines 176a–176d and are protected from damage from back-EMF by connections to the anodes of diodes 266a–266d. Diodes 266a–266d have cathodes in common and connect to relay power source 188. Relay drive 136 drives lines 176a–176d and thence to relays 280a–280d and 281a–281d (FIG. 8) within power controls 172a–172d in accordance with Table 1 below.

TABLE 1

| LINES | RELAY | RELAY | RELAY | RELAY |
|-------|-------|-------|-------|-------|
| 176a  | 280a  |       | 280c  | 280d  |
| 176b  | 281a  |       | 281c  | 281d  |
| 176c  |       | 280b  |       |       |
| 176d  |       | 281b  |       |       |

Emergency Shutdown Circuits

In normal operation of the heater, the processor program writes bit-patterns (binary) into an integrated-circuit chip (tri-state D-type flip-flop 74HC374 166 of FIG. 2), commonly called a latch. The output bit-pattern from the latch 166 in turn activates one or more of the power circuits supplying power to the heater elements of the fluid heater. This binary pattern determines the power delivered to the fluid by the heating elements if the relay contacts are closed.

The latch 166 is an integrated circuit that allows the input bit pattern to be output when a logic LOW signal is at its OUTPUT CONTROL pin which enables the latch output drive. A special state of the latch used in the preferred embodiment is called the high-impedance state. Such latches are called tri-state because an output bit can be a logic HIGH a bit is 1), a logic LOW (a bit is 0), or all the output signals can be in the high-impedance state. In this state, the latch outputs are effectively disconnected electrically from the circuit.

In normal operation, the latch outputs the bit pattern input by the processor. When the latch is in a high-impedance state, the bit-pattern from the processor is not output and the output from the latch is incapable of turning on the triac circuit as described more fully hereinbelow.

Figure 7:
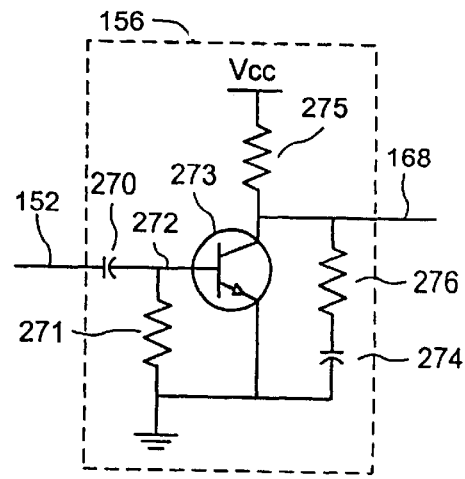
FIG. 7 is a schematic diagram of an emergency shutdown circuit.

Referring to FIG. 7, a schematic diagram of an emergency shutdown circuit is illustrated. In addition to writing bit-patterns to the latch, in normal operation, the processor program outputs a sequence of pulses 152 (STROBE pulses) to the Emergency Shutdown circuit illustrated in FIG. 7 to enable the latch to pass this control information to the triacs. Any malfunction in the processor that results in its loss of ability to maintain the stream of pulses will cause the latch to become inactive (high-impedance outputs) and thus disable the triacs. This action prevents power from being applied to the heating elements.

The processor must output pulses under program control when the latch is to be enabled for output as is the case for normal operation. Since the processor program operates in a loop, it executes the same piece of code that causes the pulses to be output over and over each pass through the loop. The pulses are coupled from the processor to a transistor 273 base through a capacitor 270. When a pulse is received through the capacitor 270 by the transistor 273, the transistor collector circuit is shorted to ground due to the transistor momentarily switching on for the duration of the pulse from the processor. The fact that the signal 152 is capacitively coupled means that the signal from the processor MUST be pulsed in order to keep the transistor turned on since a constant voltage high or low will not cause the transistor to hold the capacitor 274 in a discharged state. If the signal 152 from the processor freezes in a steady state, the transistor will turn off. The transistor collector circuit drives the enable signal 168 on the latch (OUTPUT CONTROL). This enable signal must be held LOW to enable the latch output. A capacitor 274 on the enable signal to ground serves to hold the enable signal LOW for several milliseconds after the transistor shorts the enable signal to ground. The timing of this discharge delay is chosen such that the processor will normally have time to keep the capacitor discharged all the time. A resistor 275 in this same circuit charges the capacitor so that if the transistor does not keep the capacitor discharged, the enable signal will go HIGH which will disable the latch output signal. This will also disable the relays by causing their contacts to be opened using the Relay Enable/Disable circuit illustrated in FIG. 6.

The emergency shutdown circuit 156 is a "watchdog timer" designed to turn off all the relays and opto-isolator drivers should the CPU 100 experience any timing failures. This hardware watchdog timer 156 receives pulses over line 152 from I/O port 114 in response to execution of the program stored in ROM 108 and executed by the CPU 100 operating in a loop (MAINL). Capacitor 270 of nominal value 0.1 microfarad and resistor 271 of nominal value 22,000 ohm form a differentiator delivering a positive-going a pulse at base terminal 272 of transistor 273 which then turns on and discharges capacitor 274 of nominal value 0.1 microfarad which is normally charged to Vcc potential through resistor 275 of nominal value 470,000 ohm and resistor 276 of nominal value 100 ohm thus presenting a logic low level at output latch enable line 168 which will enable all the relay coils and opto-isolators. Conversely, if the microcomputer or the program fails, the missing or infrequent pulses delivered on line 152, to transistor 273 allow capacitor 274 to charge to Vcc state thus presenting a logic high level at line 168 and shutting off all the output data and relay coil currents.

Figure 8:
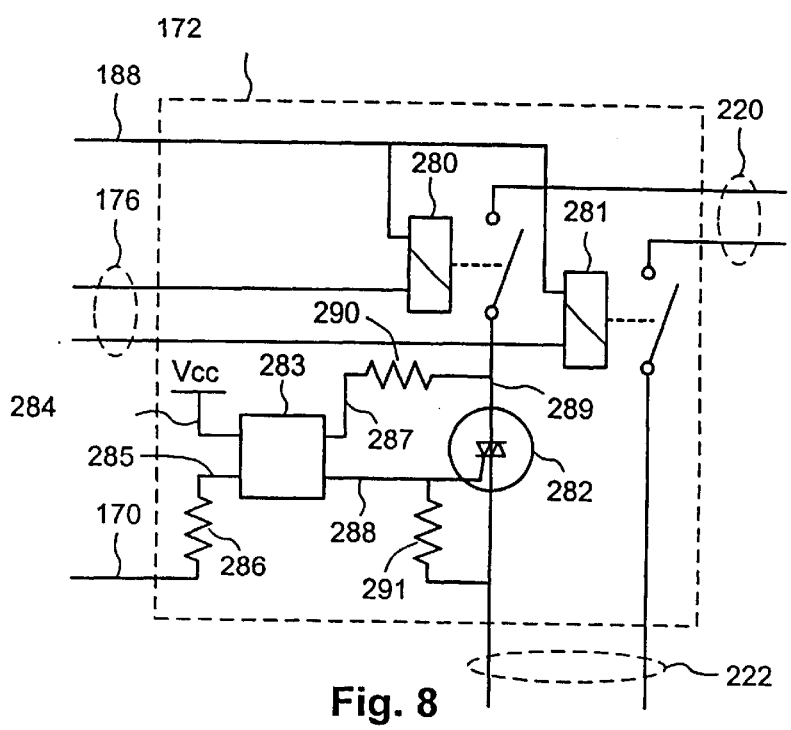
FIG. 8 is a schematic diagram of a relay and triac control circuit.

Referring to FIG. 8, a schematic diagram of relay and triac control circuit is illustrated. In a typical system according to an embodiment of the invention, there are a plurality of Power Control Circuits 172 which receive relay control signals 176 and activate coils of relays 280 and 281 if relay power source line 188 is also energized. This relay power source may be deactivated by opening the contacts of the over temperature limit switch(es), or by the enable/disable switch. Contacts of relays 280 and 281 control current from the AC power source 220 to the heating element 5 and provide redundancy of power shutdown in the event of failure of triac 282. When power enable line 170 is brought to a logic low level, a current limited by resistor 286 of nominal value 220 ohms is applied through the input of zero-crossing optical coupler 283 from Vcc 284. Optical coupler 283 will conduct for one or more half-cycles of the AC line and a zero potential is sensed across output terminals 287 and 288. This provides a gate trigger voltage to terminal 288 of triac 282 from terminal 289 of triac 282 limited by series gate resistor 290 of nominal value 20 ohms and shunt gate resistor 291 of nominal value 330 ohms. Power to element 5 may be controlled in ½ cycle increments by holding the opto-triac driver 283 on for one or more 8.3 ms periods. Optical coupler 283 may be identified by part number MOC3042A and is available from Motorola Incorporated of Phoenix, Ariz.

Emergency Shutdown Methods

As the fluid heater operates, power is applied to the heating elements when the relay contacts of the relays on the circuit board are CLOSED and the power-modulation devices (triacs FIG. 1 3a–3d) are driven by an optically isolated circuit. As a safety feature of the invention, circuits are included that cause power to be applied to the heating elements only when the processor program is executing normally. In the preferred embodiment, these are called "Shutdown Circuits." They act to open the relay contacts and disable the triacs in case of a malfunction of the processor or a loss of program continuity (software bug). In common terminology, such circuits are sometimes called "Watchdog circuits." One circuit, the Emergency Shutdown circuit, disables the triacs in case of a malfunction of the processor. The other circuit, the Relay Enable/Disable circuit FIG. 6, causes the relay contacts to OPEN in case of a malfunction of the processor (CPU 100).

Visual And Aural Indicators

Figure 9A:
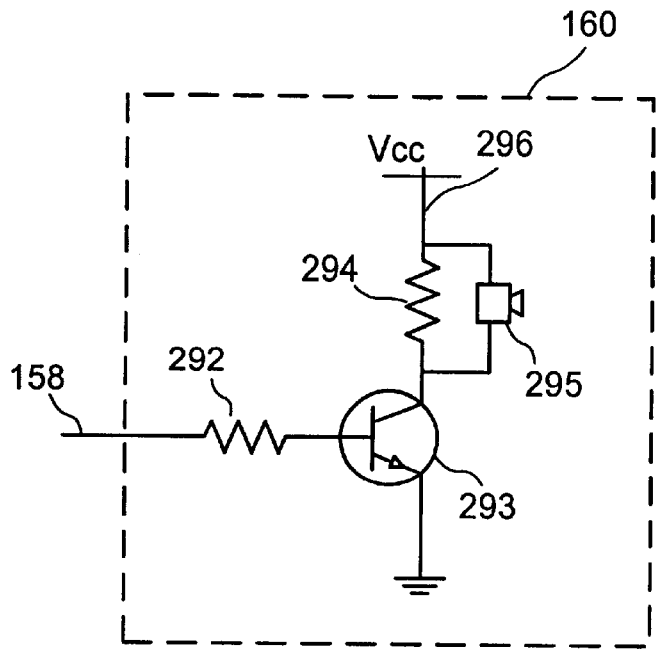
FIG. 9a is a schematic diagram of an aural alarm generating circuit.
Figure 9B:
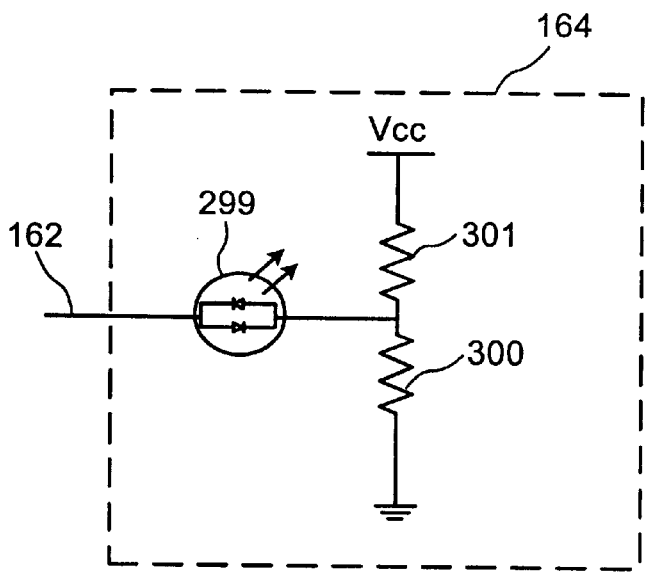
FIG. 9b is a schematic diagram of a visual alarm generating circuit.

In the Preferred Embodiment of the fluid heater there is a visual indicator 164 and an aural indicator 160 (FIG. 2). These indicators are used to verify normal operation or faults. Their circuits are illustrated in FIGS. 9a and 9b. The fault codes are defined in Table 2 hereinbelow. The visual indicator 164 consists of a dual color LED and the associated driving circuitry. This allows normal indications to be in green (a heartbeat like pulse) or in red for errors and faults. The LED circuit is driven by I/O port 114 (RA1) of the processor. The LED is biased at or near the point where setting a logic one bit on the port will turn on one color and setting a zero bit will turn on the other color. Leaving the output tri-state will turn the LED off. The aural indicator is a piezoelectric driver and a control transistor. This aural indicator is driven by I/O port 114 (RA2) of the processor. This bit is also used to drive a pulse to sync an oscilloscope or other diagnostic tool to indicate system state. When the control system first powers on, it will cause the visual indicator to flash and beep to indicate the model type of the fluid heater i.e. two red flashes indicate a fluid heater model having 2 heating elements and 4 flashes indicate a fluid heater having 4 heating elements. It would be obvious to develop other patterns for expanded systems or enhanced operational modes. In normal operation, the visual indicator will flash i.e., a green for ⅓ second then off for ⅓ second. If an error or errors (up to 32) are noted, the system will flash the error/fault in a "count code" i.e., as shown in the table below with say 1.5 seconds between code sets. The leading edge of the error/fault block will be indicated by a short flip in color, and the program exiting the green phase will start the error/fault indication. The error will flash in RED and be a single flash and a short space (⅓ sec) followed by some number of RED flashes, another short space followed by one or more flashes to indicate the third digit. One only need count the flashes or hear the beeps to read the code.

Referring to FIG. 9a, a schematic diagram of an aural alarm generating circuit is illustrated. The aural indicator circuit 160 is designed to allow the CPU 100 to alert the user if something is wrong such as water detected at the moisture detect sensor, etc., using a high pitched (1000 Hz) tone, or indicate errors such as an open wire using a sequence of tones to make up code groups, and to indicate the thermistors are successfully matched using a low tone. Other uses indicating the status of peripheral devices (if any are attached) are also easily implemented. The input signal 158 from the CPU 100 is coupled through a base bias resistor 292 to the base of transistor 293. When this signal is toggling at a rate set by the CPU 100, the transistor will turn off and on and develop a voltage from Vcc 296 across piezoelectric element 295 (a voltage mode device) by passing current through load resistor 294 and ground at the transistor emitter.

Referring to FIG. 9b, a schematic diagram of visual alarm generating circuit is illustrated. The visual indicator circuit 164 may be used, for example but not limitation, to indicate the error codes in red that are used in the aural indicator 160 above and to indicate a normal operation by a slow (⅓ sec) green heartbeat flash. This indicator 299 is a high efficiency dual color red/green light emitting diode (LED) that is driven by the CPU 100 in a current source or current sink manner by supplying the processor signal 162 to one side of the LED 299 and biasing the other side at a point approximately half way between Vcc and ground with resistors 300 and 301.

The fault indication will only audibly indicate the first minute via the piezo element and via the Red LED thereafter until the error is corrected. Depressing for example, a Multipurpose Button on the circuit board will cause the fault to be audibly annunciated again for an additional period of time.

TABLE 2

Visual and Aural codes

| | CODE: | MEANING: |
|---|---|---|
| FAULT0 = H/W: Thermistors. | 118 | Fault, Open thermistor |
| | 117 | Fault, Shorted thermistor |
| | 116 | Fault, Matching problem |
| | 115 | Fault, Th-4 |
| | 114 | Fault, Th-3 |
| | 113 | Fault, Th-2 |
| | 112 | Fault, Th-1 |
| | 111 | Fault, Th-in |
| FAULT1 = H/W: Class I | 128 | Fault, No forward temp rise. Reverse flow?* |
| | 127 | Fault, Bad element*,*** |
| | 126 | |
| | 125 | Error, High inlet temperature*** |
| | 124 | Fault, High temperature shutdown |
| | 123 | Fault, Water level detect |
| | 122 | Fault, Limit switch open/tripped |
| | 121 | Fault, Disable switch open*** |
| FAULT2 = H/W: Class II | 138 | |
| | 137 | |
| | 136 | |
| | 135 | Fault, Overrun warning* |
| | 134 | Fault, Moisture alarm |
| | 133 | Fault, Low mains voltage*** |
| | 132 | Fault, High mains voltage*** |
| | 131 | Fault, Thermistor match not yet done |
| FAULT3 = H/W: Class III | 148 | Fault, Watchdog reset* |
| | 147 | Fault, Control calculation not finished in time* |
| | 146 | |
| | 145 | |
| | 144 | Fault, Stuck relay shutdown* |
| | 143 | |
| | 142 | Fault, A/D error |
| | 141 | Fault, EEPROM error |
| AURAL INDICATION CODES** | | |
| Continuous high tone | | Fault, Moisture detect |
| Short low tone | | Thermistor calibration accepted |
| Long or continuous low tone | | Fault, error in startup or EEPROM |
| Codes above | | same as visual indication |

*Check status of the program with regard to these faults being detected
**Aural codes
***May not shutdown the system Heater Power Control The preferred embodiment of the invention substantially reduces or even eliminates electric light flicker caused by substantial and rapid load changes to an electrical power system. This is accomplished with a "digital power modulator" which is used to control the power applied to heating elements in small increments. It is also advantageous to share power equally across all heating elements, thus providing nearly equal temperature rises in all cascaded heating chambers. Further, it is also advantageous to preclude radio frequency interference by switching elements on and off only at the zero crossings of the power supply current, thus avoiding sharp changes in instantaneous current typical of, for example, phase-angle power control. Assuming a fixed heating element resistance, current drawn from the alternating current (AC) mains supply is proportional to the power delivered. However, due to a finite impedance of utility company secondary distribution, step-down transformer and feeder impedances, changes in current drawn by the heating elements are reflected to a greater or lesser degree as voltage changes to other electrical loads derived from the same AC supply. In particular, the intensity of lower-wattage incandescent and fluorescent lighting can vary noticeably with step changes in AC supply voltage. Rapid step changes in light intensity are referred to as "flicker" and if severe enough are deemed annoying. Therefore, it is advantageous to avoid step changes in power drawn from the AC supply which causes perceptible lamp flicker.

Figure 10A:
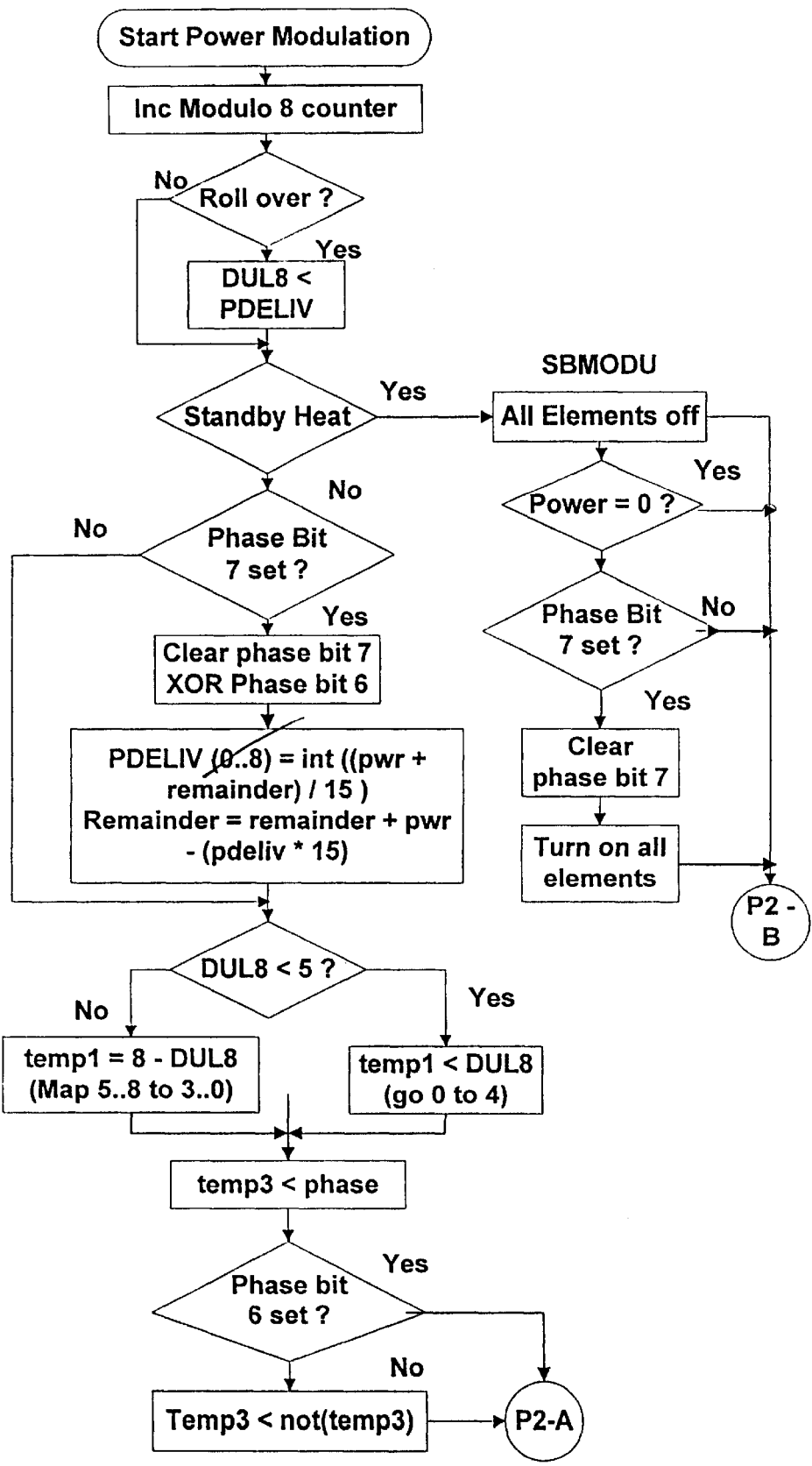
FIGS. 10a, 10b and 10c is a schematic flow diagram of the operation of a digital power modulator according to the embodiment of the invention.
Figure 10B:
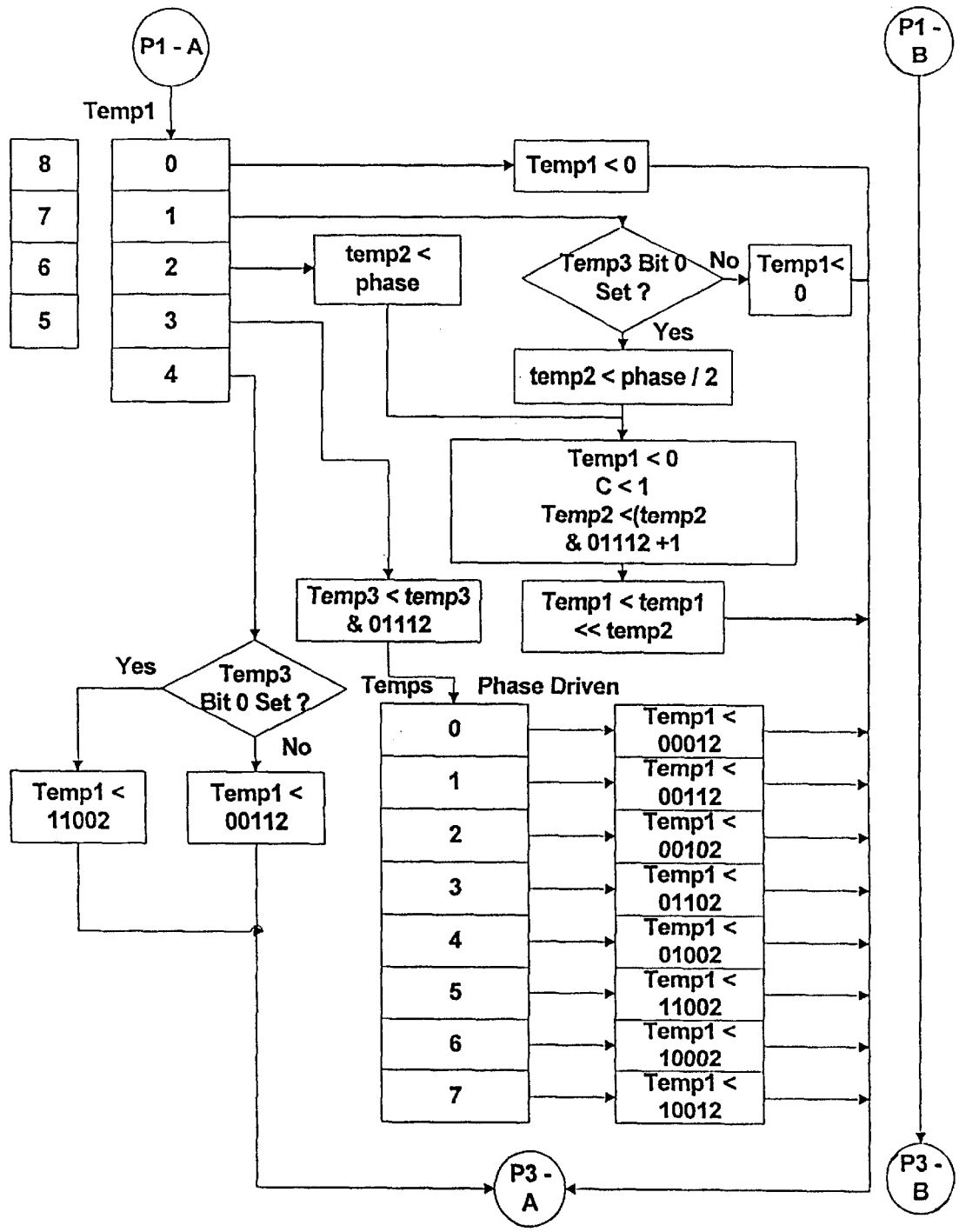
Figure 10C:
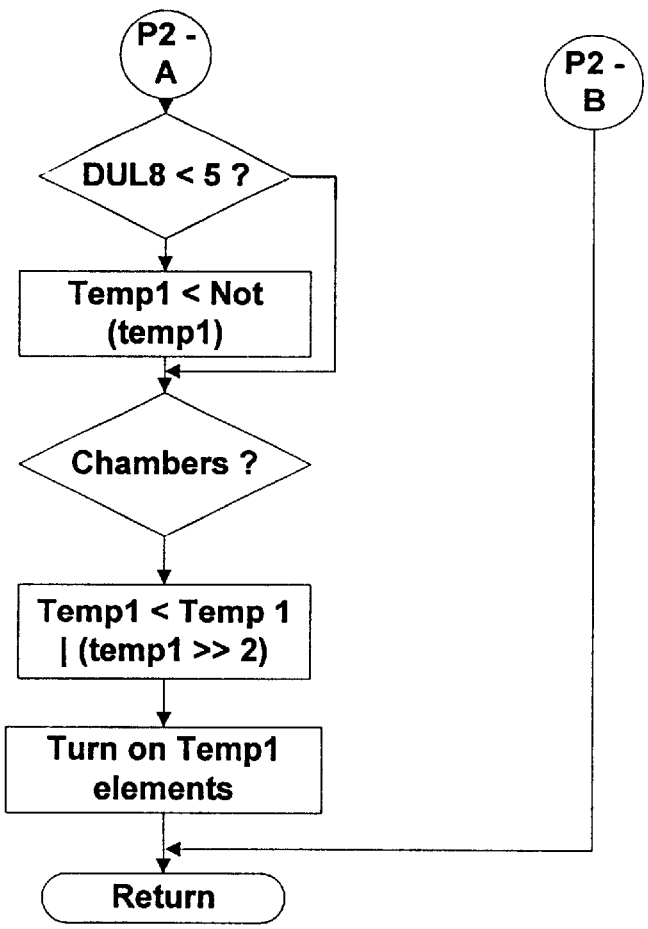
Figure 10D:
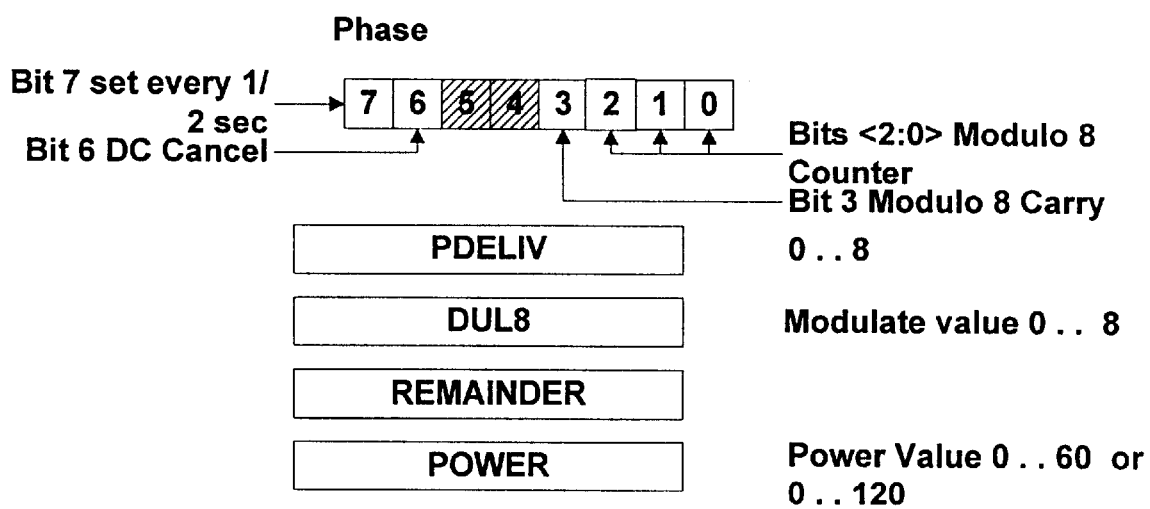
FIG. 10d is a schematic block diagram of register bit functions.

Referring to FIGS. 10a, 10b and 10c, a schematic flow diagram of the operation of a digital power modulator according to the embodiment of the invention is illustrated. A logic control program controls modulation of power, in half-cycle increments, to a plurality of heating elements for responsiveness to closed-loop control needs without inducing light flicker. As described hereinafter, the numerical relationships, for example, of 15/120 and 50/100 will be used to indicate 15 half-cycles of a possible 120, or 50 of 100, respectively. This varies with line frequency and allows one to discuss the voltage and current waveforms of a heater using, for example, four 7000 Watt elements or two 3500 Watt elements without distinctions of load characteristics because the method disclosed herein is based on a complex waveform on both the short term sequence of half-cycles and the net zero half cycling that occurs within seven and one half seconds. Within the above-cited constraints, it has been determined that power may be applied to heating elements at several fundamental power levels with no flicker at each level. There are four 100% flicker free levels (30/120, 60/120, 90/120, 120/120) and four additional nearly flicker free (but unnoticeable) levels (15/120, 45/120, 75/120, 105/120) described herein. The reason the second four are nearly flicker free is that although there is a current imbalance for each half second sequence (1 Hz component), the net zero half cycling of the program control will cause the processor to swap the phase of the AC supply and the sequence starts on each half second. This will cause the net total of cycles on the positive phase and the same net total on the negative phase every 7.5 seconds (0.13 Hz frequency component), worst case. The power control program will try to average them out sooner if possible. Small variations in flow will cause the power level to bounce around some and this random bouncing will provide an averaging that will be a very low frequency component (flicker), but will be substantially unnoticeable.

Assuming a heater with four heating elements and 60 Hz AC power, it is convenient to assign power levels where full power is equivalent to 120/120. In order to make any step changes in power level less noticeable, a given sequence of eight half-cycles is repeated without change for at least a one-half second duration. Reference AC line voltage and element current waveforms for each of the power levels are illustrated in FIGS. 11 through 18, respectively.

Realization of a given power requirement is accomplished by dithering between these eight power levels (15/120, 30/120, 45/120, 60/120, 75/120, 90/120, 105/120 and 120/120) such that the resulting power delivered is the total power produced in 15 consecutive half-second intervals (7.5 seconds). Power required for a given half-second interval is calculated in accordance with formulas 1a and 1b below.

POWER DELIVERED=INT((POWER+
REMAINDER)/15)   Formula 1a

REMAINDER=(REMAINDER+POWER)−
(POWER DELIVERED*15)   Formula 1b

Where:
POWER is the desired power level ranging from 0 to 120;
REMAINDER is the accumulated difference between power required and actual power delivered at each half-second interval; and
INT is a function defined as taking the integer portion of a number by truncating any decimal part.

POWER DELIVERED in a 60 Hz AC system is expressed as 0/120, 15/120, 30/120, 45/120, 60/120, 75/120, 90/120 105/120, and 120/120 to indicate how many ½ cycles out of a possible 120/second are delivered. In a 50 Hz System the total would actually be 100, thus the system would actually deliver power at 0/100, 12.5/100, 25/100, 37.5/100, 50/100, 62.5/100, 75/100, 87.5/100, and 100/100. The system is synchronized to AC Supply line zero crossings and the program will produce control pulses at those times. The ½ second timing is preferably generated by a crystal resonator and is not affected by the AC supply frequency.

If, for example, it is desired to deliver a power level of 46, Formulas 1a and 1b are calculated each half-second interval yielding a POWER DELIVERED, a REMAINDER, and a POWER REQUIRED as shown in Table 3, below. Also shown is a Net DC component to indicate the DC corrections.

TABLE 3

| TIME (SECONDS) | POWER DELIVERED | REMAINDER | POWER REQUIRED | Net DC |
| --- | --- | --- | --- | --- |
| 0.5 | 45/120 | 1 | 46 | +60 |
| 1.0 | 45/120 | 2 | 46 | −60 |
| 1.5 | 45/120 | 3 | 46 | +60 |
| 2.0 | 45/120 | 4 | 46 | −60 |
| 2.5 | 45/120 | 5 | 46 | +60 |
| 3.0 | 45/120 | 6 | 46 | −60 |
| 3.5 | 45/120 | 7 | 46 | +60 |
| 4.0 | 45/120 | 8 | 46 | −60 |
| 4.5 | 45/120 | 9 | 46 | +60 |
| 5.0 | 45/120 | 10 | 46 | −60 |
| 5.5 | 45/120 | 11 | 46 | +60 |
| 6.0 | 45/120 | 12 | 46 | −60 |
| 6.5 | 45/120 | 13 | 46 | +60 |
| 7.0 | 60/120 | 14 | 46 | 0 |
| 7.5 | 45/120 | 0 | 46 | −60 |
| | AVG = 46 | 0 | | 0 |

Thus the total power level delivered over 15 half-second intervals is 46, and the pattern repeats itself every 7.5 seconds unless the power required changes.

In reality, however, as a result of the responsiveness to the control system, the desired power level frequently changes from one half second interval to the next. The REMAINDER term serves to accumulate and correct any long-term error between the instantaneously desired power level and the actual power level delivered for any given half-second interval.

Table 4 below illustrates the binary pattern output by the control program to output latch 166 of FIG. 2 for each phase and for each of the fundamental power requirements to produce the waveforms illustrated in FIGS. 11 through 18. Trivial cases for all phases of fundamental power levels of 0 and 120 are included in Table 3 for completeness. The least significant bit (LSB) of each binary pattern controls heating element 1 (5a); the next most significant bit controls heating element 2 (5b); the next most significant bit controls heating element 3 (5c); and the most-significant bit (MSB) controls heating element 4 (5d).

TABLE 4

Binary Patterns of Phase Sequencing for Net zero DC offset

| PHASE | POWER LEVEL | | | | | | | | |
|---|---|---|---|---|---|---|---|---|---|
| | 0 | 15 | 30 | 45 | 60 | 75 | 90 | 105 | 120 |
| 0 | $0000_2$ | $0001_2$ | $0001_2$ | $0011_2$ | $0011_2$ | $0111_2$ | $0111_2$ | $1111_2$ | $1111_2$ |
| 1 | $0000_2$ | $0000_2$ | $0010_2$ | $0100_2$ | $0011_2$ | $1001_2$ | $1011_2$ | $0111_2$ | $1111_2$ |
| 2 | $0000_2$ | $0010_2$ | $0100_2$ | $1001_2$ | $1100_2$ | $1110_2$ | $1101_2$ | $1111_2$ | $1111_2$ |
| 3 | $0000_2$ | $0000_2$ | $1000_2$ | $0010_2$ | $1100_2$ | $0011_2$ | $1110_2$ | $1011_2$ | $1111_2$ |
| 4 | $0000_2$ | $0100_2$ | $0001_2$ | $1100_2$ | $0011_2$ | $1101_2$ | $0111_2$ | $1111_2$ | $1111_2$ |
| 5 | $0000_2$ | $0000_2$ | $0010_2$ | $0001_2$ | $0011_2$ | $0110_2$ | $1011_2$ | $1101_2$ | $1111_2$ |
| 6 | $0000_2$ | $1000_2$ | $0100_2$ | $0110_2$ | $1100_2$ | $1011_2$ | $1101_2$ | $1111_2$ | $1111_2$ |
| 7 | $0000_2$ | $0000_2$ | $1000_2$ | $1000_2$ | $1100_2$ | $1100_2$ | $1110_2$ | $1110_2$ | $1111_2$ |

Cancellation of DC offset which accrues from power levels 15, 45, 75, and 105 is accomplished by reading out the binary patterns shown in Table 4 for a given power level in reverse PHASE order. That is, after the end of one half-second interval of reading out the binary patterns in PHASE sequence 0-1-2-3-4-5-6-7, the next half-second interval commences by cyclically reading out the binary patterns in PHASE sequence 7-6-5-4-3-2-1-0. Thus, if the AC supply current in the even-numbered half-cycles is greater than the current in the odd-numbered half-cycles, the binary patterns for even- and odd-numbered half cycles will be reversed, effecting a cancellation of the DC component in the AC supply current. Further, all binary patterns yielding a DC supply component are chosen to begin with the greater current in the first half-cycle. Still further, binary patterns for all fundamental power requirements yielding a DC component in the current of any given heating element will, in a similar manner, undergo DC component cancellation in successive half-second intervals. Cancellation of DC components at the individual element level is important in the event that lines 220a–220d are connected, for example, to individual phases of a 3-phase AC supply, and to reduce eddy current losses in the AC supply transformer.

For an embodiment of a fluid Heater with two heating elements, the digital power modulator is applied to a fluid heater incorporating two heating elements instead of four, the maximum fundamental power level is reduced from 120 to 60 and the binary patterns shown in Table 4 are each reduced from four bits to two bits by performing the logical OR operation of the two most significant bits into the two least significant bits (a divide by 2). Two chamber detection is accomplished by noticing that the thermistors Th3 and Th4 are at ground potential since they don't exist in the 2 heating element heater, the processor will change functional parameters to accommodate this two element system. The power modulator and detection logic will work with any number of heating elements from one to as many as needed, and operation and detection of the number of heating elements is contemplated and within the scope of the present invention.

An example illustrated in Table 5 below shows the 8 half-cycle sequences, numbered phase 1 through phase 8, and identifies which heating elements are powered during each phase, for a two-element heater. To understand how the DC component is balanced, think of each half second being either even or odd, then the 'phases' are output left-to-right during even half second periods and the 'phases' are output right-to-left on odd half second periods.

TABLE 5

Two Element Heater High Frequency Modes at 60 Hz

| Mode | POWER | $\Phi_1$ | $\Phi_2$ | $\Phi_3$ | $\Phi_4$ | $\Phi_5$ | $\Phi_6$ | $\Phi_7$ | $\Phi_8$ | FREQs |
|---|---|---|---|---|---|---|---|---|---|---|
| 0 | 0 | | | | | | | | | none |
| 1 | 15 | EL1 | | EL2 | | EL1 | | EL2 | | DC, 60 Hz, 120 Hz |
| 2 | 30 | EL1 | EL2 | EL1 | EL2 | EL1 | EL2 | EL1 | EL2 | 120 Hz |
| 3 | 45 | EL1 EL2 | EL1 | EL1 EL2 | EL2 | EL1 EL2 | EL1 | EL1 EL2 | EL2 | DC, 60 Hz, 120 Hz |
| 4 | 60 | EL1 EL2 | EL1 EL2 | EL1 EL2 | EL1 EL2 | EL1 EL2 | EL1 EL2 | EL1 EL2 | EL1 EL2 | 120 Hz |

Note that only four phases are necessary since phases 5 through 8 repeat the first four phases. The reason the illustration is given this way is to normalize two-element operation and four-element operation so that the same program may be utilized for both embodiments with very little variation.

Another example illustrated in Table 6 below shows the 8 half-cycle sequences, numbered phase 1 through phase 8, and which elements are powered during each phase, for a four-element heater. The DC component is nulled in the same way the two-element heater described above.

TABLE 6

Four Element Heater High Frequency Modes

| Mode | POWER | $\Phi_1$ | $\Phi_2$ | $\Phi_3$ | $\Phi_4$ | $\Phi_5$ | $\Phi$ | $\Phi_7$ | $\Phi_8$ | FREQs |
|---|---|---|---|---|---|---|---|---|---|---|
| 0 | 0 | | | | | | | | | none |
| 1 | 15 | EL1 | | EL2 | | EL3 | | EL4 | | DC, 60 Hz, 120 Hz |
| 2 | 30 | EL1 | EL2 | EL3 | EL4 | EL1 | EL2 | EL3 | EL4 | 120 Hz |
| 3 | 45 | EL1 EL2 | EL3 | EL1 EL4 | EL2 | EL3 EL4 | EL1 | EL3 EL2 | EL4 | DC, 60 Hz, 120 Hz |
| 4 | 60 | EL1 EL2 | EL3 EL4 | EL1 EL2 | EL3 EL4 | EL1 EL2 | EL3 EL4 | EL1 EL2 | EL3 EL4 | 120 Hz |
| 5 | 75 | EL1 EL2 EL3 | EL4 EL1 | EL2 EL3 EL4 | EL1 EL2 | EL3 EL4 EL1 | EL2 EL3 | EL4 EL1 EL2 | EL3 EL4 | DC, 60 Hz, 120 Hz |
| 6 | 90 | EL1 EL2 EL3 | EL1 EL2 EL4 | EL1 EL3 EL4 | EL2 EL3 EL4 | EL1 EL2 EL3 | EL1 EL2 EL4 | EL1 EL3 EL4 | EL2 EL3 EL4 | 120 Hz |
| 7 | 105 | EL1 EL2 EL3 EL4 | EL1 EL2 EL3 EL4 | EL1 EL2 EL3 EL4 | EL1 EL2 EL3 EL4 | EL1 EL2 EL3 EL4 | EL1 EL3 EL4 | EL1 EL2 EL3 EL4 | EL2 EL3 EL4 | DC, 60 Hz, 120 Hz |
| 8 | 120 | EL1 EL2 EL3 EL4 | EL1 EL2 EL3 EL4 | EL1 EL2 EL3 EL4 | EL1 EL2 EL3 EL4 | EL1 EL2 EL3 EL4 | EL1 EL2 EL3 EL4 | EL1 EL2 EL3 EL4 | EL1 EL2 EL3 EL4 | 120 Hz |

A separate control program calculates a new value for POWER each ½ second and POWER to the power modulator program. Since POWER ranges 0 to 60 and 0 to 120, respectively, for the two and four element embodiments, the control program can specify power to a resolution of 1.7% and 0.83%, respectively. The resolution of the high frequency section of the modulator is coarse and the following explanation tells how the 25% resolution and 12.5% resolution of the high frequency power modulator is used to provide the 1.7% and 0.83% resolution specified by POWER.

An example illustrated in Table 7 below shows how the value POWER=31 is delivered to the heating elements by the power modulator. The nearest modes are mode 2 (30/120) and mode 3 (45/120). The following sequence indicates how the desired value for POWER is produced. Every half second the mode output is reversed to cancel the possible DC component. At the end of 7.5 seconds, this sequence repeats.

TABLE 7

| Time (seconds) | Mode Output | Power Delivered (Average) |
|---|---|---|
| 0.0000 | 2 | 30 |
| 0.0667 | 2 | 30 |
| 0.1333 | 2 | 30 |
| 0.2000 | 2 | 30 |
| 0.2667 | 2 | 30 |
| 0.3333 | 2 | 30 |
| 0.4000 | 2 | 30 |
| 0.4667 | 2 | 30 |
| 0.5333 | Reverse 2 | 30 |
| 0.6000 | Reverse 2 | 30 |
| 0.6667 | Reverse 2 | 30 |
| 0.7333 | Reverse 2 | 30 |
| 0.8000 | Reverse 2 | 30 |
| 0.8667 | Reverse 2 | 30 |
| 0.9333 | Reverse 2 | 30 |
| 1.0000 | Reverse 2 | 30 |
| 1.0667 | 2 | 30 |

TABLE 7-continued

| Time (seconds) | Mode Output | Power Delivered (Average) |
|---|---|---|
| 1.1333 | 2 | 30 |
| 1.2000 | 2 | 30 |
| 1.2667 | 2 | 30 |
| 1.3333 | 2 | 30 |
| 1.4000 | 2 | 30 |
| 1.4667 | 2 | 30 |
| 1.5333 | Reverse 2 | 30 |
| 1.6000 | Reverse 2 | 30 |
| 1.6667 | Reverse 2 | 30 |
| 1.7333 | Reverse 2 | 30 |
| 1.8000 | Reverse 2 | 30 |
| 1.8667 | Reverse 2 | 30 |
| 1.9333 | Reverse 2 | 30 |
| 2.0000 | Reverse 2 | 30 |
| 2.0667 | 2 | 30 |
| 2.1333 | 2 | 30 |
| 2.2000 | 2 | 30 |
| 2.2667 | 2 | 30 |
| 2.3333 | 2 | 30 |
| 2.4000 | 2 | 30 |
| 2.4667 | 2 | 30 |
| 2.5333 | Reverse 2 | 30 |
| 2.6000 | Reverse 2 | 30 |
| 2.6667 | Reverse 2 | 30 |
| 2.7333 | Reverse 2 | 30 |
| 2.8000 | Reverse 2 | 30 |
| 2.8667 | Reverse 2 | 30 |
| 2.9333 | Reverse 2 | 30 |
| 3.0000 | Reverse 2 | 30 |
| 3.0667 | 2 | 30 |
| 3.1333 | 2 | 30 |
| 3.2000 | 2 | 30 |
| 3.2667 | 2 | 30 |
| 3.3333 | 2 | 30 |
| 3.4000 | 2 | 30 |
| 3.4667 | 2 | 30 |
| 3.5333 | Reverse 2 | 30 |
| 3.6000 | Reverse 2 | 30 |
| 3.6667 | Reverse 2 | 30 |
| 3.7333 | Reverse 2 | 30 |
| 3.8000 | Reverse 2 | 30 |

TABLE 7-continued

| Time (seconds) | Mode Output | Power Delivered (Average) |
|---|---|---|
| 3.8667 | Reverse 2 | 30 |
| 3.9333 | Reverse 2 | 30 |
| 4.0000 | Reverse 2 | 30 |
| 4.0667 | 2 | 30 |
| 4.1333 | 2 | 30 |
| 4.2000 | 2 | 30 |
| 4.2667 | 2 | 30 |
| 4.3333 | 2 | 30 |
| 4.4000 | 2 | 30 |
| 4.4667 | 2 | 30 |
| 4.5333 | Reverse 2 | 30 |
| 4.6000 | Reverse 2 | 30 |
| 4.6667 | Reverse 2 | 30 |
| 4.7333 | Reverse 2 | 30 |
| 4.8000 | Reverse 2 | 30 |
| 4.8667 | Reverse 2 | 30 |
| 4.9333 | Reverse 2 | 30 |
| 5.0000 | Reverse 2 | 30 |
| 5.0667 | 2 | 30 |
| 5.1333 | 2 | 30 |
| 5.2000 | 2 | 30 |
| 5.2667 | 2 | 30 |
| 5.3333 | 2 | 30 |
| 5.4000 | 2 | 30 |
| 5.4667 | 2 | 30 |
| 5.5333 | Reverse 2 | 30 |
| 5.6000 | Reverse 2 | 30 |
| 5.6667 | Reverse 2 | 30 |
| 5.7333 | Reverse 2 | 30 |
| 5.8000 | Reverse 2 | 30 |
| 5.8667 | Reverse 2 | 30 |
| 5.9333 | Reverse 2 | 30 |
| 6.0000 | Reverse 2 | 30 |
| 6.0667 | 2 | 30 |
| 6.1333 | 2 | 30 |
| 6.2000 | 2 | 30 |
| 6.2667 | 2 | 30 |
| 6.3333 | 2 | 30 |
| 6.4000 | 2 | 30 |
| 6.4667 | 2 | 30 |
| 6.5333 | Reverse 2 | 30 |
| 6.6000 | Reverse 2 | 30 |
| 6.6667 | Reverse 2 | 30 |
| 6.7333 | Reverse 2 | 30 |
| 6.8000 | Reverse 2 | 30 |
| 6.8667 | Reverse 2 | 30 |
| 6.9333 | Reverse 2 | 30 |
| 7.0000 | 3 | 30.125 |
| 7.0667 | 3 | 30.250 |
| 7.1333 | 3 | 30.375 |
| 7.2000 | 3 | 30.500 |
| 7.2667 | 3 | 30.625 |
| 7.3333 | 3 | 30.750 |
| 7.4000 | 3 | 30.875 |
| 7.4667 | 3 | 31 |

Figure 11:
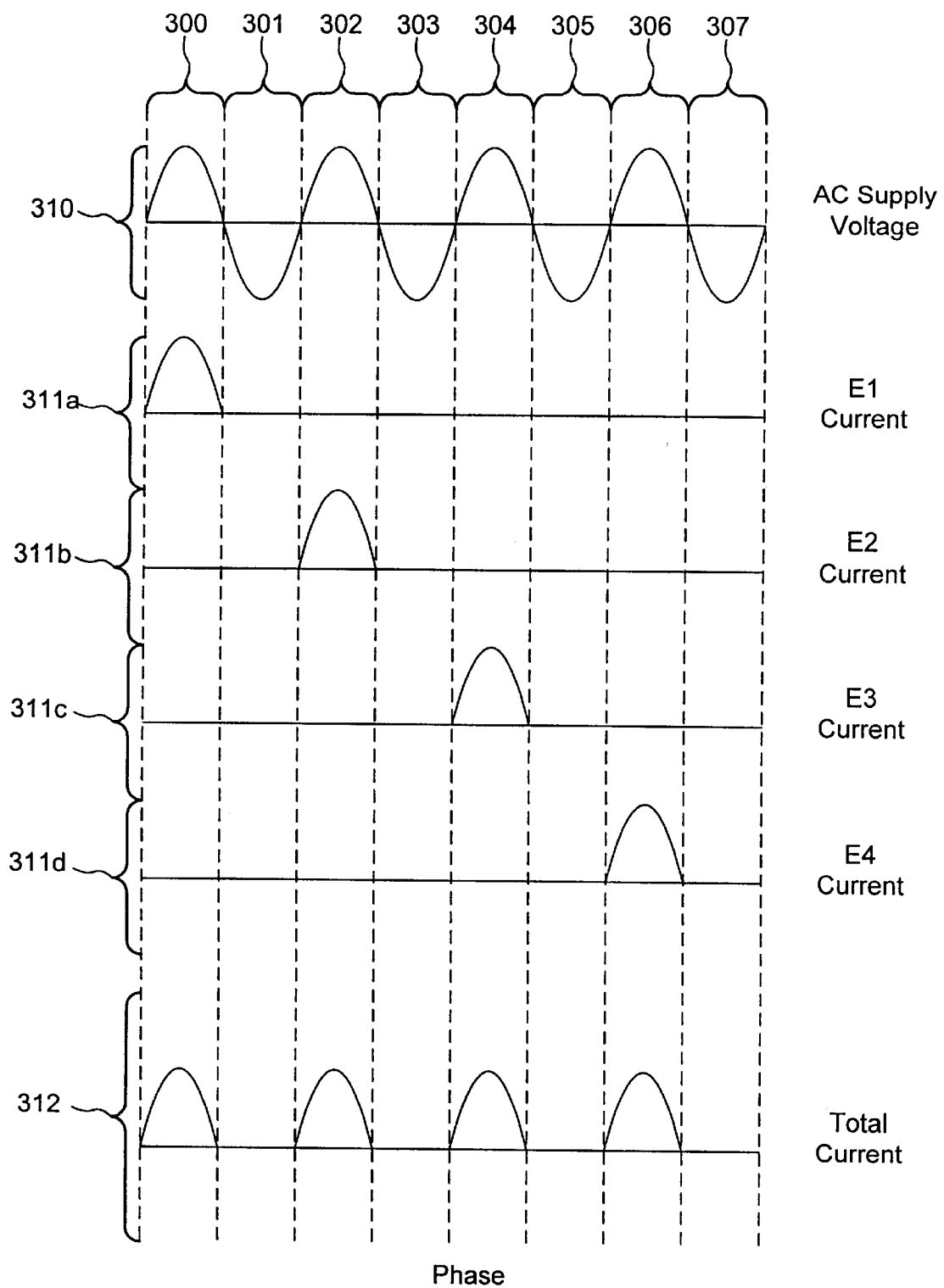
FIG. 11 is a schematic diagram of 15/120 power demand waveforms of the digital power modulator.

Referring to FIG. 11, a schematic diagram of 15/120 power demand waveforms of the digital power modulator are illustrated. A period of eight half-cycles of the power supply frequency comprises eight phases represented by the numerals 300–307. The AC line voltage waveform 310 for AC supply 220 of FIG. 2 appears as a reference for element 1, element 2, element 3, and element 4 current waveforms 311a–311d, respectively. AC supply current waveform 312 represents the total current drawn from power supply 220 for each of the eight phases 300–307 for a power demand of 15/120. Current, and therefore power, is distributed equally across all four elements 5a–5d of FIG. 1 as illustrated by element current waveforms 311a–311d, respectively. It may be noted that the load current waveform 312 contains half cycles of one polarity only, impressing a net DC component onto the AC supply. Any adverse effects of DC to the AC supply 220 are canceled by reversing the polarity of the load current waveform 312 every half second, as explained in more detail hereinbelow.

Figure 12:
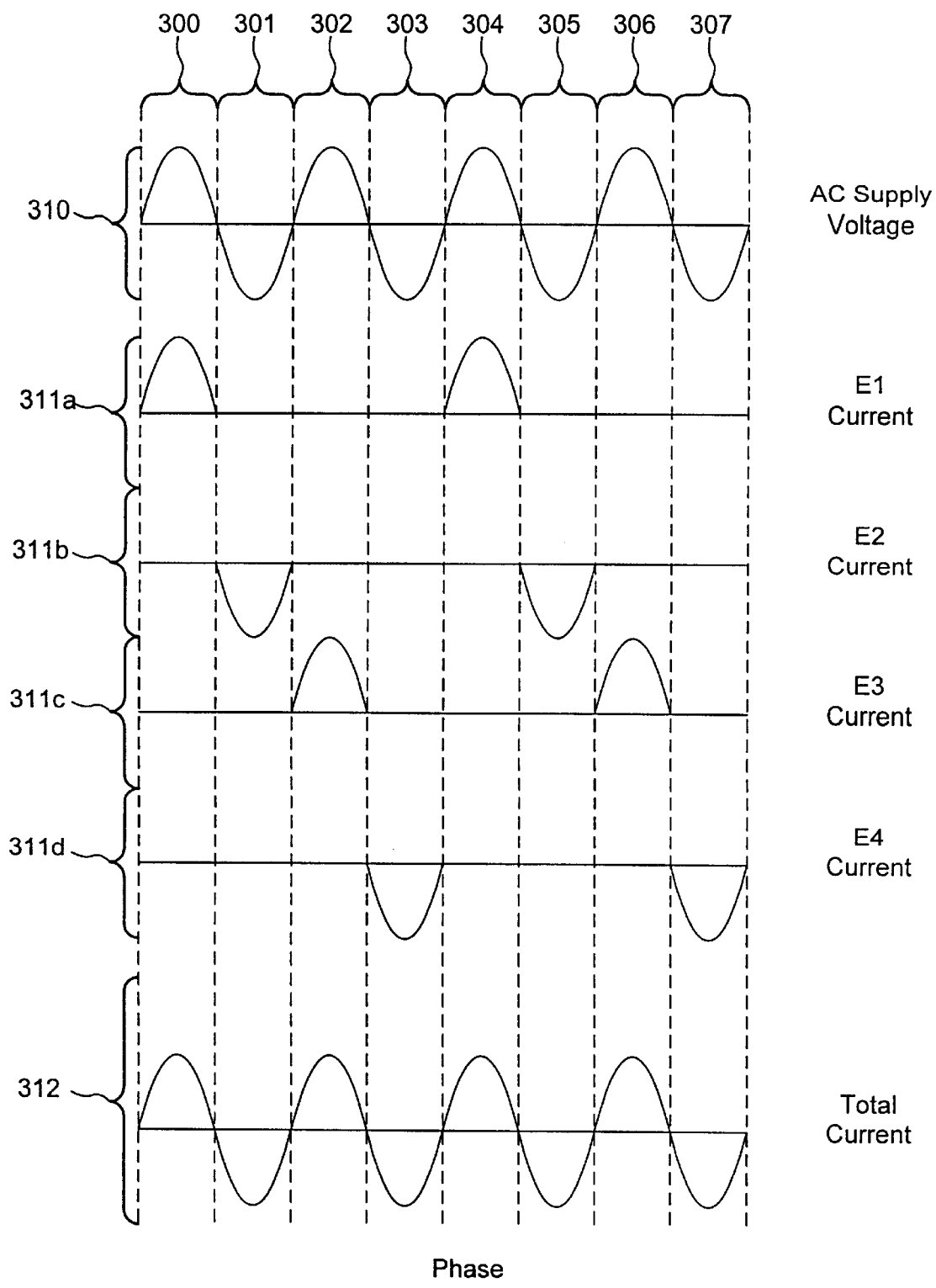
FIG. 12 is a schematic diagram of 30/120 power demand waveforms of the digital power modulator.

Referring to FIG. 12, a schematic diagram of 30/120 power demand waveforms of the digital power modulator is illustrated. In a manner similar to FIG. 11, the waveforms in FIG. 12 illustrate the element current waveforms 311a–311d for a power requirement of 30/120. Element 1, element 2, element 3, and element 4 current waveforms 311a–311d, respectively, illustrate the application of equal power distribution while load current waveform 312 illustrates an unvarying amplitude across all eight phases 300–307 with no DC component and with an AC component that of the power supply frequency.

Figure 13:
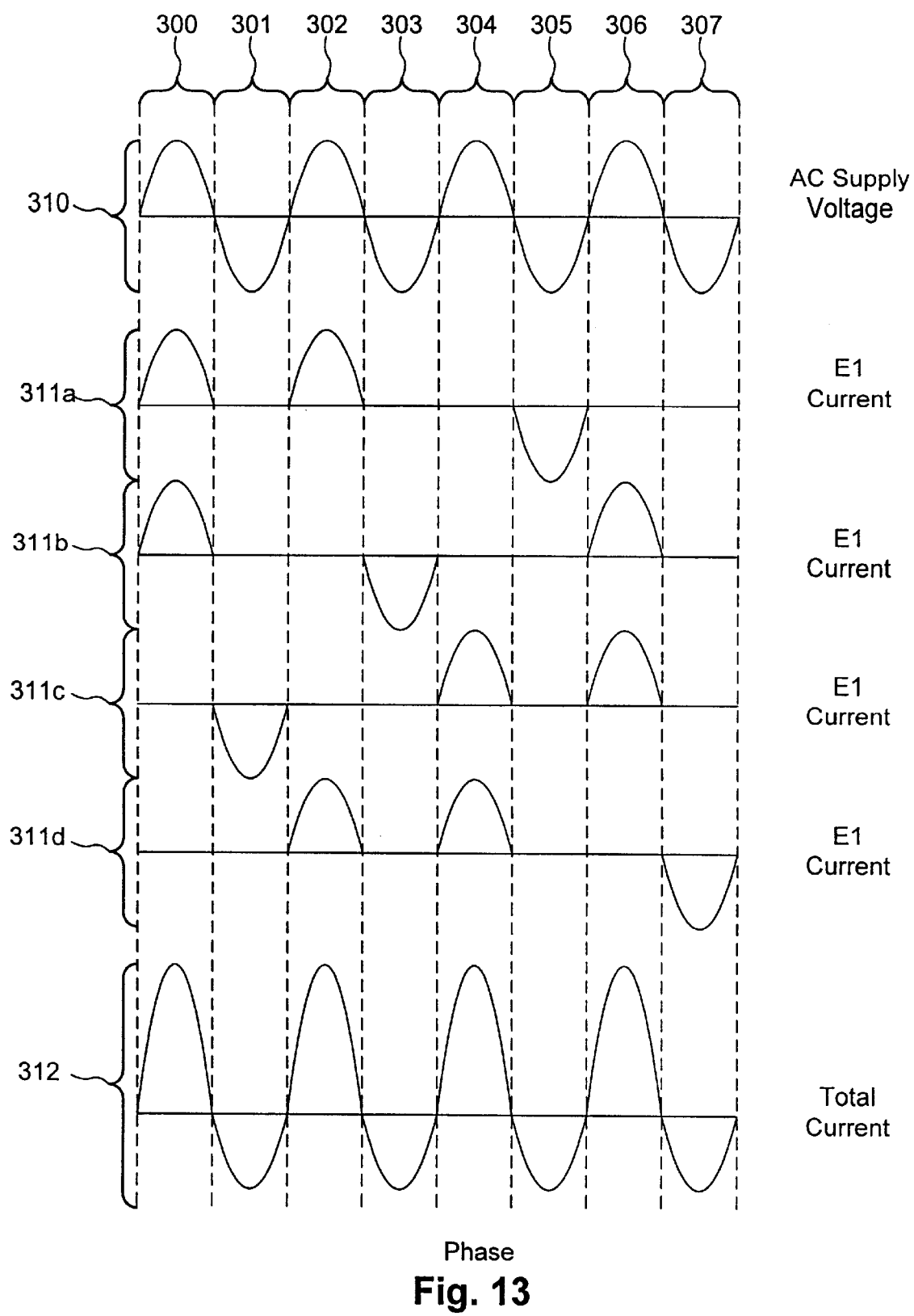
FIG. 13 is a schematic diagram of 45/120 power demand waveforms of the digital power modulator.

Referring to FIG. 13, a schematic diagram of 45/120 power demand waveforms of the digital power modulator is illustrated. In a manner similar to FIG. 11, the waveforms in FIG. 13 illustrate the element current waveforms 311a–311d for a power requirement of 45/120. Element 1, element 2, element 3, and element 4 current waveforms 311a–311d, respectively, illustrate the application of equal power distribution while load current waveform 312 reflects a current with a DC component and with an AC component at the AC supply frequency.

Figure 14:
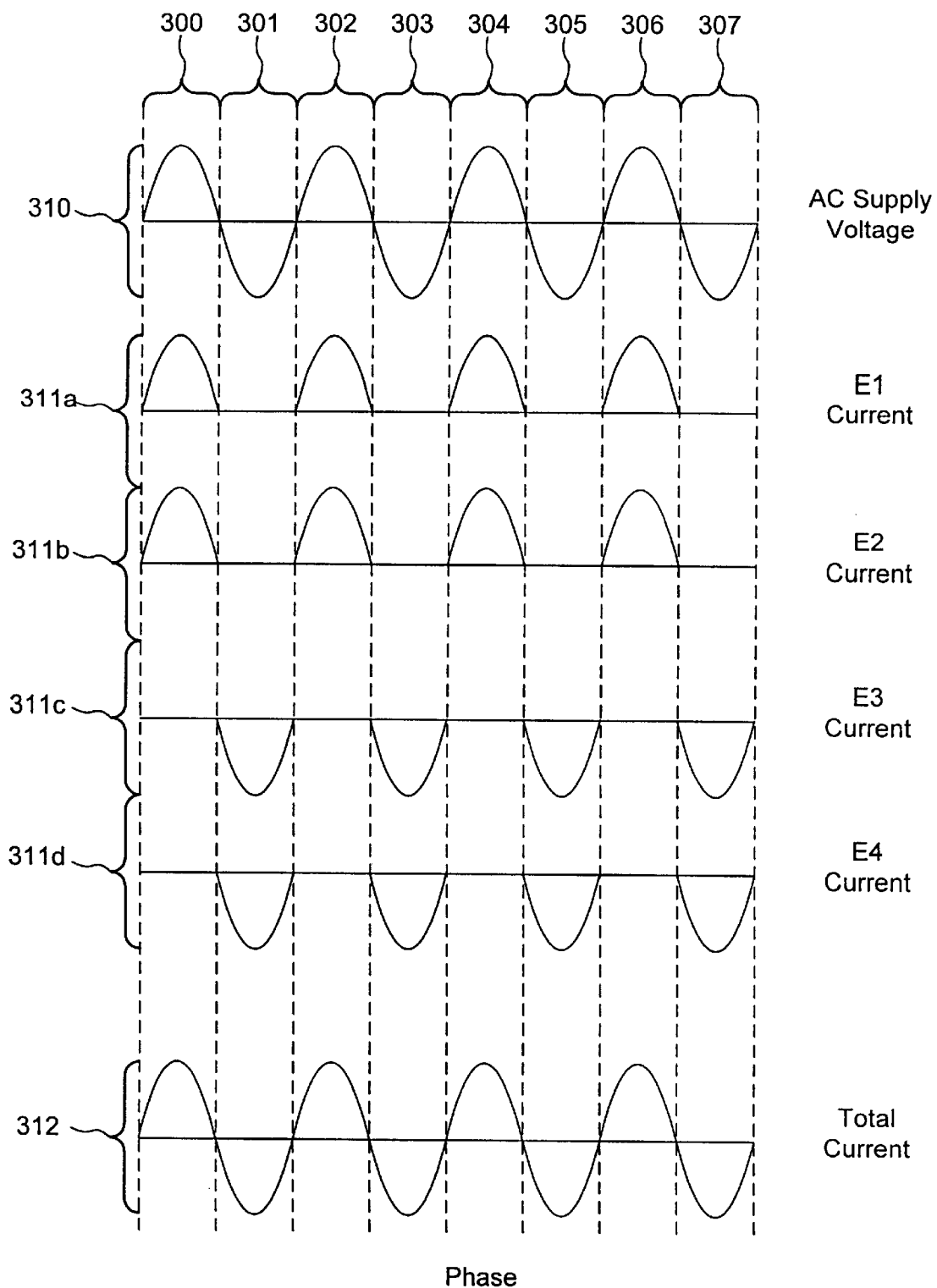
FIG. 14 is a schematic diagram of 60/120 power demand waveforms of the digital power modulator.

Referring to FIG. 14, a schematic diagram of 60/120 power demand waveforms of the digital power modulator is illustrated. In a manner similar to FIG. 11, the waveforms in FIG. 14 illustrate the element current waveforms 311a–311d for a power requirement of 60/120. Element 1, element 2, element 3, and element 4 current waveforms 311a–311d, respectively, illustrate the application of equal power distribution while load current waveform 312 illustrates an unvarying amplitude across all eight phases 300–307 with no DC component and with an AC component that of the AC supply frequency.

Figure 15:
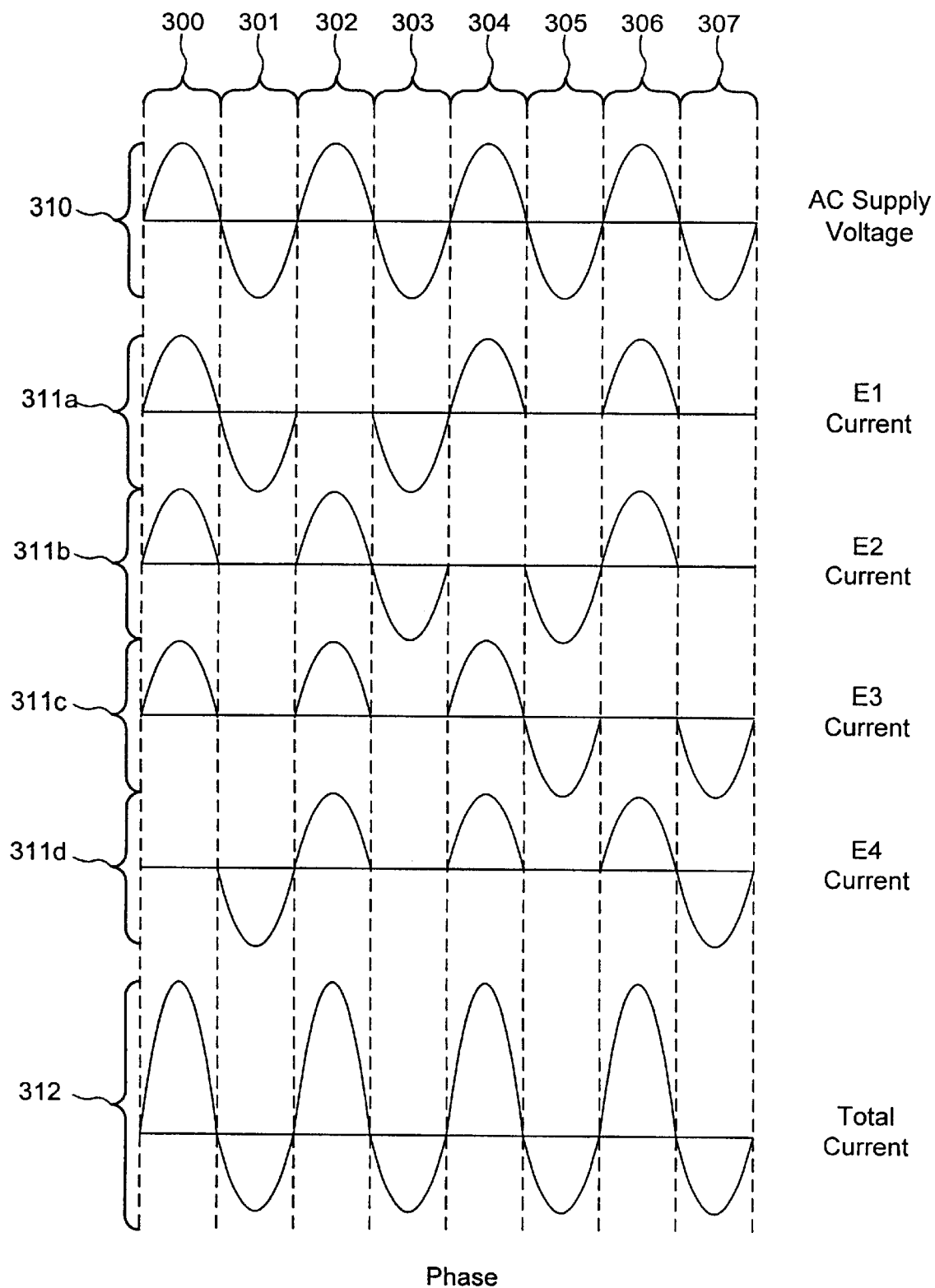
FIG. 15 is a schematic diagram of 75/120 power demand waveforms of the digital power modulator.

Referring to FIG. 15, a schematic diagram of 75/120 power demand waveforms of the digital power modulator is illustrated. In a manner similar to FIG. 11, the waveforms in FIG. 15 illustrate the element current waveforms 311a–311d for a power requirement of 75/120. Element 1, element 2, element 3, and element 4 current waveforms 311a–311d respectively, illustrate the application of equal power distribution while load current waveform 312 reflects a current with a DC component and with an AC component at the AC supply frequency.

Figure 16:
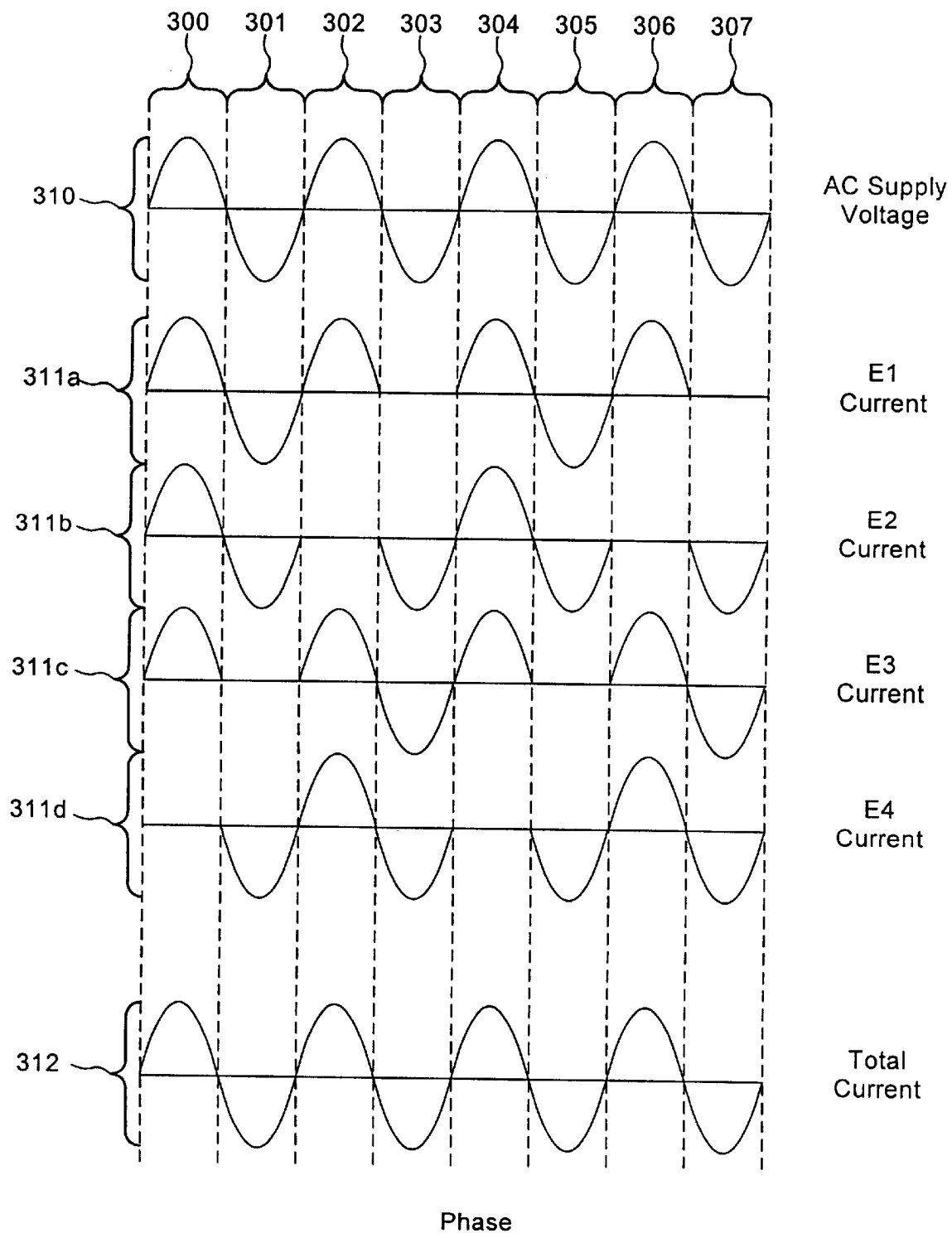
FIG. 16 is a schematic diagram of 90/120 power demand waveforms of the digital power modulator.

Referring to FIG. 16, a schematic diagram of 90/120 power demand waveforms of the digital power modulator is illustrated. In a manner similar to FIG. 11, the waveforms in FIG. 16 illustrate the element current waveforms 311a–311d for a power requirement of 90/120. Element 1, element 2, element 3, and element 4 current waveforms 311a–311d respectively, illustrate the application of equal power distribution while load current waveform 312 illustrates an unvarying amplitude across all eight phases 300–307 with no DC component and with an AC component that of the AC supply frequency.

Figure 17:
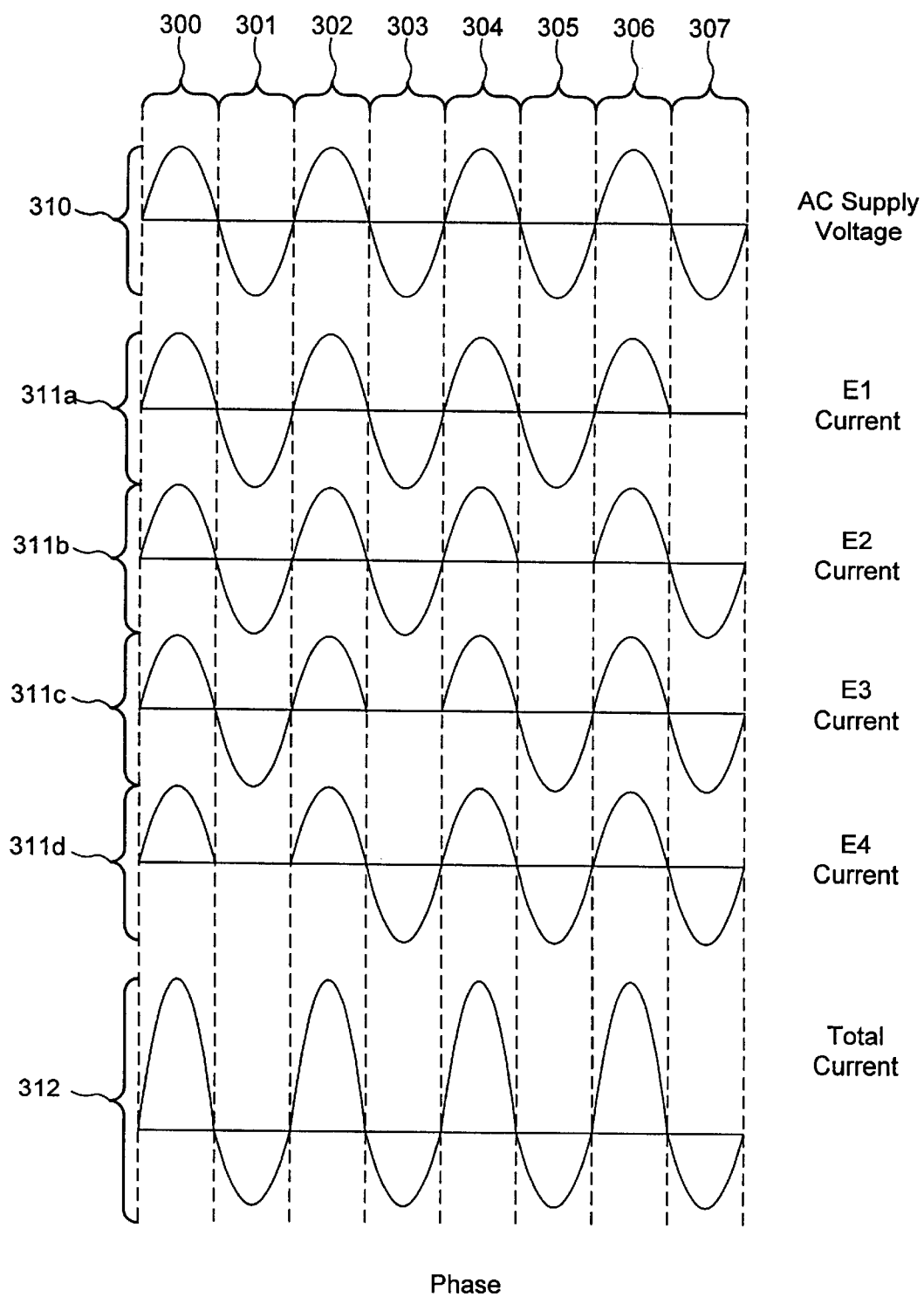
FIG. 17 is a schematic diagram of 105/120 power demand waveforms of the digital power modulator.

Referring to FIG. 17, a schematic diagram of 105/120 power demand waveforms of the digital power modulator is illustrated. In a manner similar to FIG. 11, the waveforms in FIG. 17 illustrate the element current waveforms 311a–311d for a power requirement of 105/120. Element 1, element 2, element 3, and element 4 current waveforms 311a–311d, respectively, illustrate the application of equal power distribution while load current waveform 312 reflects a current with a DC component and with an AC component at the AC supply frequency.

Figure 18:
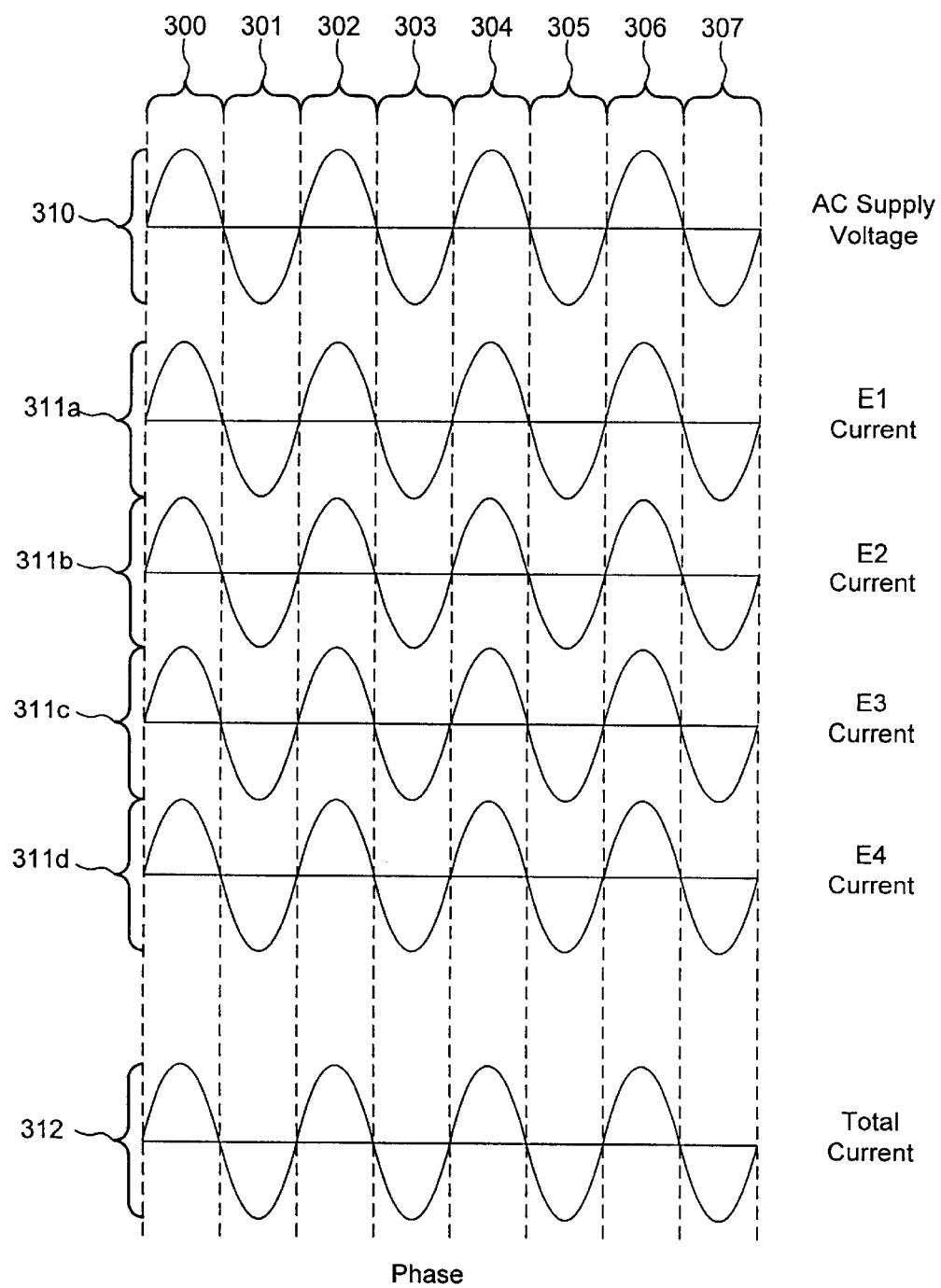
FIG. 18 is a schematic diagram of 120/120 power demand waveforms of the digital power modulator.

Referring to FIG. 18, a schematic diagram of 120/120 power demand waveforms of the digital power modulator is illustrated. In a manner similar to FIG. 11, the waveforms in FIG. 18 illustrate the element current waveforms 311a–311d for a power requirement of 120/120. Element 1, element 2, element 3, and element 4 current waveforms 311a–311d, respectively, illustrate the application of equal power distribution while load current waveform 312 illustrates an unvarying amplitude across all eight phases 300–307 with no DC component and with an AC component that of the AC supply frequency.

Low-Power Standby

The preferred embodiment of the invention has a very low-power standby control mode referred to hereinafter as the "Standby State." The Fluid Heater of the preferred embodiment enters the Standby State when no fluid, for example water, flow has been detected after a short period of time. The purpose of the Standby State is to save energy when the heater is not being used to heat the fluid due to flow. The embodiment of the invention uses a routine that keeps the heater in a standby state until fluid flow is detected, such as occurs in a household installation when a hot-water faucet is opened.

The very low-power standby control also allows the Fluid Heater in the Standby State to recognize quickly a flow of water and thus to transition into a heating (control) mode thereby producing hot water almost immediately. The very low-power standby control operates automatically by using the fact that less dense warm fluid rises above more dense cooler fluid.

Fluid is not flowing while the heater is in the Standby State. When the Fluid Heater control transitions from heating with fluid flowing to the Standby State with no fluid flow, the fluid inside the heater is kept above the ambient temperature because the fluid in the heater is slightly heated as described hereinbelow.

In the Standby State, there is no flow and heat from the fluid rises to the top of the Fluid Heater. As long as the no-flow condition exists and the fluid temperature is above ambient temperature, the temperatures of the fluid at the top of the heater will be above the temperatures at the bottom. The difference between the temperature measured by thermistor 7b at the top of the heating chamber and thermistor 7c at the bottom of the heating chamber is called the temperature gradient. The temperature gradient is positive as long as fluid is warmer at the top of the heating chamber.

There are three values of the temperature gradient that are important. The three important gradient values are called the zero, the lower and the upper limit, measured in degrees. The zero limit applies when the gradient is zero so there is no temperature difference between top and bottom temperatures. Both the lower and upper limits are positive values with the upper greater than the lower. Specific values chosen for the limits will influence the energy consumption during standby and also the sensitivity to identifying the start of fluid flow and the need to heat the flowing fluid.

The specific values of the lower and the upper limit may differ by as little as one degree Fahrenheit in the preferred embodiment of the invention. It is possible to maintain this slight difference accurately because the thermistors can be calibrated and matched exactly as explained hereinbelow.

Consider the normal operation of the heater with a faucet or valve open and then subsequently the faucet or valve is closed to prevent fluid flow through the heater. After the fluid stops flowing, a large positive temperature gradient quickly forms as measured by the thermistor at the top of the heating chamber and thermistor at the bottom of the heating chamber. As time passes, heat is transferred to the surroundings from the stationary fluid and the temperatures fall toward ambient which decreases the temperature gradient. Eventually the gradient falls to less than the lower limit. (The normal temperature stratification in conditioned air space can often provide the small gradient required, thus minimizing the energy required during the Standby State.)

When the temperature gradient falls below the lower limit, the microcontroller control program periodically applies a very small amount of current to the heating element in the heating chamber to heat the fluid slightly. Provided the fluid flow remains zero, this heating increases the temperature gradient. The small amount of heating continues until the temperature gradient rises to the upper limit. Typically, the upper temperature gradient is a small value (say 1 or 2 degrees Fahrenheit). Thus, as a result of this improved low-power standby control, very little energy is required by the fluid heater to maintain the fluid temperature above ambient and therefore there is very little energy lost to the surroundings.

When a faucet or valve is opened and flow begins again, the warmer fluid at the top of the heater is carried away from the top thermistor causing the temperature gradient to decrease. Fluid flow pulls the warm fluid from the top of the heater toward the bottom as it progresses from tube to tube through the heater. Due to the flow, the temperature measured by top thermistor drops toward the inlet temperature (ambient) and the temperature measured by bottom thermistor warms thereby decreasing the temperature gradient. As the gradient drops below the lower limit, the small amount of heating begins in an attempt to raise the gradient to the upper limit. As the small amount of energy warms the fluid, the flow pulls the warming fluid downward faster than the density change can drive it upward. The result is that the gradient soon becomes negative indicating a flow of fluid and the end of the Standby State.

If the flow rate is very small, such as a drip caused by a leaking faucet, some of the flow moves through the bypass air-vent holes in the top of the heater. The heater vent-air holes are described in commonly owned U.S. Pat. No. 5,866,880 to Seitz, and is incorporated by reference herein. Because the fluid bypasses the bottom thermistor, the temperature measured at the bottom thermistor remains relatively constant while the inlet fluid causes the temperature at the top thermistor to decrease thereby decreasing the temperature gradient. As long as the small drip continues and the flow bypasses, the temperature gradient will remain non-negative and the heater will not leave the Standby State. This prevents the heater from wasting energy by heating the fluid that drips. This is a significant advantage over standard fluid heating systems. The only waste during a drip flow is the small energy injected to maintain the temperature gradient below the upper threshold limit.

Water Level Detection

As a safety feature, water-level detection in the fluid Heater is important to keep the heater from powering the elements 5a–5d when there is insufficient water surrounding the element. The elements have a "cold section" near the top (approximately 1 ½ inches for the standard elements used in the preferred embodiment) of the element below the threaded plug region, and low-water level needs to be sensed when the water level falls below approximately this level. Conductive screws 9a and 9b (FIG. 1) at the top of the heater 1 are installed down into the fluid to the appropriate level. If the fluid is filled to the proper level, the metal probes 9a and 9b via the water-level detection circuitry and the processor program serve to sense the presence of the water. The level-sensing is achieved by monitoring the changes in a signal applied to the sensing circuit due to the impedance of the water.

Water containing minerals is a conductor of electricity. Placing a metal object in normal ground water results in a voltage potential being generated on that metal object. This galvanic potential will cause direct current to flow in a DC sensing circuit. This galvanic voltage, however, can interfere with proper water level detection in some circuits. The method used in the preferred embodiment of the heater eliminates direct connection of the probe to the level-detection circuitry because the metal probe is capacitively coupled to the sensing circuit.

In the preferred embodiment, the microcontroller Pulse Width Modulation (PWM) capability is used by the program to create a square wave at 32,768 Hz (signal line 130 of FIG. 2) which is used by the detection circuit of FIG. 4. The square wave is input to the circuit through a resistor 241 to a capacitor 240, the other side of which is connected to the metal probes 9a, 9b. Where the resistor and capacitor mutually connect, a sensing circuit 242 is connected to react to the voltage at that point. A Schmitt trigger 246 inverting logic gate is used as the sensing circuit. If the metal probe 9a, 9b causes the signal 144 to the sensing circuit to be diminished in amplitude because of low impedance conduction to ground through the water at that frequency, the sensing circuit output 148 will be LOW. However, if a probe 9a, (9b if there are two probes) are out of the water, then the 32.768 kHz signal 144 is passed to the output 148 and then passed to the CPU 100.

When the water level is low, the processor sampling the detected signal at various random times will receive approximately equal samples of logic HIGH and logic LOW levels. The detection of this square wave 148 by the processor is interpreted by the program to mean that the water level is below normal as would be the case when air is in the system, for example.

In normal operation with the water-level adequate and the metal probes 9a and 9b touching the fluid (e.g., water), that fluid provides a conductive path to ground, so the capacitors 240 and 243 in the detection circuit are grounded, producing an RC low-pass filter. After filtering, the 32.768 kHz signal appears at the output 148 as a varying DC level that exceeds the threshold of the Schmitt logic gate 246. The signal 148 to the processor will be a constant LOW-level, which the program will interpret as indicating the presence of water.

Water with low mineral content is conductive but poorly so. Cistern water or water from a reverse osmosis water purification system may approach distilled water in its poor conductive properties. This means of detection of water level still works because of the interpretation by the processor program. The poor conductivity of the fluid causes the Thevenin equivalent of a voltage divider going into the RC filter, resulting in an integration of the square wave and thus a triangle wave with a DC offset into the 2 input Schmitt gate 246 (with its narrow hystresis range) as a logic OR circuit, and by adjusting the values of the resistors and capacitors, the gate threshold can be set high enough so that the lowest points of the signal will be just above the threshold. When the input signal periodically dips below the input threshold, the output signal monitored by the processor will not be continuously LOW. These random input pulses will be input to the processor which uses a counter which is periodically reset to the decimal value 255 by the program. When the pulses decrement the counter to the decimal value 240 or below (a reduction of approximately 6 ¼%) the program will interpret this as the loss of water.

The sensitivity to water, given the variability of its conductivity, is controlled by the voltage divider effect in this circuit. The value for the resistor 241, 244 must be large in order to be sensitive to low-mineral-content water. The capacitor 240, 243 chosen must be small so as to block dc and low-frequency interference as might be caused by electrical noise in the water caused by the AC supply potential at 50 Hz or 60 Hz. The DC interference is the already mentioned galvanic potential.

If a small AC (50 or 60 Hz) signal is present in the water, the water level detection circuit can be affected by the ac signal, if the capacitor is not sized properly. The proper choice of capacitance and resistance combination in the detection circuit creates an RC high-pass filter that will reduce the ac voltage amplitude due to the attenuation caused by the filter. For example, placing the RC corner frequency at 15 kHz reduces a 60 Hz signal by 48 dB. This means the probe will exhibit about 22 MegOhms of reactance at 60 Hz and 50 K ohm at 32.768 kHz. Also, the 5V peak-to-peak signal of the square wave will produce about 20 uA of drive current to the sensing circuit while 240VAC at 60 Hz will only produce about 4 uA.

Thus, AC signals caused by the supply voltage are blocked from the level detection circuitry due to the high-pass filtering effect of the circuit However, such signals are in fact detected with another circuit. By capacitively coupling to the metal probe 9a with a high impedance RC filter 247 (high-pass filter), detection of sufficient amplitude 50 Hz or 60 Hz signals is possible to allow detection of this AC component while still allowing proper level detection.

Figure 19:
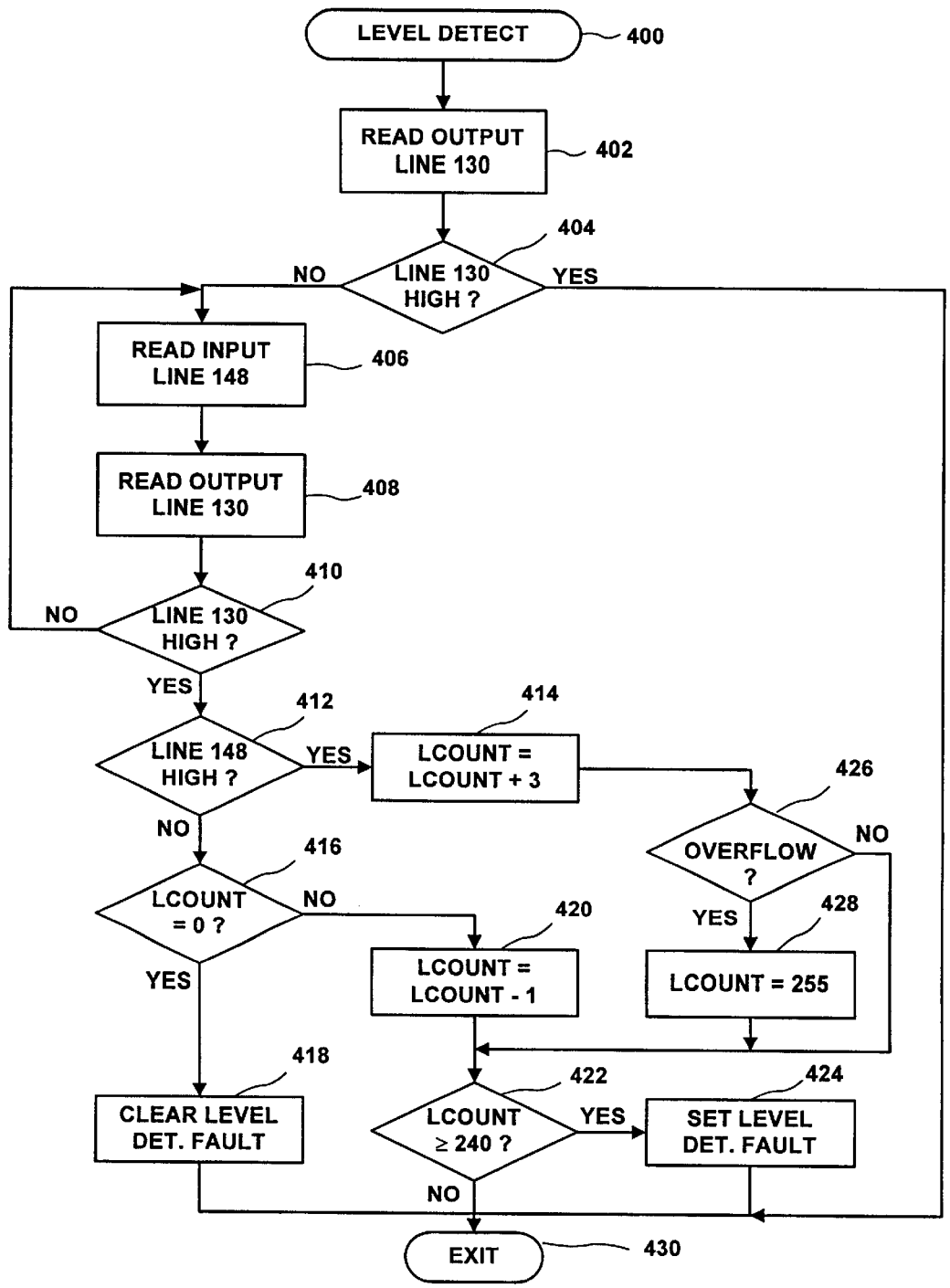
FIG. 19 is a schematic flow diagram of a fluid level detection program.

Referring to FIG. 19, a schematic flow diagram of a fluid level detect program is illustrated. The fluid level detect program works in conjunction with the level detect circuit 132 of FIG. 4. Referring to FIG. 4, it is desired to read the input line 148 driven by gate 246 when output line 130 has just transitioned from a logic low to a logic high level. As part of the main program loop, control is periodically transferred to level detect subroutine at entry point 400. From entry point 400 control proceeds to logic step 402 where the output port driving line 130 is read. From logic step 402, control proceeds to decision 404 where if the logic level of line 130 read in step 402 was high, control proceeds to logic step 430 and control returns to the main program loop. Otherwise, if the line read in step 402 was low, control proceeds to logic step 406 where input line 148 of FIG. 4 is read and saved. From logic step 406, control proceeds to logic step 408 where output line 130 of FIG. 4 is read. From logic step 408, control proceeds to logic step 410. If line 130 was not a logic high level, control loops back to logic step 406, otherwise control proceeds to logic step 412 where the condition of line 148 as read in logic step 406 is determined. If line 148 was a logic high level, control proceeds to logic step 414 where the contents of variable LCOUNT are replaced with the contents of variable LCOUNT plus the value 3. Otherwise, if line 148 was a logic low level, control proceeds to logic step 416 where variable LCOUNT is tested for zero value. If variable LCOUNT was zero, control proceeds to logic step 418 where the software flag representing a level detection fault is cleared. From logic step 418 control proceeds to logic step 430 and control returns to the main program loop MAINL. Otherwise, if variable LCOUNT was not zero at logic step 416, control proceeds to logic step 420 where the contents of variable LCOUNT are decremented by one. From logic step 420, flow proceeds to logic step 422 where the contents of variable LCOUNT are compared to the value 240, and if lesser, control proceeds to logic step 430 and control returns to main program loop MAINL without altering the status of the level detection fault flag. If, however, at logic step 422 the contents of variable LCOUNT are greater than or equal to the value 240, control proceeds to logic step 424 where the software flag representing a level detection fault is set. Referring back to logic step 414, control proceeds to logic step 426 where variable LCOUNT is tested for overflow, that is, having been incremented past a maximum value of 255. If not, control proceeds to logic step 422 as previously described. Otherwise, if overflow of variable LCOUNT has occurred, control proceeds to logic step 428 where variable LCOUNT is forced to a maximum value of 255. From logic step 428, control proceeds to logic step 422 as previously described.

Thus, when line 148 of FIG. 4 is at a steady low, indicating that both level detect lectrodes 9a and 9b of FIG. 2 are immersed, control flow allows variable LCOUNT to eventually decrement to zero and a no-fault condition is indicated. Otherwise, when line 148 of FIG. 4 is high, variable LCOUNT increments until a threshold of 240 is reached or exceeded, indicating a level detection fault condition. This subroutine also provides a degree of noise immunity from hysterisis. When variable LCOUNT reaches or exceeds the threshold of 240, the level detection fault flag is set. However, variable LCOUNT must be decremented all the way back to zero before the level detection flag is cleared.

Thermistor Calibration

In the preferred embodiment, thermistors are used for measuring fluid temperature. It is particularly useful to use low-cost commodity type thermistors such as those used to monitor water temperatures in automobile engine blocks. The disadvantage in the past of the use of such thermistors is that there is often a significant deviation in the accuracy of one thermistor compared to another. For the present application, this deviation can represent as much as a 5 degree difference in the temperature value between thermistors measuring the same temperature. This difference does have a significant effect on the performance of a heater control system. This is particularly serious when the temperature relationship between different thermistors is used for control, emergency shut down, sensing flow/no flow conditions, and for maintaining temperature gradients in a standby condition.

Thus, calibration of such thermistors is necessary to obtain accurate readings of temperature for the system to provide output fluid at a predictable temperature and to monitor dynamic fluid conditions, as is necessary for domestic water heating. The microcontroller program uses these temperatures for control, high temperature limiting, and other purposes. Since the microcontroller program receives its temperature readings from the Analog to Digital converter (A/D) 124 (FIG. 2) via a Multiplexer (MUX) 194, these readings, as previously stated, are subject to variations that occur in the manufacturing process of the thermistors and the electronic components. Variations in these off-the-shelf components can cause a deviation of several degrees F. in the readings used by the microcontroller program from the thermistor readings even when the temperature of the fluid is the same throughout the heater. Since the microcontroller only needs digital values, the fluid temperature read from the thermistors can be "corrected" to any reasonable value via the calibration means to be described. This calibration provides nearly precise numbers to the control algorithm and thus allows precise temperature control not available via other means. Although the observed results are similar, the calibration described here is not the same as the thermistor matching or calibration done automatically upon system initialization as will be described in a later section of this document.

Sometimes the fluid heater will be called upon to provide fluid at or very near a specific temperature. This is often the case for process control or domestic water heating. Although the thermistors themselves are checked and calibrated at the factory, the thermistors may need to be calibrated in the field. For example, if a thermistor is changed in the field, re-calibration is desirable. In the preferred embodiment, if the thermistors need to be calibrated, they can be calibrated by a simple procedure that corrects for slight variations in thermistor readings.

To perform thermistor calibration, the heater is operated without applying heat to the heating elements. To prevent activating the heating elements, the high-limit thermostat circuit connection is opened. Fluid, at ambient temperature, is then allowed to flow through the unit. After the fluid flows for approximately 5 minutes or at such time that the temperature reading from each thermistor does not change, calibration can be achieved by issuing calibration commands to the system, i.e. ?CC then ?Cxxx where xxx represents the temperature of the fluid temperature to the nearest degree (i.e. xxx=076). The temperature value entered by the calibration command should be the ambient fluid temperature measured with a calibrated temperature reference device. Note that generally this procedure will be performed at the factory since it requires a communications unit to be attached to the heater to allow input of the calibration command.

Note: The calibration value is held in the EEPROM 128 (Electrically Erasable Read Only Memory). The calibration procedure just described will change the existing calibration value. The EEPROM 128 will retain this new calibration value until the thermistors are calibrated again.

Matching of Thermistors Using Multifunction Button

The preferred embodiment of the heater will contain multiple thermistors 7a–7e (FIG. 1) to monitor the temperature of the fluid in different locations within the fluid heater. When the fluid heater is sent from the factory, each thermistor reading has been accurately calibrated to indicate the correct temperature of the fluid it is measuring. In some cases, it may be necessary to adjust the readings of the thermistors and associated electronics. This would occur when a thermistor is replaced in the field, for example. A further feature of the invention provides a means for precisely matching the thermistor readings. The procedure to adjust the thermistor readings to the same value requires flowing fluid that is at a constant temperature through the heater so that the fluid temperature is the same at each thermistor. This procedure is called Thermistor Matching. This term is used to differentiate Matching from Thermistor Calibration.

To perform thermistor matching, the heater is operated without applying heat to the heating elements. To prevent activating the heating elements, the high-limit thermostat 8a, 8b circuit connection is opened. Fluid, at ambient temperature, is then allowed to flow through the unit. After the fluid flows for approximately 5 minutes or at such time that the temperature reading from each thermistor has stabilized and does not change (if these temperatures are being monitored by an attached communications unit) it can be assumed that the fluid is at the same temperature throughout the unit. At that time, the Multifunction Pushbutton 150 (FIG. 2) the circuit board should be depressed and held depressed for approximately six seconds. This causes a routine to execute in the processor that performs matching. The audible annunciator 160 on the circuit board will buzz a low tone to indicate that the matching has been accepted and performed.

The matching operation causes the average of the temperatures read by the multiple thermistors to be computed when the Multifunction Pushbutton 150 is pressed. An average is also computed when the Multifunction Pushbutton 150 is released. These two averages are compared. If the averages are the same, then the matching is acknowledged and performed. If matching is successful, each thermistor reading will have been adjusted to yield this average value by computing an offset for each thermistor.

For each thermistor, the matching algorithm uses a formula such as $$OFFSET = Tavg - Tmeasured + CALIBRATION\ OFFSET)$$

where OFFSET is the positive or negative numerical value to be added to the uncorrected thermistor reading, Tavg is the average of the temperatures read by all of the thermistors, and CALIBRATION OFFSET is the value of an offset that was determined by Thermistor Calibration. The OFFSET value for each thermistor is stored in the EEPROM 128 of the unit. It is a safety feature of the invention that if any OFFSET exceeds a positive or negative limiting value, it is considered a fault. A fault code indicates the failure of Thermistor Matching. These codes are described more fully hereinbelow.

As another safety feature, if the average is different between the two calculations, matching is not performed, and no low buzz will be heard. Also, if a thermistor is shorted or open, matching will not be performed. If a thermistor is shorted, open or out of an acceptable range, a numeric fault code will be indicated by the visible annunciator on the circuit board and matching will not be performed.

Figure 20A:
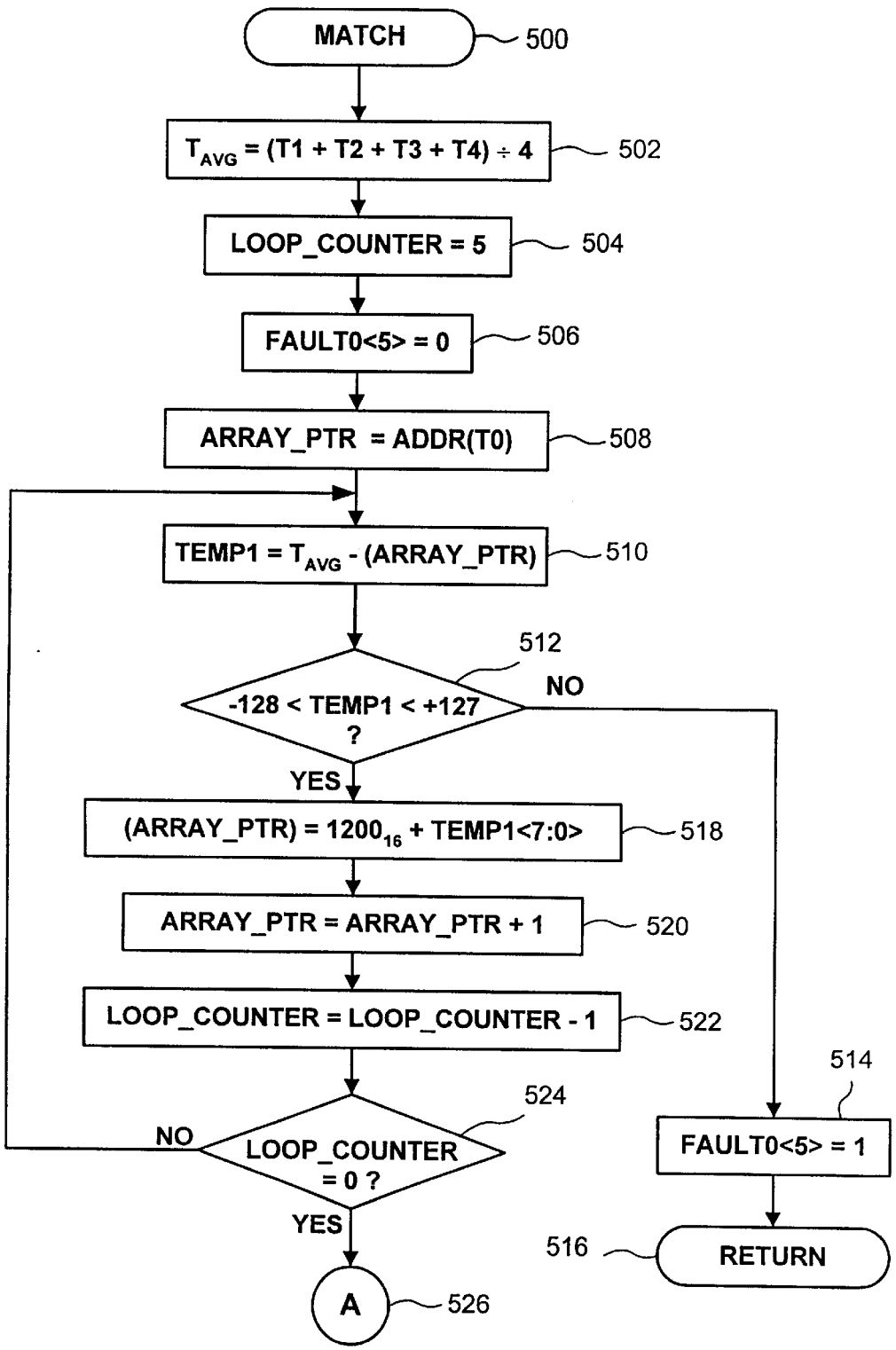
FIGS. 20a and 20b are a schematic flow diagram of a thermistor matching program.
Figure 20B:
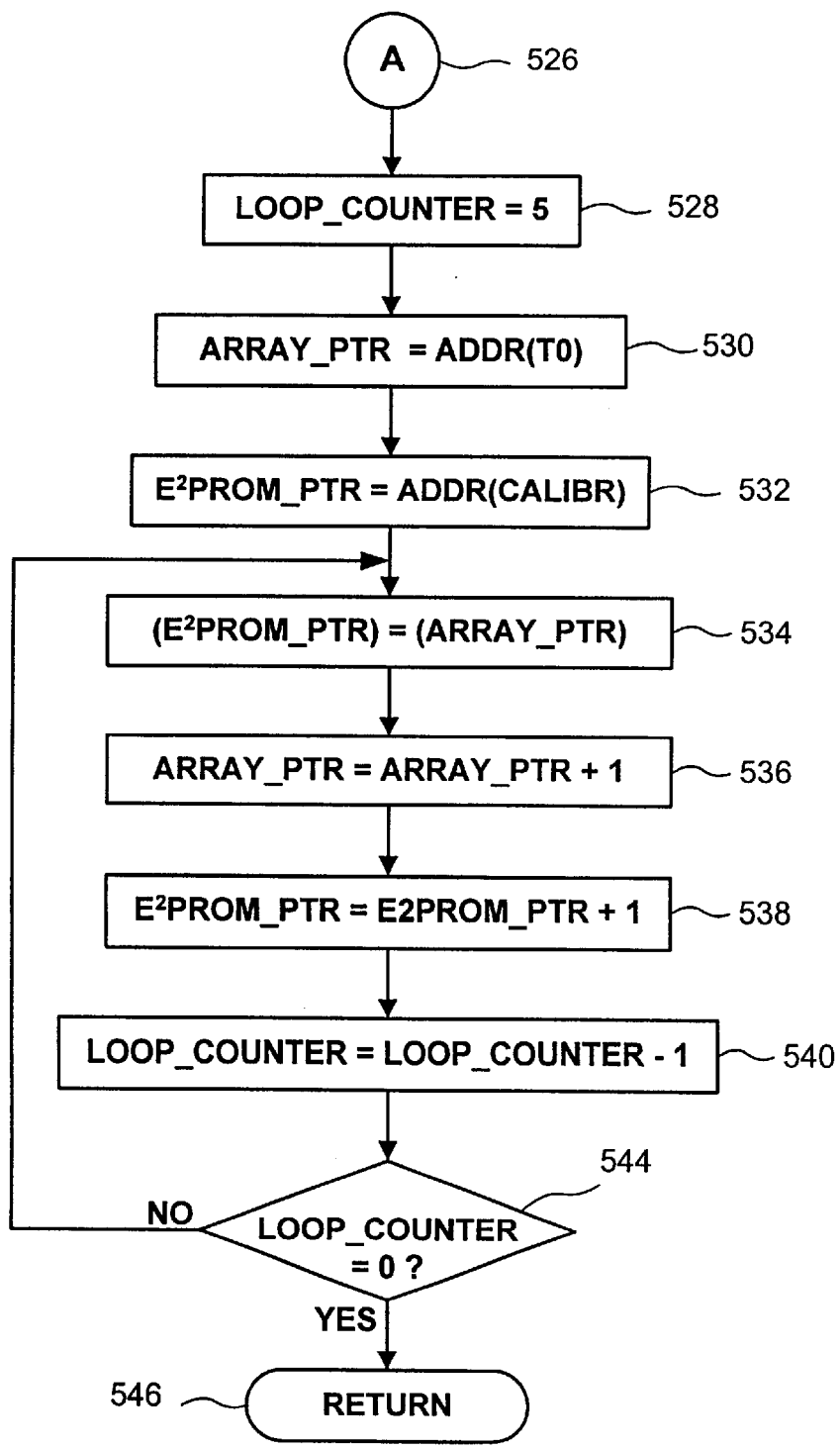

Referring to FIGS. 20a and 20b, a schematic flow diagram of a thermistor matching program is illustrated. When a thermistor is replaced in the field without availability of a calibrated thermometer, it is desirable to establish a "best-fit" calibration offset for each thermistor in lieu of an actual calibration procedure. When a thermistor matching condition is manually initiated, control is transferred from within the CHECKI module (FIG. 25a) via a subroutine call to node 500 in subroutine MATCH stored in ROM 108 of FIG. 2. From node 500, flow proceeds to logic step 502 where the average of the values stored in variables T1, T2, T3 and T4 is calculated and stored in variable $T_{AVG}$. From logic step 502, flow proceeds to logic step 504 where variable LOOP_COUNTER is initialized to 5, one count for each of the five thermistors in the four-chamber preferred embodiment. From logic step 504, flow proceeds to logic step 506 where bit 5 of variable FAULT0 is initialized to zero, indicating a no-fault thermistor matching condition. (Variable FAULT0 contains a plurality of bits serving as logic flags representing various possible fault conditions detectable by the fluid heater controls.) From logic step 506, flow proceeds to logic step 508 where variable ARRAY_PTR is initialized to the address of variable T0, a location of an array of sequentially addressed variables T0, T1, T2, T3 and T4 within the RAM 110. After being read, variables T0–T4, normally containing temperature measurements from thermistors 7a–7e, respectively, are temporarily reused to hold calibration offsets for the respective thermistors 7a–7e. From logic step 508, flow proceeds to logic step 510, the first step in a loop comprising logic steps 510, 512, 518, 520, 522, and 524. At logic step 510, variable TEMP1 serves as a temporary location used to hold the calibration offset formed from the difference between the values in variable $T_{AVG}$ and the variable addressed by variable ARRAY_PTR. From logic step 510, flow proceeds to logic step 512 where the calibration offset stored in variable TEMP1 is checked against a lower limit of −128 and an upper limit of +127, representing an approximately ±10° Fahrenheit range. If the calibration offset in variable TEMP1 reaches or exceeds these limits, control branches to logic step 514 where bit 5 of variable FAULT0 is set to one, indicating a thermistor matching fault to the SIGCODE error annunciator module. From logic step 514, control flows to logic step 516 where control returns to calling CHECKI module.

If, on the other hand, the contents of variable TEMP1 are within the acceptable limits, control flows to logic step 518 where the sum of the least-significant eight bits of the calibration offset in variable TEMP1 and a 16-bit constant (hexadecimal 1200 h) is stored into the variable addressed by variable ARRAY_PTR. Hexadecimal value 1200 h serves only as a unique identifier code indicating to any program which makes subsequent references to specific thermistor calibration offsets that a given entry is valid. From logic step 518, flow proceeds to logic step 520 where variable ARRAY_PTR is incremented to address the next variable in array T0 through T4. From logic step 520, flow proceeds to logic step 522 where the variable LOOP_COUNTER is decremented. From logic step 522, flow proceeds to logic step 524 where, if the contents of variable LOOP_COUNTER is not zero, flow loops to logic step 510 for the next thermistor value in sequence. If, on the other hand, variable LOOP_COUNTER is zero, flow proceeds through Node A 526 to logic step 528 of FIG. 22b. Thus, logic steps 502–524 derive and store a calibration offset for each of the thermistors 7a–7e.

At logic step 528, variable LOOP_COUNTER is initialized to 5, one count for each of the five thermistors 7a–7e. From logic step 528, flow proceeds to logic step 530 where variable ARRAY_PTR is initialized to the address of variable T0. From logic step 530, flow proceeds to logic step 532 where variable $E^2PROM\_PTR$ is initialized to the address of EEPROM 128 variable CALIBR[0], the first location in a five-location array. From logic step 532, flow continues at logic step 534, the first step in a loop comprising logic steps 534, 536, 538, 540, and 544. At logic step 534, the contents of the variable addressed by variable ARRAY_PTR are stored in the EEPROM 128 variable addressed by variable $E^2PROM\_PTR$. From logic step 534, flow proceeds to logic step 536 where variable ARRAY_PTR is incremented to point to the next array variable in sequence. From logic step 536, flow proceeds to logic step 538 where variable $E^2PROM\_PTR$ is incremented. From logic step 538, flow proceeds to logic step 540 where variable LOOP_COUNTER is decremented. From logic step 540, flow proceeds to logic step 542 where if the contents of variable LOOP_COUNTER is not zero, flow loops to logic step 534 for the next thermistor value in sequence. If, on the other hand, variable LOOP_COUNTER is zero, flow proceeds to logic step 546 where control returns to calling module CHECKI. Thus, logic steps 528–544 move the calibration offsets stored in variables T0–T4 to variables in non-volatile EEPROM 128.

Self test of thermistors

As the processor's program identifies changing events, it sets appropriate flag bits to indicate the change. These flag bits cause the program to take appropriate action according to the setting of the bits. For example, if the fluid heater system suffers a failure of a thermistor or associated wiring, or the control system, the program will recognize the failure and set a "fault flag." That flag will cause a program branch and additionally indicate a fault, and take appropriate corrective actions such as removing power from the heating elements. The program will cause the visual 164 and/or aural 160 indicators to visually and/or audibly indicate the fault by providing a specific code pattern of light flashes or beeps by which the actual failed thermistor can be identified by the human operator via an printed fault-code chart. The fluid heater manufacturer provides this fault code chart. This continuous test process insures the overall long-term stability and reliability of the heater.

Self Test Of Heating Elements

As the preferred embodiment of the invention operates, the program provides very precise control by means of the improved modulating controlled activation of the heating elements. If an element fails while in operation, the system will not identify the failure immediately. Rather, it will continue to attempt to overcome demand by increasing the power cycles to the other elements. The microcontroller program checks for bad elements at times when the power drive level drops below a predetermined threshold value, and an alarm will be sounded very soon after the actual failure. Thus when the fluid flow stops and the heater returns to the shutdown state, the fault will be identified by the program and duly annunciated visually and/or audibly. Continued operation with a faulty element will result in reduced fluid heating capacity but the program that manages the fluid heater will continue to operate maintaining temperature and stability within the new power limits of the system.

Figure 21A:
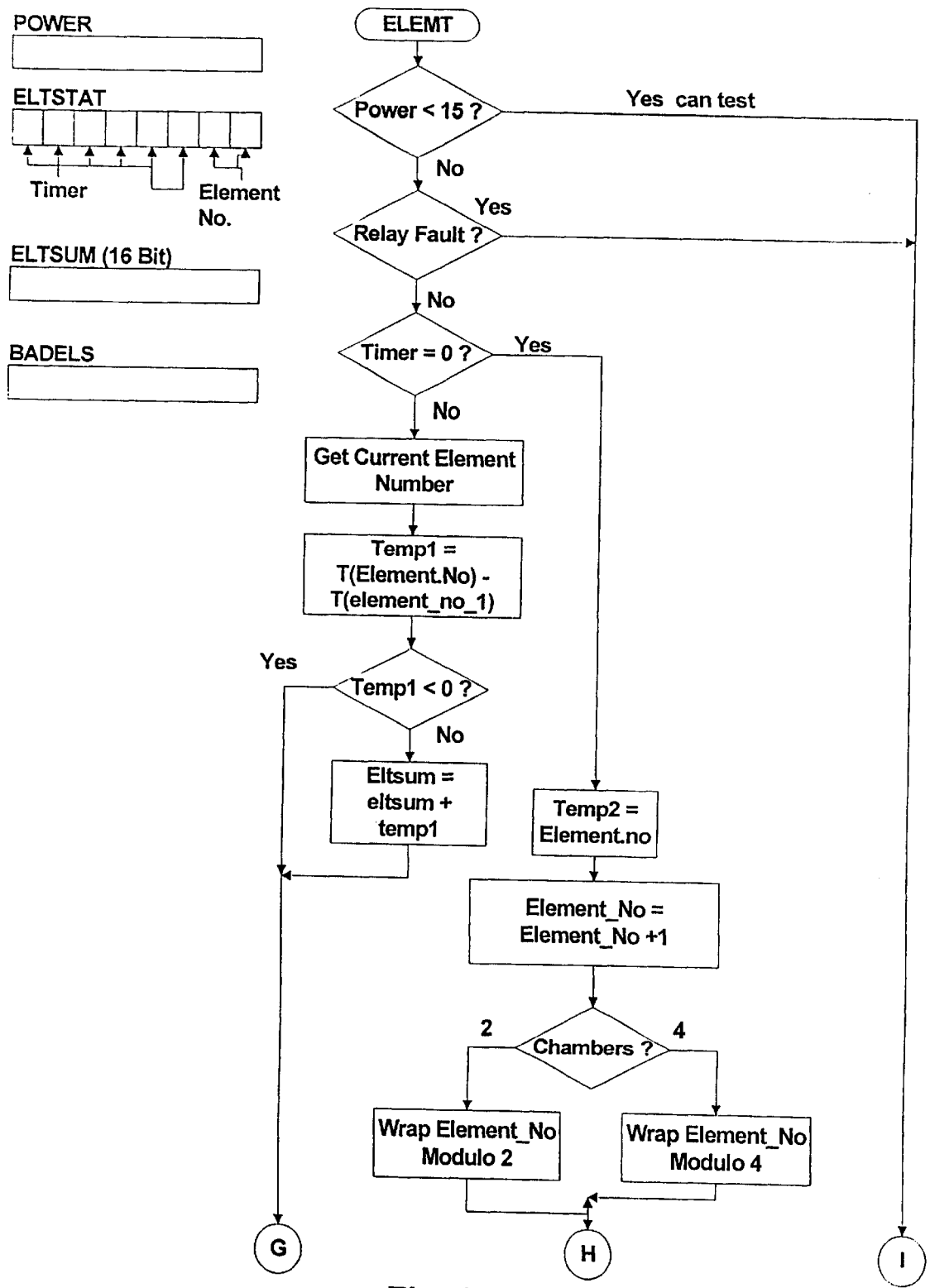
FIGS. 21a and 21b are a schematic flow diagram of a periodic heating element self-test program.
Figure 21B:
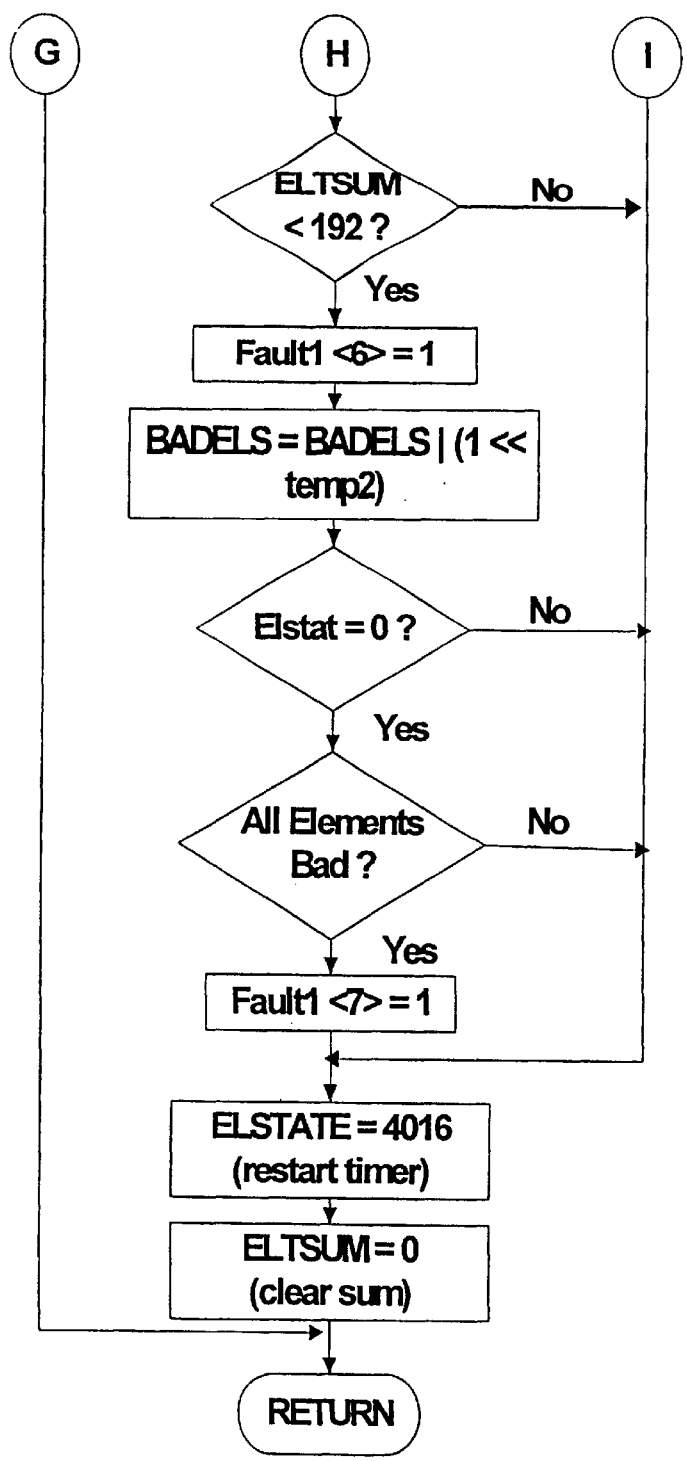

Referring to FIGS. 21a and 21b, a schematic flow diagram of a periodic heating element self-test program is illustrated. The flowchart of FIGS. 21a and 21b shows the operation of the heating element test program that is a subroutine (ELEMT) called within the main loop. Each heating element is tested separately. If the power for an element is less than a predetermined amount, (15 counts in the preferred embodiment), or a relay fault is detected, a timer (ELTSTATE) is started and an accumulator (ELTSUM) is cleared. These operations will occur each time the subroutine (ELEMT) is called until conditions change.

If the power for the element under test is above the predetermined value and no relay fault is detected on subsequent calls to the routine, the timer is tested for zero. If the timer is nonzero, the temperature rise in the chamber of the heater corresponding to the element being tested is computed and added to the value in ELTSUM if the sum is not negative. When the timer becomes zero, while power is applied, the condition indicates that power is greater that the predetermined amount for the amount of time preloaded into the timer. The accumulated temperature rise is compared against a threshold value (192 counts in FIG. 21b). If the accumulated value is above that threshold, it indicates that the element is operational. The cycle starts over for the next element when the subroutine is called again.

If the timer becomes zero, but the accumulated temperature rise is not above the threshold, the program indicates that the element under test is bad by setting a fault flag. It should be noted that in the preferred implementation of the heater, insufficient temperature rise could be caused by various faults in the heater. It could indicate a faulty heating element, faulty triac, a relay with OPEN contacts, or even that one of the electrical circuits to the unit is open.

Figure 22:
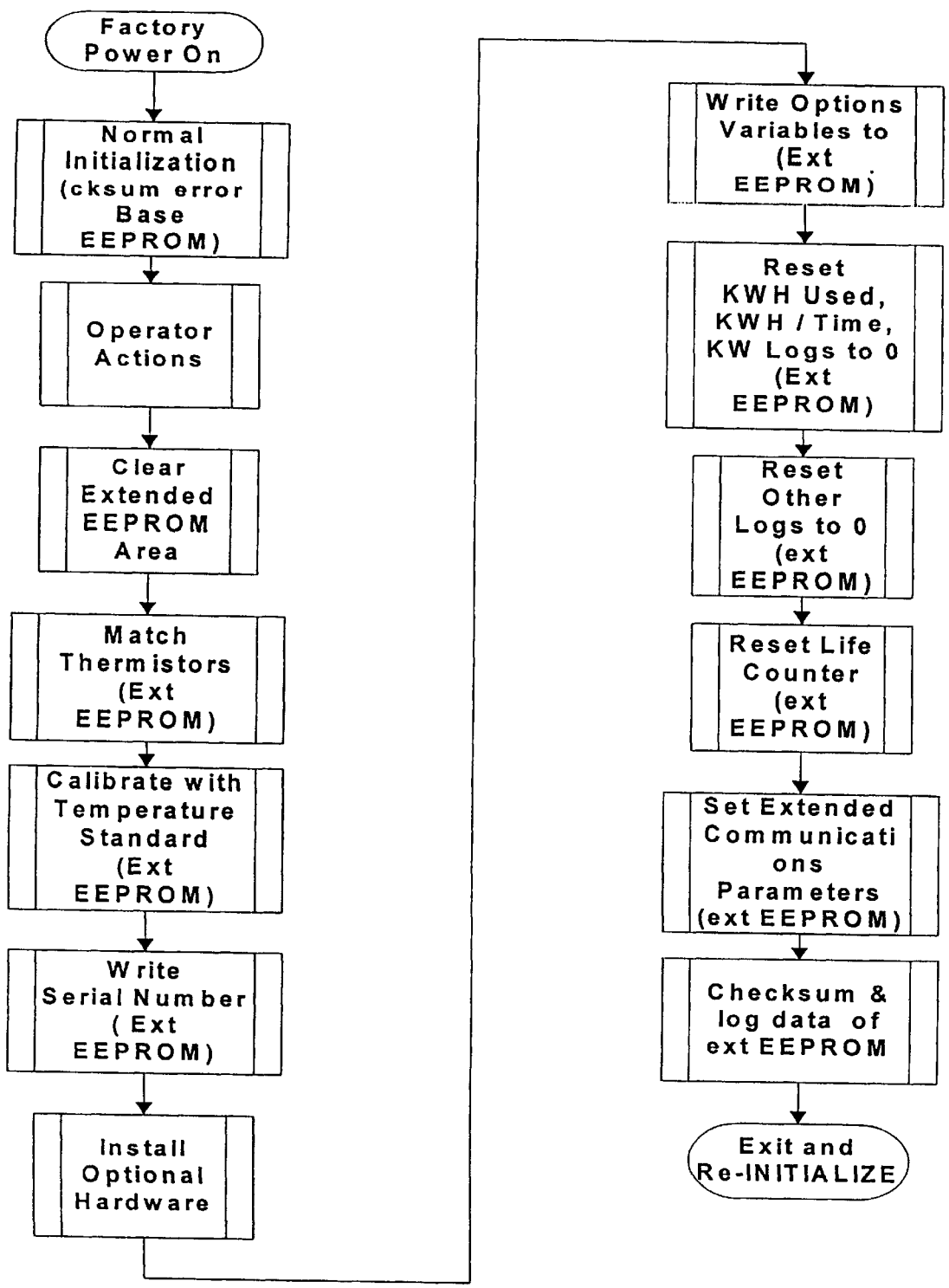
FIG. 22 is a schematic flow diagram of a system birth program.

Referring to FIG. 22, a schematic flow diagram of a system birth program is illustrated. The system parameters for the preferred embodiment of the invention is a composite of the initial values stored inside the microcontroller itself and real-world parameters and settings as are necessary to effect accurate and reliable delivery of heated fluids. These parameters are held in EEPROM 128. The system is "birthed" in a simple procedure that will clear out all the random information that may be in the EEPROM 128 when power is first applied. The EEPROM 128 will be reset to all zeros. This includes information such as a life counter value wherein the system maintains a count of 256 minute increments that the system has been running. The value provides a relative indication of age for warranty, and maintenance. Also, there are places for example but not limitation, for thermistor calibration variables, total KW used, a KW/Time variable, serial numbers, maintenance log information, error logging, flow rate logging, etc. The operational parameters for permanent information are set up, then the operating variables are set, then the user set variables and preferences are set. The operating variables are set in such a manner as to allow field upgrade of critical parameters and a reuse of these at each system power up. Since the system will load these from the processor the first time, and from EEPROM 128 at all subsequent times, these can be set in the field and they will remain in EEPROM 128 until they are overridden in a future service configuration setup. For example, if the user chooses to calibrate the system to a specific temperature, there is a documented procedure to reset these parameters. Doing this will change the certain values in the EEPROM 128 without affecting the other EEPROM 128 data.

The system can be "partially birthed" since a partial functions test of the heater can be performed after manufacture. For this, only the accurate and reliable operation of the control circuits and just part of the control program are required. This will allow the system to initialize, read thermistors, turn on elements, read power line voltages, check moisture, limit switches, etc. The actual final version of the program can be loaded very near to shipping time and thus the serial number, hours counter, etc., can all be loaded and stored at or very near the date of actual shipment. This allows accurate warranty and service logging information.

Figure 23:
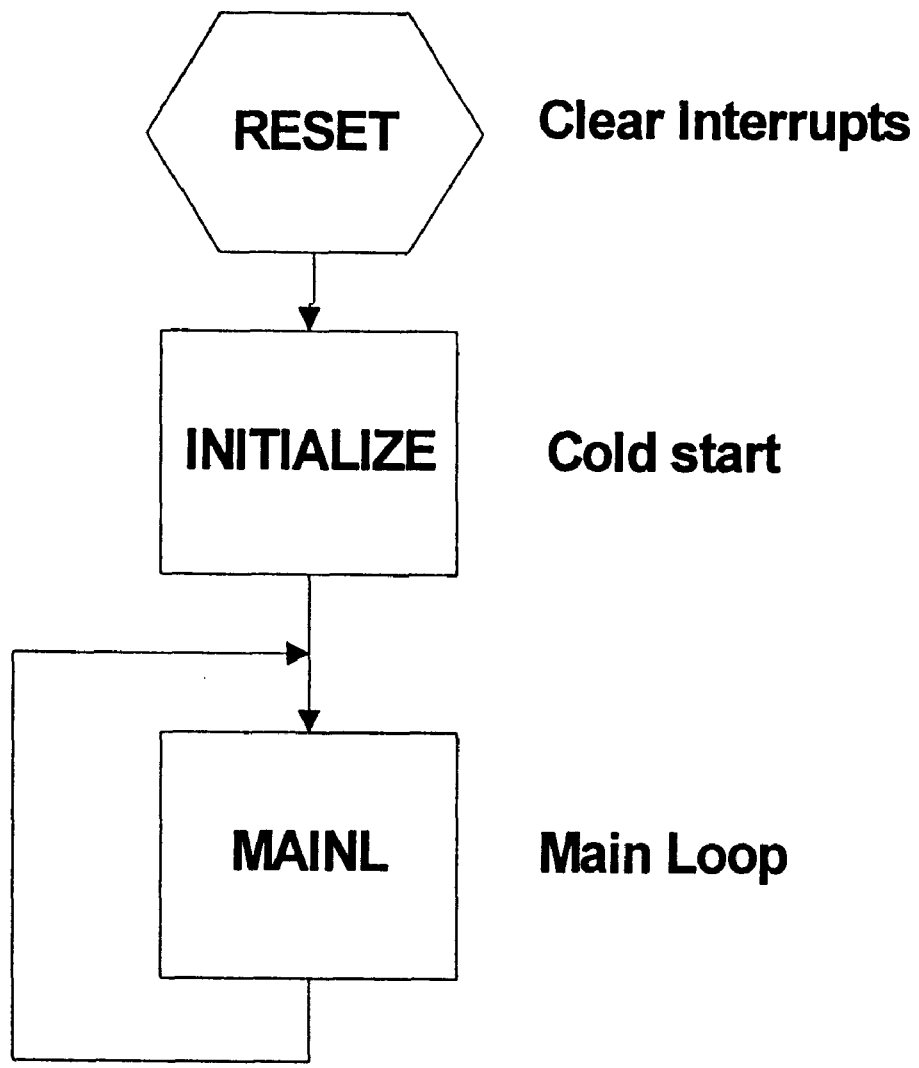
FIG. 23 is a schematic flow diagram of the system program, according to the preferred embodiment of the invention.

Referring to FIG. 23, a schematic flow diagram of the system program, according to the preferred embodiment of the invention, is illustrated. A top-level view of the main program is shown in FIG. 23. All heater control software may be resident in the ROM 108 of the CPU 100, and is executed in two parts: a main program and an interrupt routine. When power is first applied to the CPU 100, or when the software watchdog timer expires, the program begins execution at address 0000, corresponding to the RESET node in FIG. 23. RESET is responsible for disabling all interrupts and jumping to the INITIALIZE module of FIG. 23.

Figure 24A:
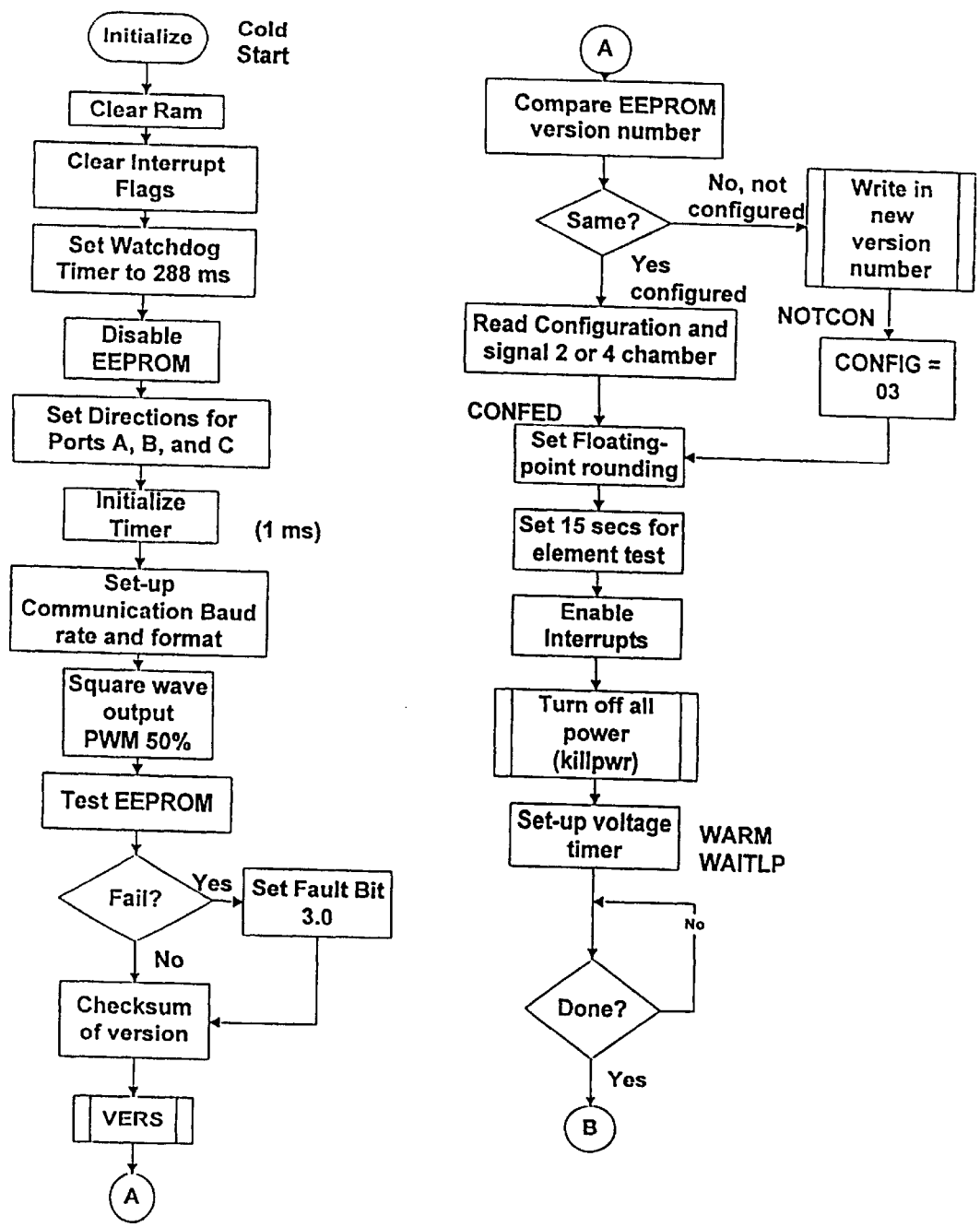
FIGS. 24a and 24b are a schematic flow diagram of the system program initialization program.
Figure 24B:
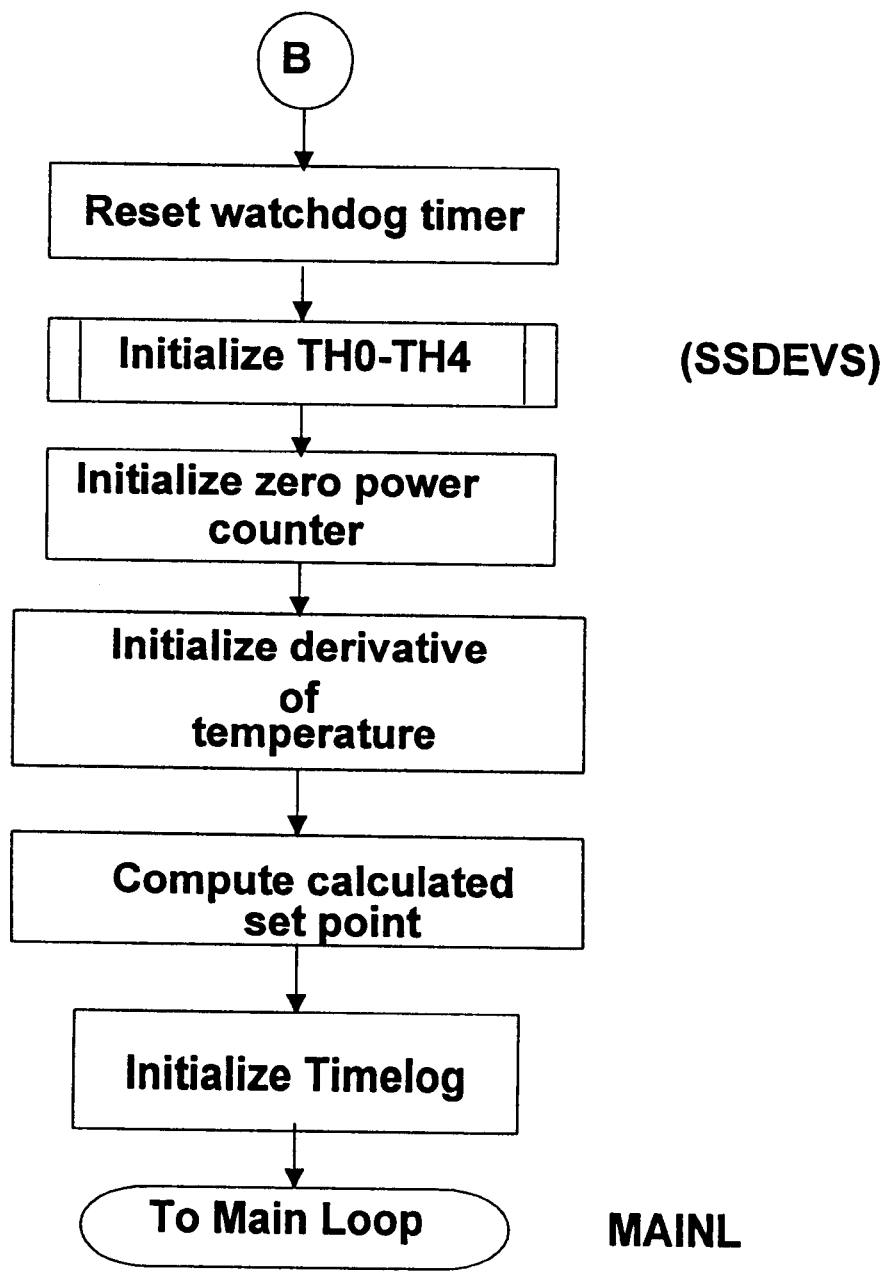

Referring to FIGS. 24a and 24b, a schematic flow diagram of the system program initialization program is illustrated. The cold start step INITIALIZE clears RAM; programs the internal timers needed for frequency division, communications baud rate, and general timing; and configures the external ports of the CPU 100 (Central Processing Unit) as inputs and/or outputs, according to their wiring.

INITLALIZE also configures the external EEPROM 128, if blank or if last used with a microcontroller of a different software revision by updating the revision checksum and copying control tuning parameters appropriate for either two-chamber or 4-chamber operation. Finally, INITIALIZE reads the setpoint and all thermistor values and "previous" values so that the temperature control program may start correctly. Once the INITIALIZE module has completed, control is transferred to the MAINL program, which executes continuously in a loop.

Referring to FIGS. 25a–25e, a schematic flow diagram of the main loop (MAINL) program portion of FIG. 23 is illustrated. MAINL program consists of a number of functional modules, described in detail hereinbelow, which are each called in sequence. If conditions necessary for a module to perform its duty are not ready, control simply returns to continue execution at the next module in sequence. Thus, the overall execution rate of the MAINL loop varies according to the sum of all the modules' processing times.

Figure 25A:
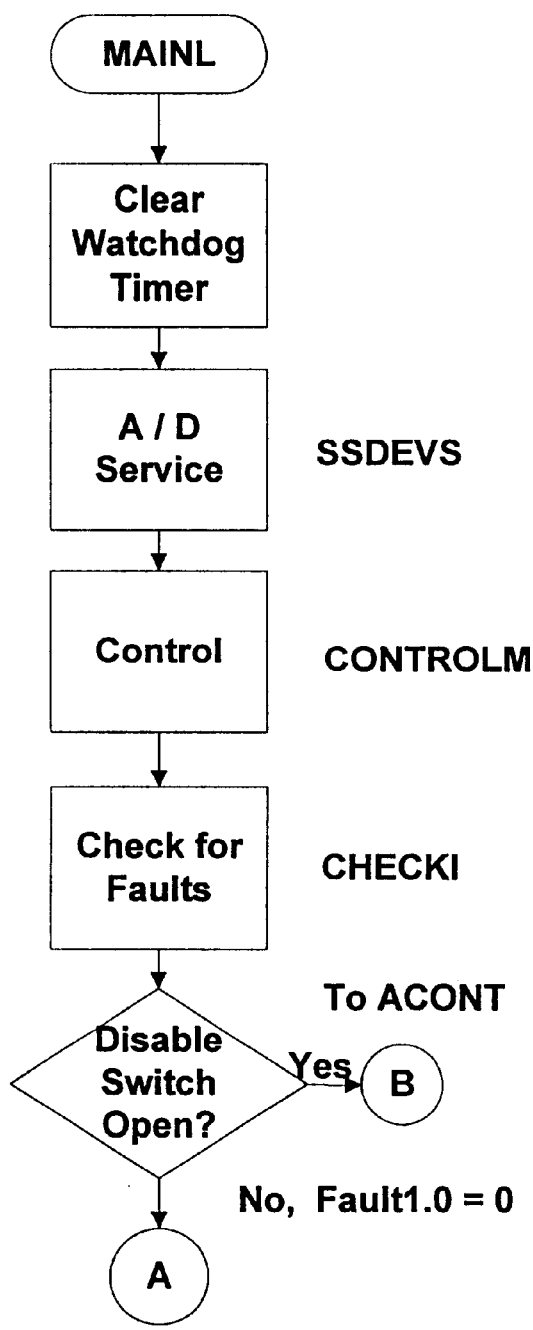
FIGS. 25a–25e are a schematic flow diagram of the main loop (MAINL) program portion of FIG. 23.
Figure 25B:
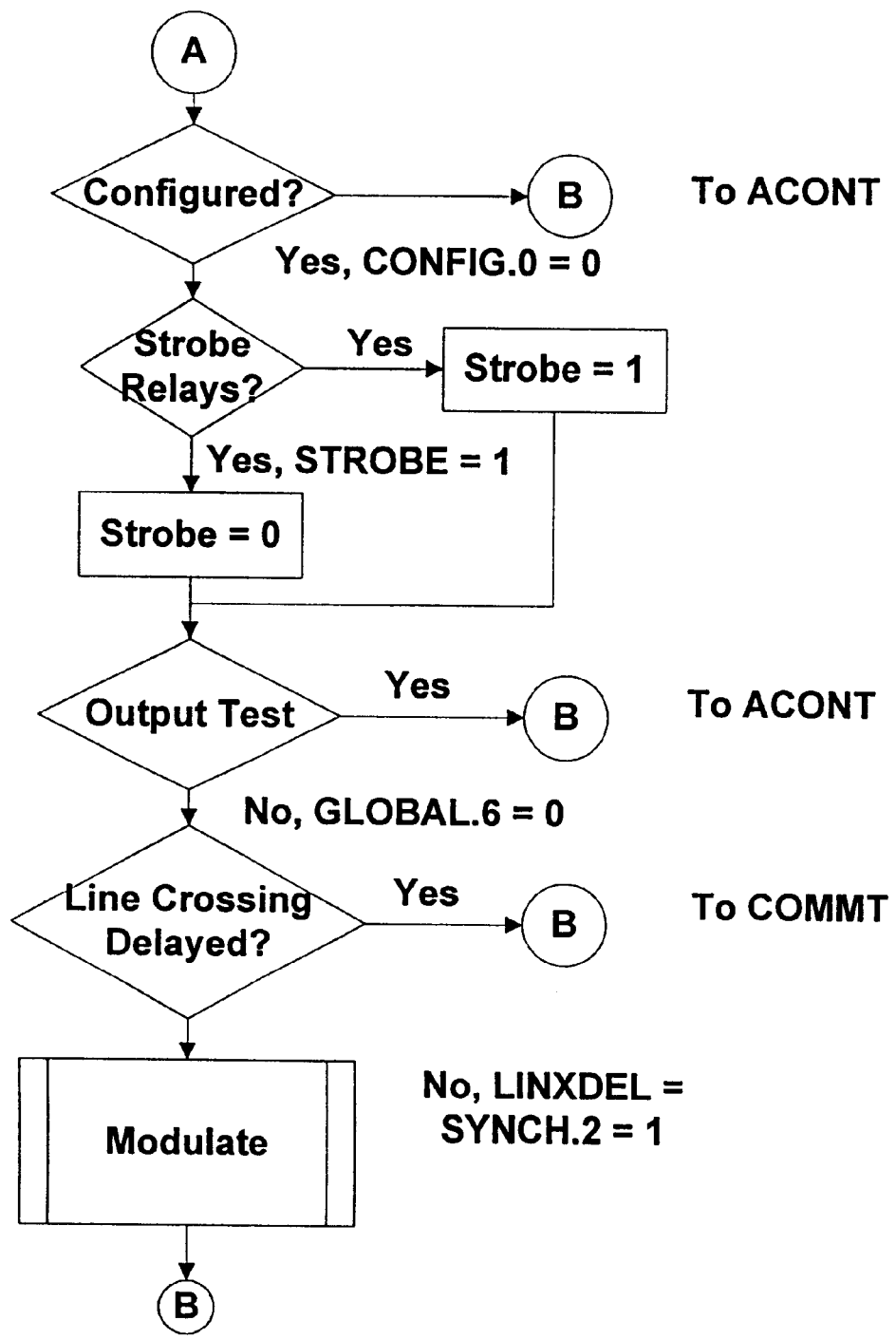
Figure 25C:
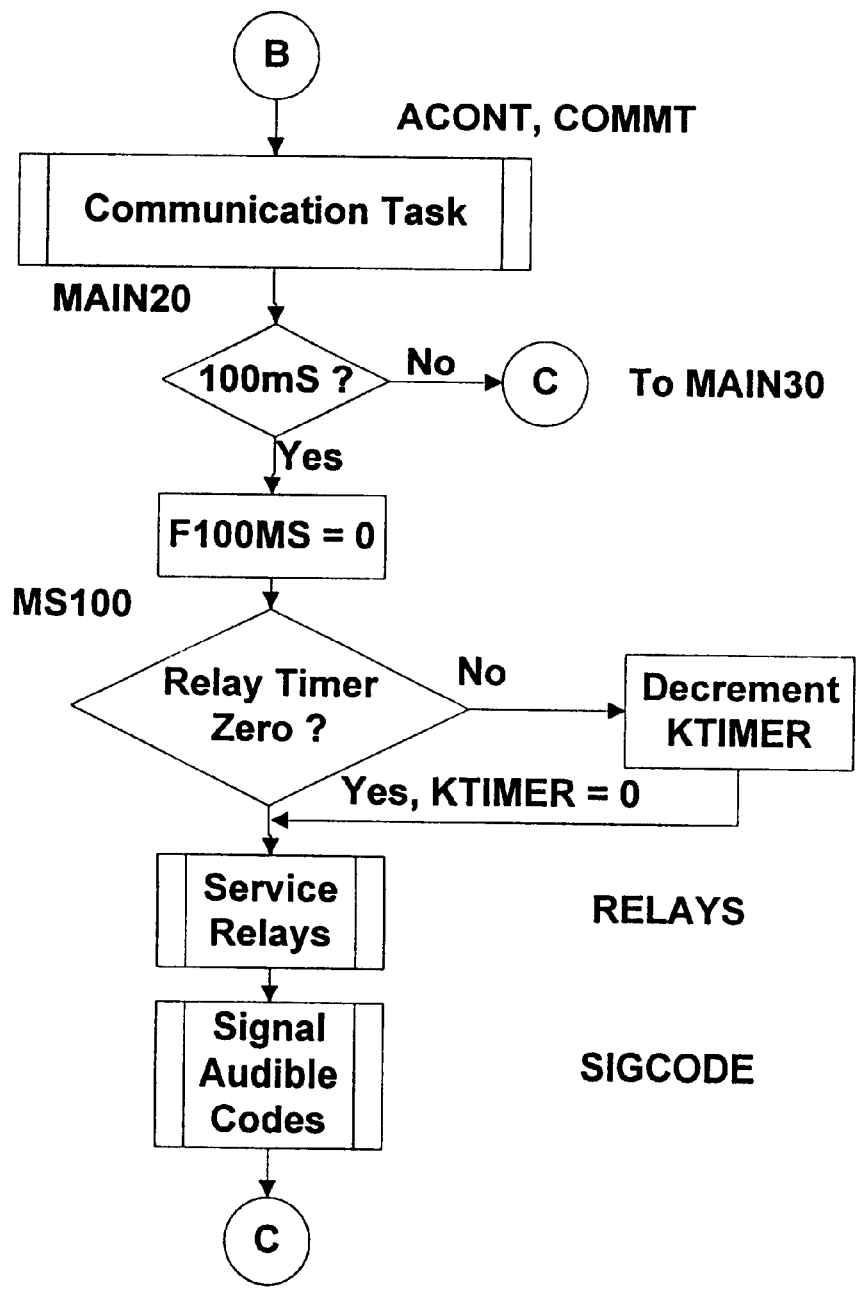
Figure 26A:
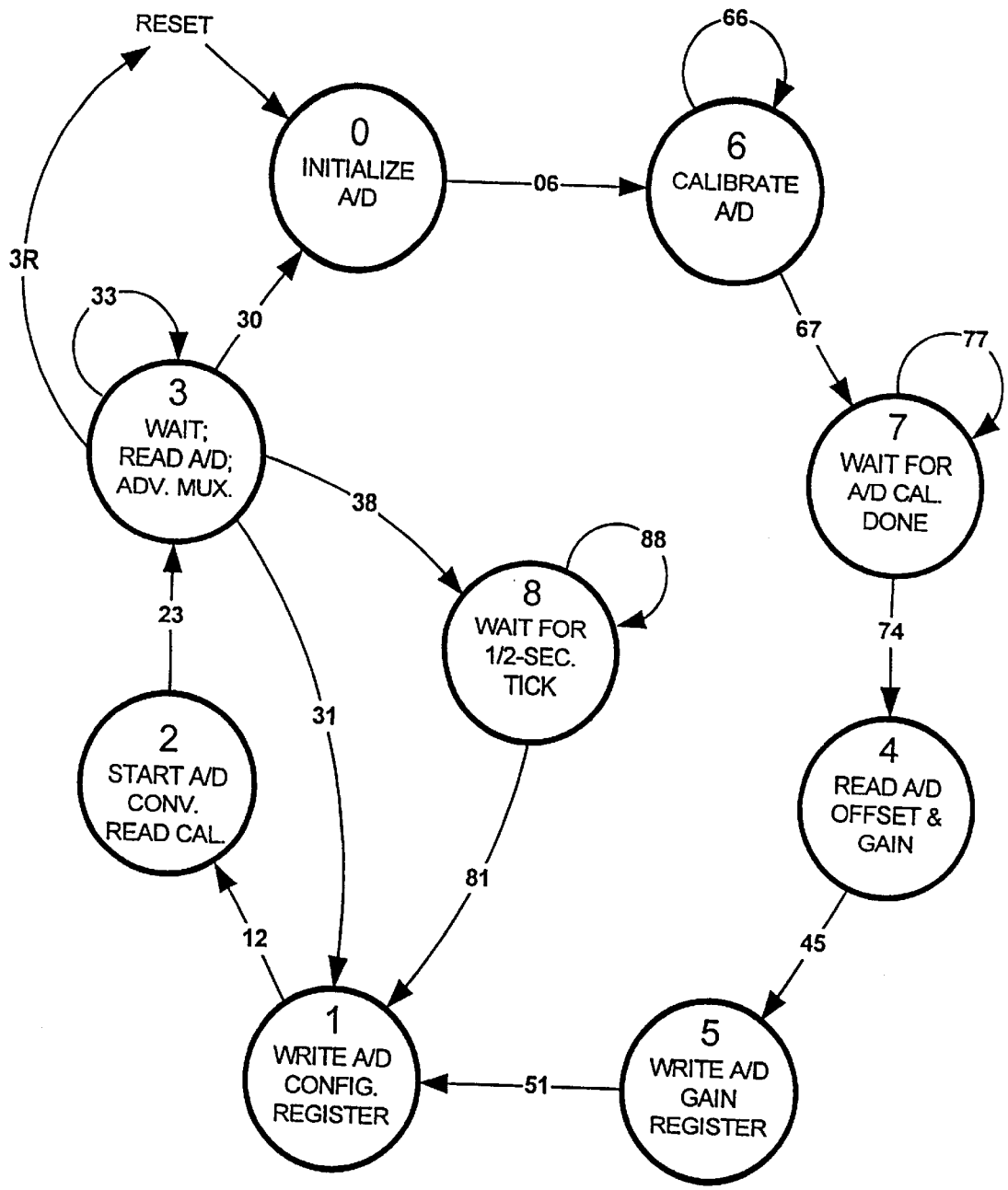
FIG. 26a is a schematic flow diagram of an analog-to-digital state machine.

Referring to FIG. 25a, MAINL begins by clearing the software watchdog timer (WDT). The WDT is a programmable counter clocked by an oscillator independent of the main 4-MHZ oscillator. When it overflows, it forces the CPU 100 to a reset condition, the theory being that a "crashed" program will not be resetting the WDT on a regular basis. Thus, a program crash will force the CPU 100 to restart itself. Next, the SSDEVS (synchronous serial device) module is called, which handles all initialization and reading of the A/D converter. The A/D converter has an attached analog multiplexer (MUX) whose input channel is selected via the A/D port. However, before it is ready to read, the A/D converter requires self-calibration and reset cycles. Once initialized, the A/D converter reads all five of the thermistors in sequence (four-chamber heaters), applying the calibration offset, followed by one each of the setpoint, mains voltage, or moisture sensor in round-robin sequence. The A/D state machine directs each successive call to SSDEVS to the correct state in the proper sequence. After the last thermistor is read, SSDEVS sets the global<4> flag to signal the CONTROLM module to commence processing. The A/D service module is described in more detail in the following:

Referring to FIG. 26a, a schematic flow diagram of an analog-to-digital state machine, according to the preferred embodiment of the invention, is illustrated. The A/D State Machine (also referred to as SSSDEVS) is called in both the INITIALIZE module and in the MAINL program and handles all initialization and reading of the A/D converter. The A/D converter has an attached analog multiplexer (MUX) whose input channel is selected via the A/D port. However, before it is ready to read, the A/D converter requires self-calibration and reset cycles. Once initialized, the A/D converter reads all five of the thermistors in sequence (four-chamber heaters), applying the calibration offset, followed by one each of the setpoint, mains voltage, or moisture sensor in round-robin sequence. The A/D state machine directs each successive call to SSDEVS to the correct state in the proper sequence. After the last thermistor is read, SSDEVS sets the global<4> flag to signal the CONTROLM module to commence processing.

The A/D State Machine diagram of FIG. 26a shows nine states. When the system is reset, control begins in state 0 INITIALIZE A/D and proceeds through four intervening states until reaching state 1, WRITE A/D CONFIG. REGISTER. Thereafter, control sequences through states 1, 2, and 3 for every input read. After all thermistors and one each of the setpoint potentiometer, power line voltage, or moisture detector are read, state 8 is entered instead of returning to state 1. State 8 waits for the 500-ms tick flag set by the interrupt routine before starting the next set of measurements. Below, each state is explained in more detail.

Figure 26B:
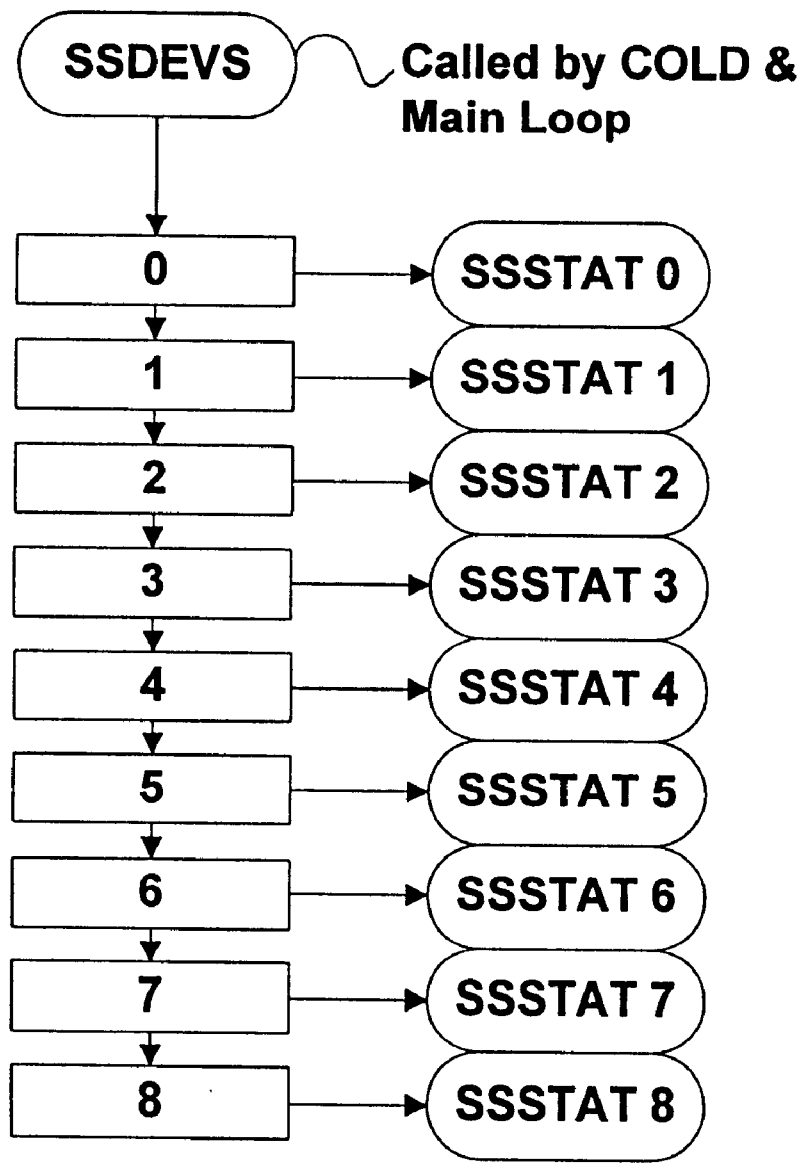
FIGS. 26b–26r are a schematic flow diagram of the main loop (MAINL) program portion of FIG. 23.

Referring to FIG. 26b, when the A/D State Machine is called in the MAINL program, control is transferred to node SSDEVS. Note: SSDEVS is also repeatedly called in the INITIALIZE module to ensure that the control module starts up with correct temperature readings. From the SSDEVS node, variable SSSTAT contains the current state value, and control is dispatched to one of nine nodes, labeled SSSTAT0 through SSSTAT8.

Figure 26C:
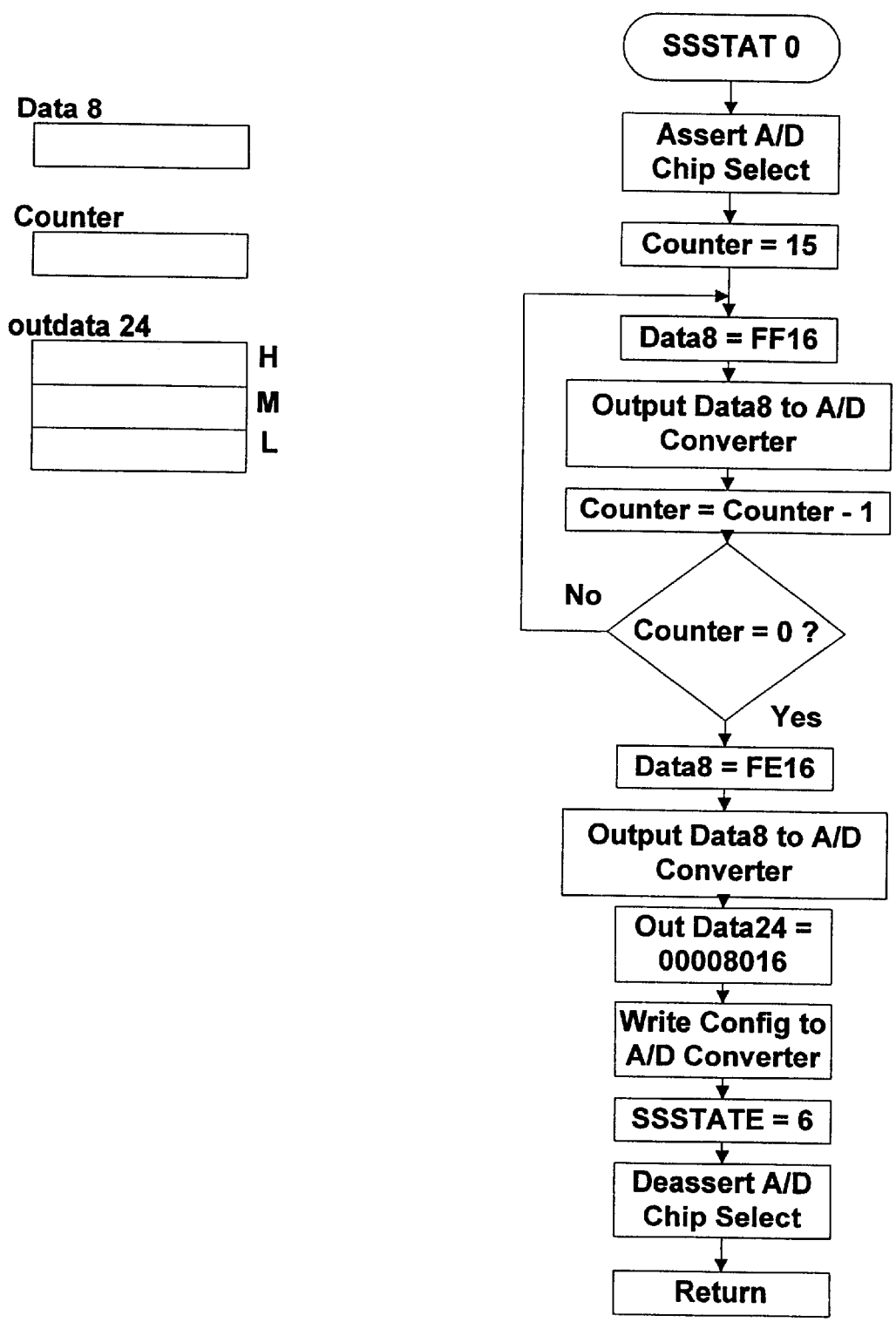

Referring to FIG. 26c, from node SSSTAT0, the A/D converter chip select is asserted. The chip select is a bit on a port that uniquely enables only the A/D converter. This arrangement allows the A/D converter, the serial EEPROM 128, and the Aux. (Auxiliary) connector to share the same SPI bus as individually selected slaves with the CPU 100 as the single bus master.

Next, variable Counter is initialized to 15 in preparation for use as a loop counter. In accordance with recommended initialization practice for the Crystal Semiconductor CS5529 A/D Converter, a byte of value $FF_h$ is output to the A/D converter 15 times in a loop. Each occurrence of outputting an 8- or 24-bit value to the A/D converter consists of serially shifting out the data one bit at a time over the SPI bus.

A preferred embodiment utilizes software implemented on a Microchip Technologies, Inc., PIC 16C63 microcontroller, this is accomplished by "bit-banging" program. Alternatively, if the particular microprocessor allows it, outputting an 8 bit value may be accomplished by writing an 8-bit byte to a port, then allowing the microcontroller's SPI hardware to clock out the data serially while the microcontroller is concurrently executing other program instructions.

Following the string of 15 bytes of $FF_h$, a byte of $FE_h$ is output as a configuration command, followed by a 24 bit value $000080_h$, commencing initialization of the A/D converter. Next, the variable SSSTAT is set to 6 and the A/D chip select is de-asserted. The practice of de-asserting the A/D chip select allows the other SPI peripherals to be addressed in the meantime. Control then returns to the instruction following the call to the A/D state machine (SSSDEVS), concluding state 0, and setting up for state 6 as the next state.

Figure 26D:
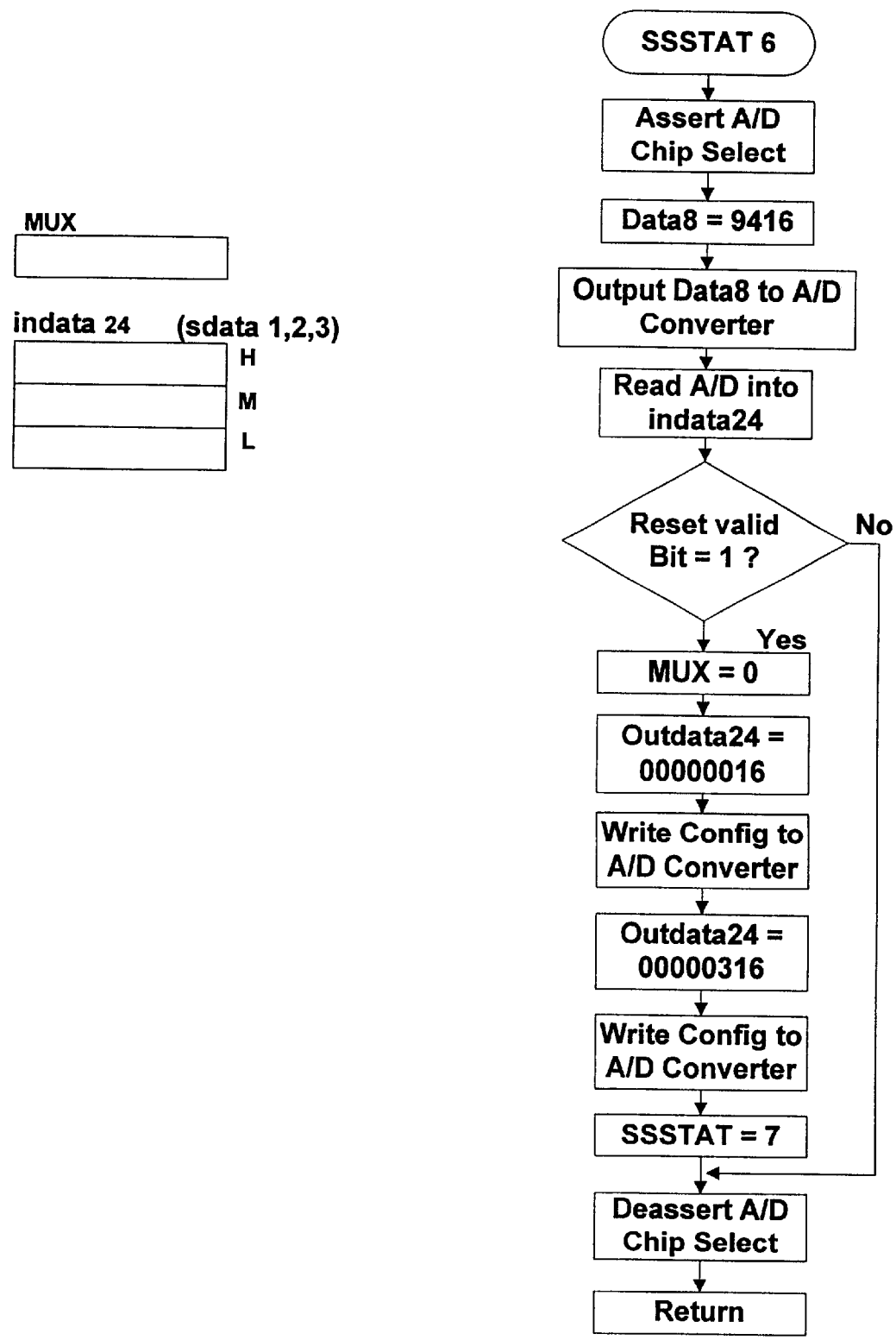

Referring to FIG. 26d, from node SSSTAT6, the A/D converter chip select is asserted. A command byte of value $94_h$ is sent to the A/D converter in a manner previously described. The A/D converter's response is read back into variable indata24, and the reset valid bit is examined. If not set, control branches to de-assert the A/D converter chip select and to return without changing the state. Thus, the A/D converter state machine will remain in state 6 until it has completed its reset (initialization) operation.

Otherwise, if the reset valid bit was a logic 1, the variable MUX is cleared to commence the input scan with T0 (THin). Next, value $000000_h$ is output to the A/D converter as the configuration, followed by a value of $000003_h$. This sequence serves to initiate a self-calibration process. Finally, the variable SSSTAT is advanced to state 7, the A/D converter chip select is de-asserted, and control returns to the next instruction following the call to SSSDEVS.

Figure 26E:
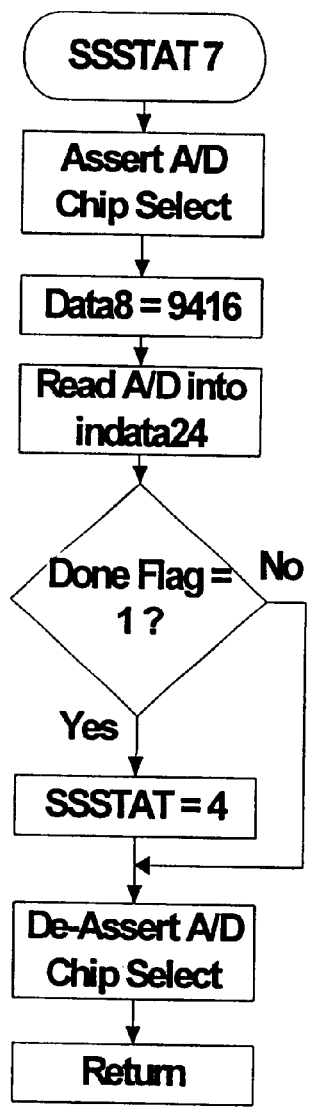

Referring to FIG. 26e, from node SSSTAT7, the A/D converter chip select is asserted. A command byte of value $94_h$ is sent to the A/D converter in a manner previously described. The A/D converter's response is read back into variable indata24, and the done flag bit is examined. If not set, control branches to de-assert the A/D converter chip select and to return without changing the state. Thus, the A/D converter will remain in state 7 until it has completed its calibration process.

Otherwise, if the done flag bit was a logic 1, the variable SSSTAT is advanced to state 4, the A/D converter chip select is de-asserted, and control returns to the next instruction following the call to SSSDEVS.

Figure 26F:
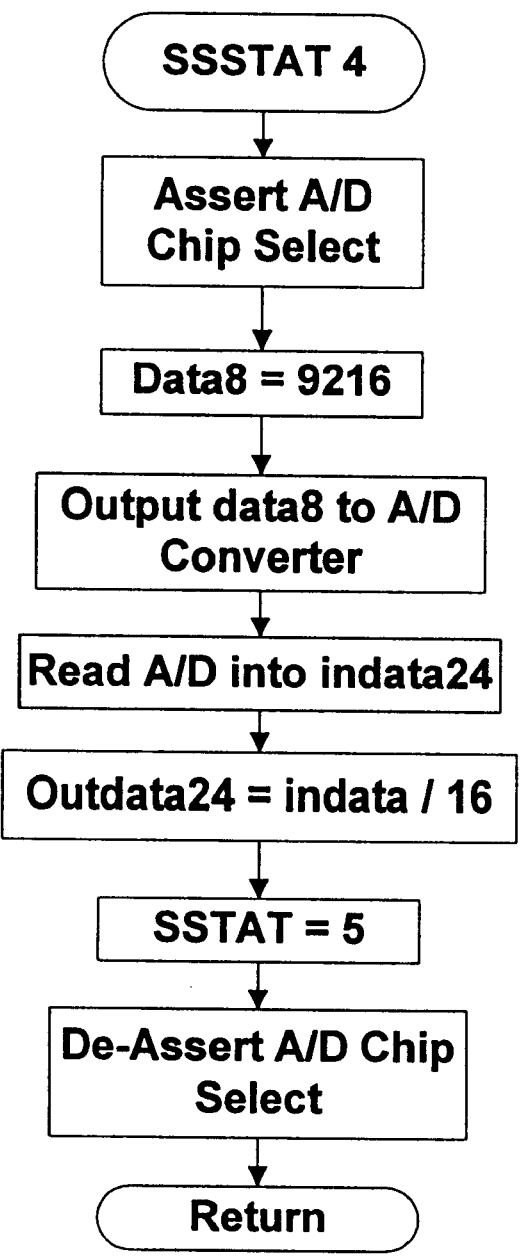

Referring to FIG. 26f, from node SSSTAT4, the A/D converter chip select line is asserted. A command byte of $92_h$ is sent to the A/D converter to read its offset and gain. The A/D converter's response is read back into variable indata24, divided by 16, and placed into variable out data24. The variable SSSTAT is advanced to state 5, the A/D converter chip select line is de-asserted, and control returns to the next instruction following the call to SSSDEVS.

Figure 26G:
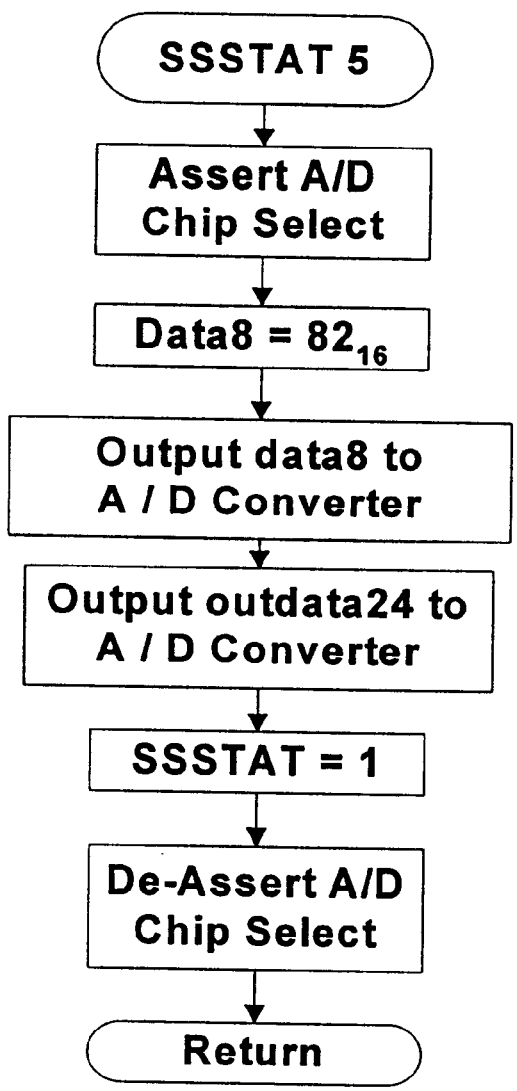

Referring to FIG. 26g, from node SSSTAT5, the A/D converter chip select line is asserted. A command byte of $82_h$ is sent to the A/D converter to write its gain register. Next, the variable out data24, containing the gain information previously set in state 4, is output to the A/D converter. The variable SSSTAT is advanced to state 1, the A/D converter chip select line is de-asserted, and control returns to the next instruction following the call to SSSDEVS.

Figure 26H:
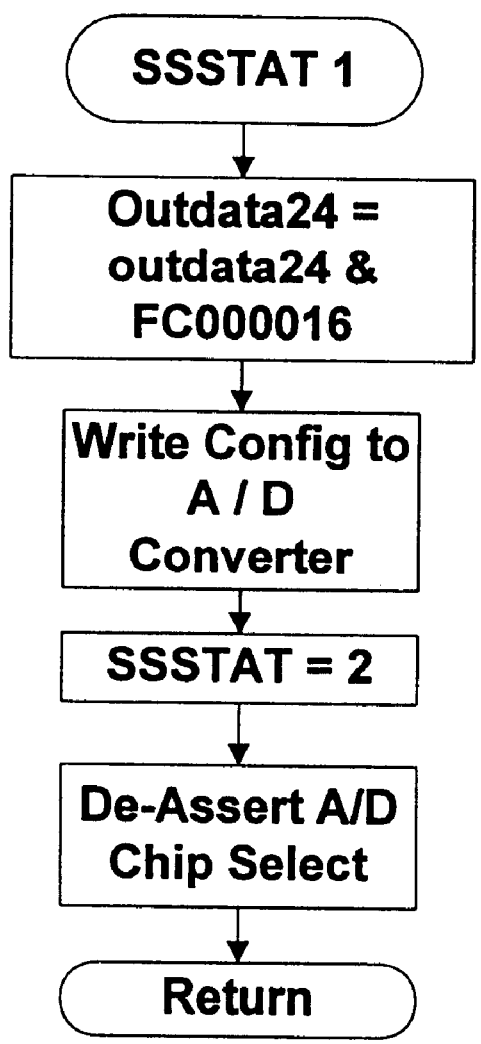

Referring to FIG. 26h, from node SSSTAT1, variable out data24, previously initialized in state 4, is masked to include only bits <23:18> and is sent to the A/D converter to write its configuration register. The variable SSSTAT is advanced to state 2, the A/D converter chip select line is de-asserted, and control returns to the next instruction following the call to SSSDEVS.

Figure 26I:
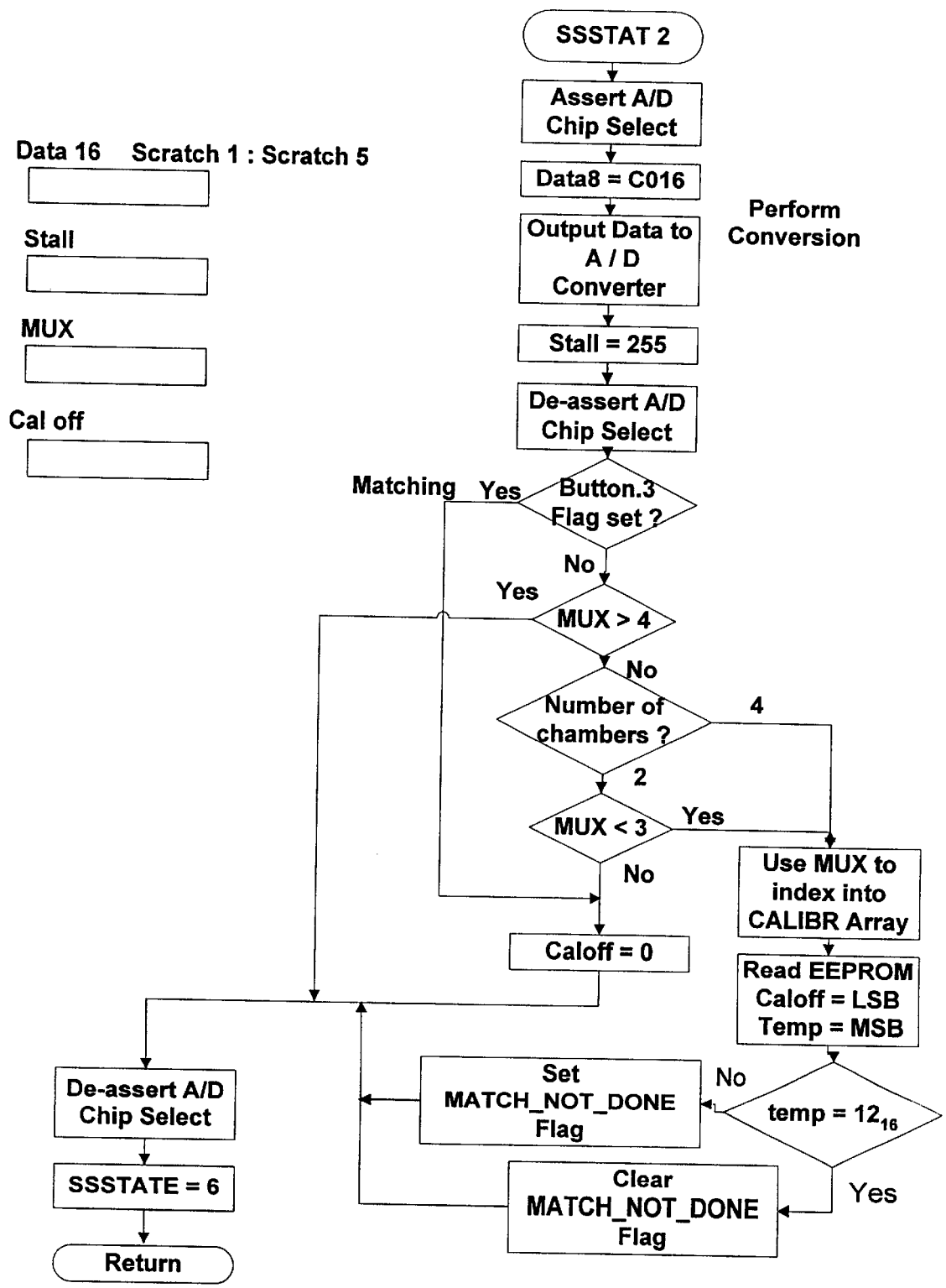

Referring to FIG. 26i, from node SSSTAT2, the A/D converter chip select line is asserted. A command byte of $C0_h$ is sent to the A/D converter to perform an analog-to-digital conversion and variable Stall, used as a time-out counter, is initialized to 255. Next, because EEPROM 128 access is required within state 2, the A/D converter chip select line is de-asserted.

The remainder of the logic reads and examines the calibration offset information for the thermistor input currently under A/D conversion. If the flag in variable button<3> is set, then a matching process is in effect and the calibration offset in variable CALOFF is cleared. Control then proceeds to the common state 2 exit code.

Otherwise, if not matching thermistors, the variable MUX is examined, and if greater than 4, then the input is not a thermistor, and control proceeds to the common state 2 exit code. If variable MUX contains a value between 0 and 4, then a thermistor is being read and the flag in variable config<1> is examined. If set, the heater is a 4-chamber unit and control branches to process the calibration information. Otherwise if cleared, the heater is a 2-chamber unit and a test is made to see if variable MUX is less than 3. If it is not, the A/D input multiplexer has selected one of the two unused thermistor inputs, the variable CALOFF is cleared, and control proceeds to the common state 2 exit code.

Otherwise, the variable MUX contains a valid thermistor selection and is used to index into a table of calibration information stored in EEPROM 128. The 16-bit indexed location is read with the LSB stored into variable CALOFF and the MSB stored in variable temp. If variable temp is equal to code $12_h$, then the stored calibration offset is assumed to be valid and the MATCH_NOT_DONE flag is cleared. Otherwise, it is assumed that no calibration offset was stored, and the MATCH_NOT_DONE flag is set. Control proceeds to the common state 2 exit code where the A/D chip select is de-asserted, the variable SSSTAT is advanced to 3, and control returns to the instruction following the call to SSSDEVS.

Figure 26J:
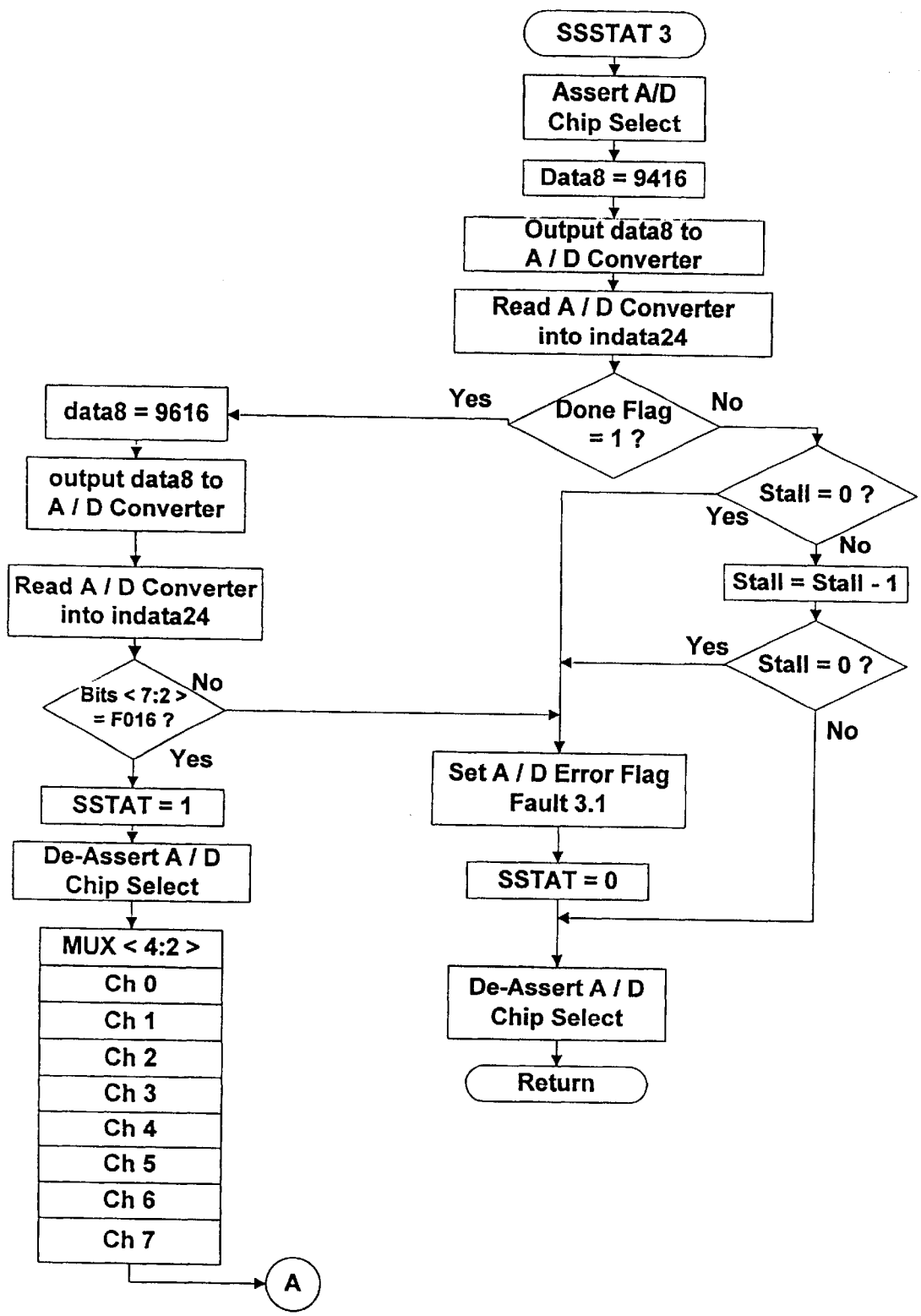

Referring to FIG. 26j, from node SSSTAT3, the A/D converter chip select line is asserted. A command byte of $94_h$ is sent to the A/D converter to poll the status of the converter. The A/D converter's response is read into variable indata24 and the done flag bit is examined. If the flag is a logic 0, then conversion is still in progress, and variable Stall is examined to see if it has been decremented to zero. If it is zero, then a time-out (fault) condition is assumed and control branches to state 3 common fault exit code. Otherwise, if variable Stall is not zero, it is decremented and again tested for zero. If it is zero, action taken is as described above. Otherwise, the A/D converter chip select is de-asserted and control returns to the instruction following the call to SSSDEVS. Thus, the A/D converter state machine waits in state 3 while A/D conversion is underway.

If, however, the done flag bit was a logic 1, a command byte of $96_h$ is sent to the A/D converter to read the result. The A/D converter is then read into variable indata24. Bits <7:2> of the LSB are compared to the value $F0_h$, and if not equal control branches to state 3 common fault exit code.

State 3 common fault exit code sets the A/D error flag in variable fault3<1>, variable SSSTAT is cleared to state 0, the A/D converter chip select line is de-asserted, and control returns to the instruction following the call to SSSDEVS.

If bits <7:2> were equal to $F0_h$, then a good conversion is assumed and variable SSSTAT is advanced to state 1. The A/D converter chip select line is de-asserted and the contents of variable MUX bits <4:2> are used as an index into a call dispatch table based on multiplexer inputs 0 through 7. Each of the eight possible handlers will be described before proceeding past the return from the call dispatch table.

Figure 26K:
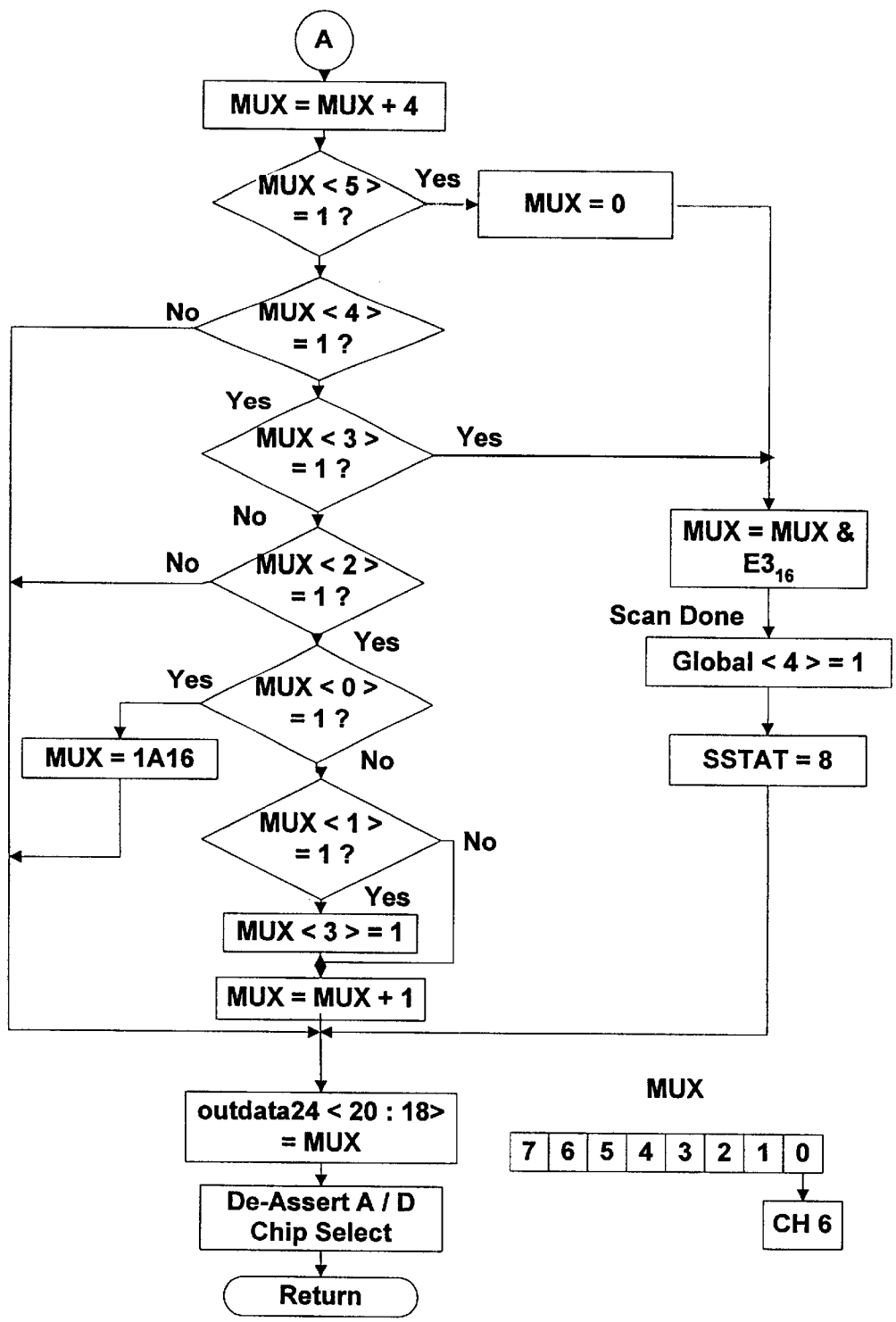
Figure 26M:
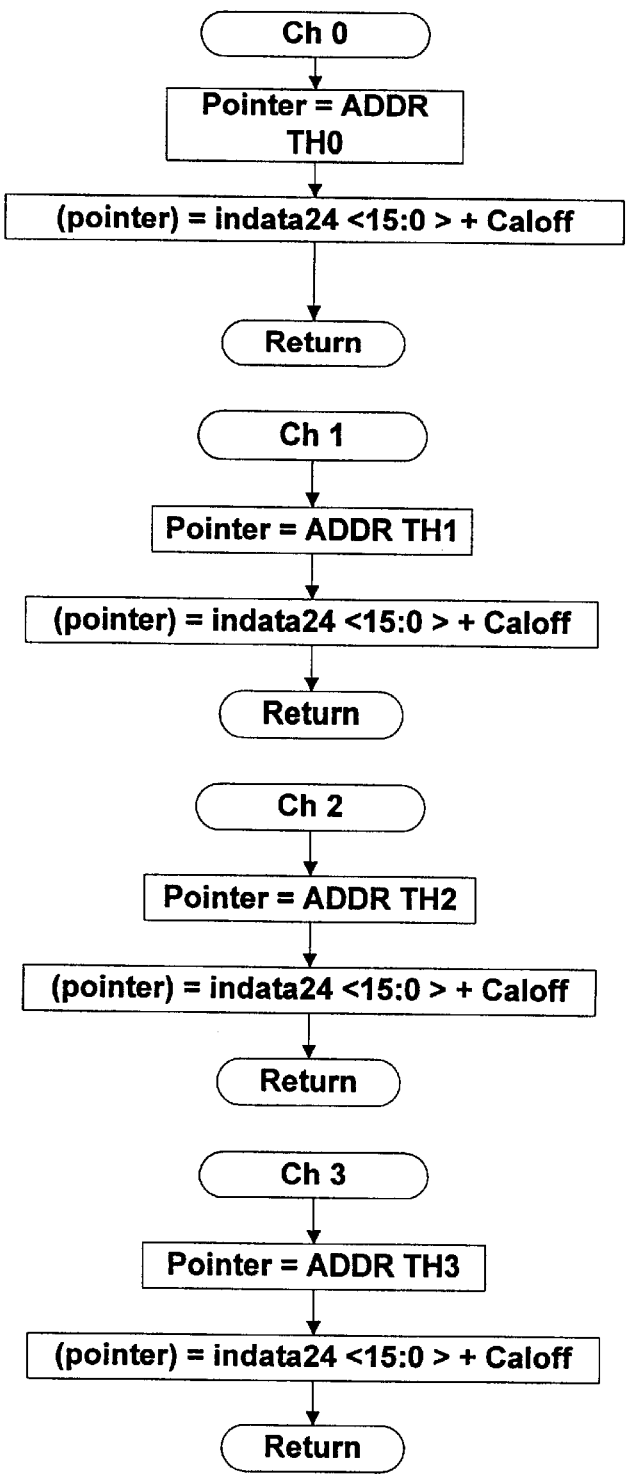

Referring to FIG. 26m from node CH0, variable Pointer is set to the address of variable th0. Next, the contents of variable CALOFF are added to the least significant 16 bits of variable indata24 (the raw thermistor reading) and stored in a variable pointed to by variable Pointer (in other words, th0). Control returns to the instruction following the call dispatch table. Thus, the calibration offset previously recalled in state 2 is applied to the thermistor reading and saved in the five-thermistor variable array.

Referring to FIG. 26m, from nodes CH1, CH2, and CH3, variable Pointer is set to the address of the variable th1, th2, and th3, respectively, in a like manner as described for node CH0.

Figure 26N:
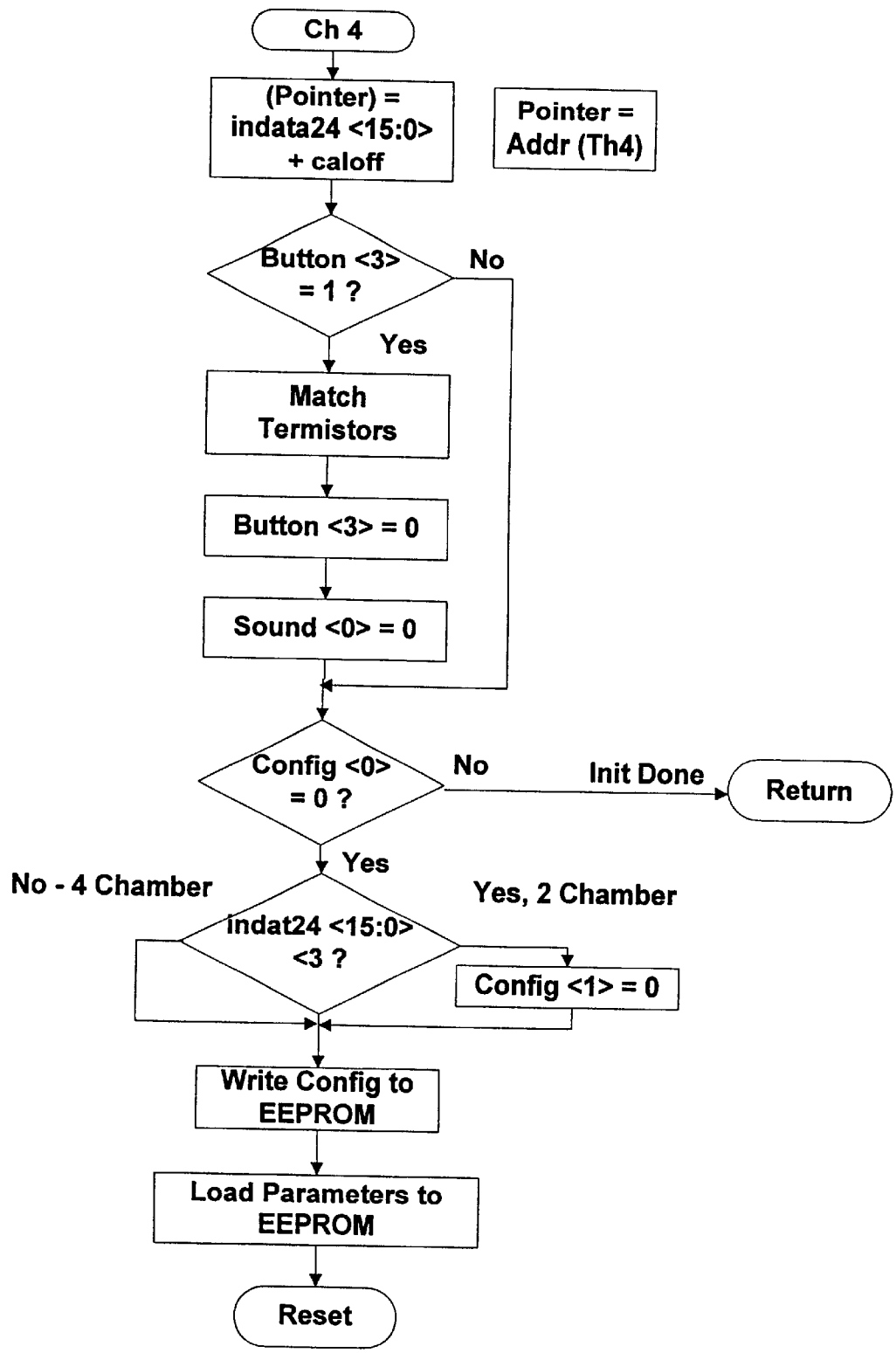

Referring to FIG. 26n, from node CH4, variable Pointer is set to the address of variable th4. Next, the contents of variable CALOFF are added to the least significant 16 bits of variable indata24 (the raw thermistor reading) and stored in a variable pointed to by variable Pointer (in other words, th4). The flag in variable button<3> is examined, and if a logic 0, there is no thermistor matching requested and control branches to the configuration logic. Otherwise, the thermistor matching subroutine is called. The flag in variable button<3> is cleared as acknowledgment of matching complete, the flag in variable sound<0> is cleared to silence the annunciator, and control proceeds to the configuration logic.

In the configuration logic, the flag in variable config<0> is examined, and if a logic 1 (unit already configured), control returns to the instruction following the call dispatch table. Otherwise, if the flag in variable config<0> was a logic 0 (unit not yet configured), the contents of variable indata24 are examined. If the contents are less than the value 3, then the multiplexer input for th4 is grounded and the flag in variable config<1> is set, indicating a 2-chamber configuration. Otherwise, a 4-chamber unit is assumed and the flag in variable config<1> is unchanged. Control proceeds to write variable config to EEPROM 128 and to move the hard-coded tuning parameters, appropriate for either a 2- or 4-chamber unit, from the microcontroller ROM to the EEPROM 128. Finally, control does not return but instead jumps to the RESET node to restart the system and instate the new configuration.

Figure 26O:
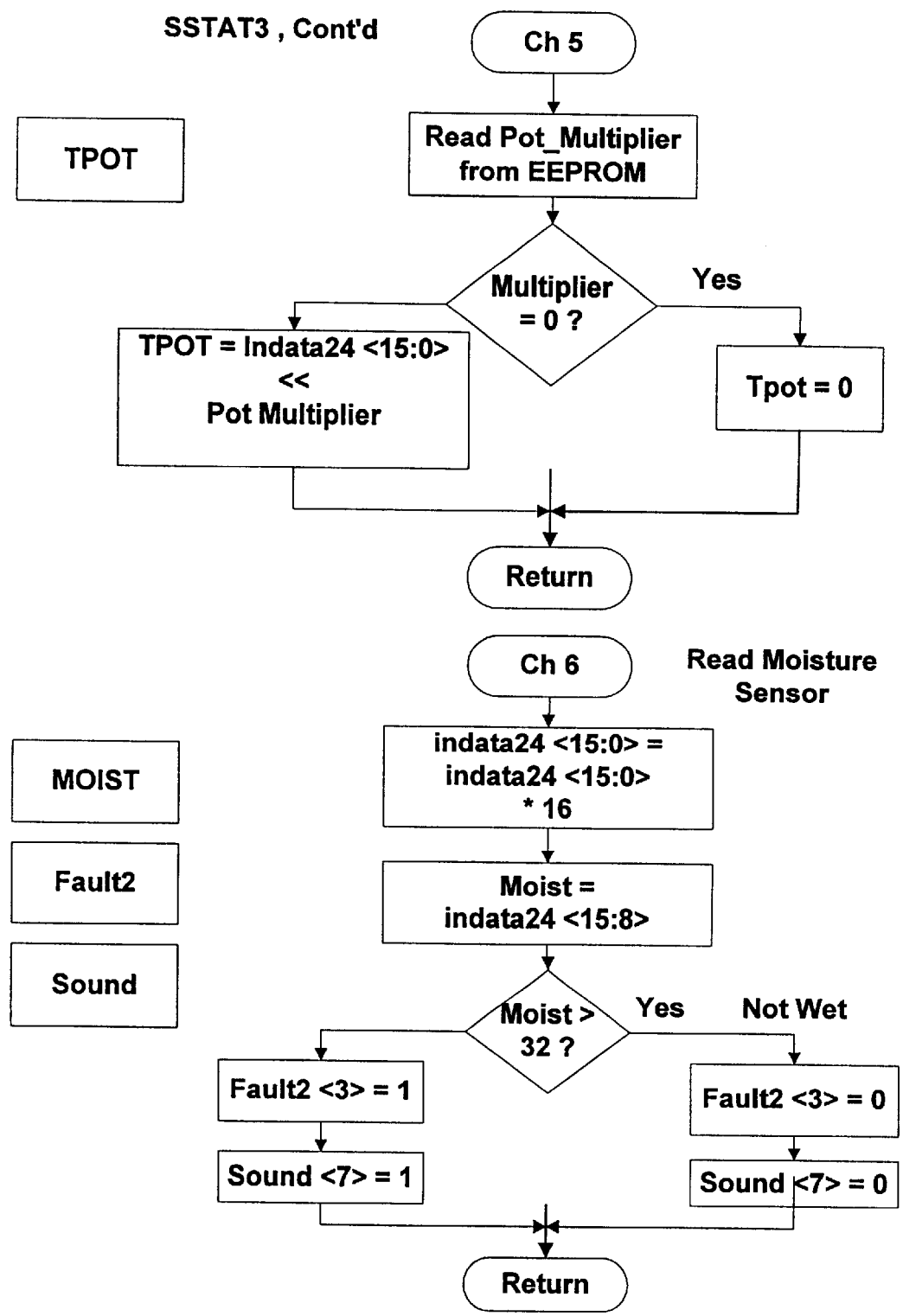

Referring to FIG. 26o, from node CH5, the variable pot_multiplier is read from EEPROM 128. If variable pot_multiplier is zero, variable tpot is cleared. Otherwise, the contents of variable indata24 are arithmetically shifted left by the value in variable pot_multiplier and the MSB of the result is stored in 8-bit variable tpot. Thus, values of 1, 2, 3, 4, and 5 have the effect of scaling by 2, 4, 8, 16, or 32. Value 0 has the special meaning of disabling the local setpoint for either fixed-temperature heating or for a remote temperature setpoint facility. After the variable tpot is changed, control returns to the instruction following the call dispatch table. The maximum value of 255 corresponds to approximately 20° F.

From node CH6, the contents of variable indata24 are multiplied by 16. The MSB of the result is extracted and stored in 8-bit variable Moist. If variable Moist exceeds 32, then insufficient moisture-induced conductivity is assumed and the flag in variable fault2<3> is cleared and the flag in variable sound<7> is also cleared. Otherwise, these same two flags are set. Control then returns to the instruction following the call dispatch table. The flag set in variable fault2<3> allows the LED to blink a specific moisture-detect error code and flag set in variable sound<7> causes a continuous alerting beep from the audible annunciator.

Figure 26P:
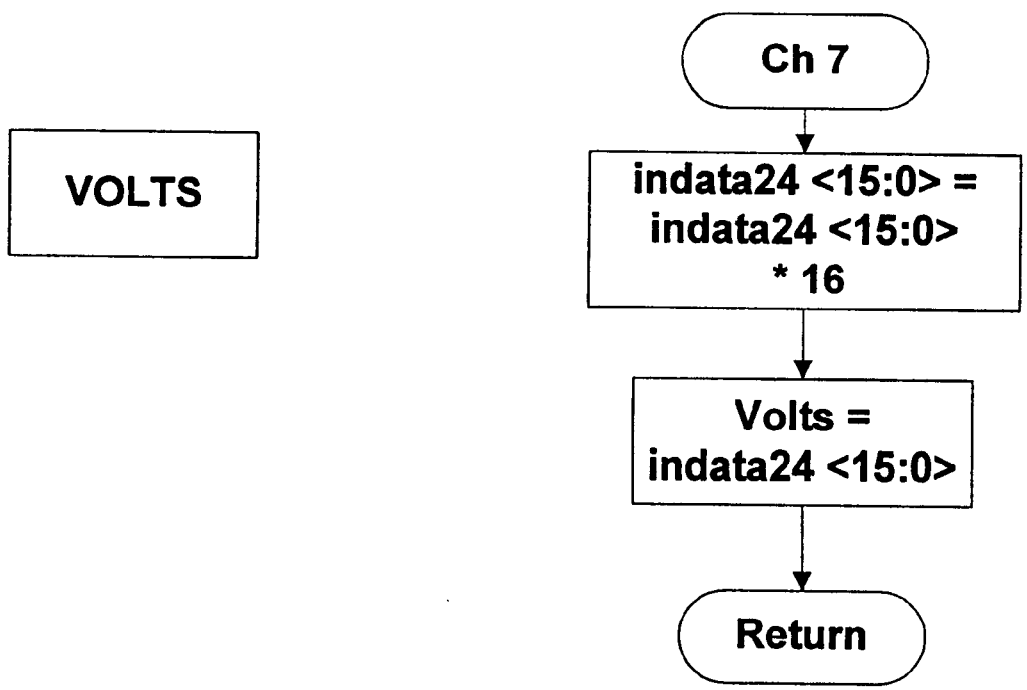

Referring to FIG. 26p, from node CH7, the contents of variable indata24 are multiplied by 16. The MSB of the result is extracted and stored in 8-bit variable Volts. Control then returns to the instruction following the call dispatch table. The variable Volts changes by one count for every 3 volts in the AC power mains voltage and is used by a limit comparison for under- and over-voltage detection.

Referring to FIG. 26k, control proceeds to node A after returning from any channel-specific handler CH0–CH7. Variable MUX is formatted bit-wise as illustrated with bits <4:2> providing a 3-bit hardware multiplexer address and bits <1> and <0> keeping track of which input device is read after all five thermistors are read. Variable MUX changes in accordance with the table of FIG. 26l, cycling through 15 values before repeating.

From node A, the multiplexer channel bit field <4:2> of variable MUX is incremented. Reading bit <5> in variable indicates a carry beyond this field. If set, counter rollover has occurred and variable MUX is cleared and control branches to end-of-scan logic. Otherwise, if rollover has not occurred, control proceeds to examine bit <4> in variable MUX. If clear, no further action is necessary and control branches to the state 3 exit code. Otherwise, if bit <4> in variable MUX was a 1, bit <3> in variable MUX is examined, and if it was a 1, control branches to end-of-scan-logic.

State 3 end-of-scan logic resets bits <4:2> of variable MUX, indicating the scan is done by setting the flag in variable global<4>, advances variable SSSTAT to state 8, and branches to state 3 exit code.

Otherwise, if bit <3> in variable MUX was a 0, bit <2> in variable MUX is examined, and if it was a 0, control branches to state 3 exit code. Otherwise, if bit <2> in variable MUX was a 1, bit <0> of variable MUX is examined and if it was a 1, variable MUX is forced to value $1A_h$ (or $11010^b$) and control branches to state 3 exit code. Otherwise, if bit <0> of variable MUX was a 0, bit <1> of variable MUX is examined and if it was a 1, bit <3> of variable MUX is set to 1. Whether bit <1> of variable MUX was a 0 or a 1, the field formed by bits <1:0> of variable MUX is incremented and control proceeds to state 3 exit code. Incrementing field <1:0> of variable MUX has the effect of selecting the next input channel of 5, 6, or 7 after channel 4 is read.

State 3 exit code loads bits <4:2> of variable MUX into bits <20:18> of variable out data24 in preparation for use in state 1. The A/D chip select is de-asserted and control returns to the instruction following the call to SSSDEVS.

Figure 26Q:
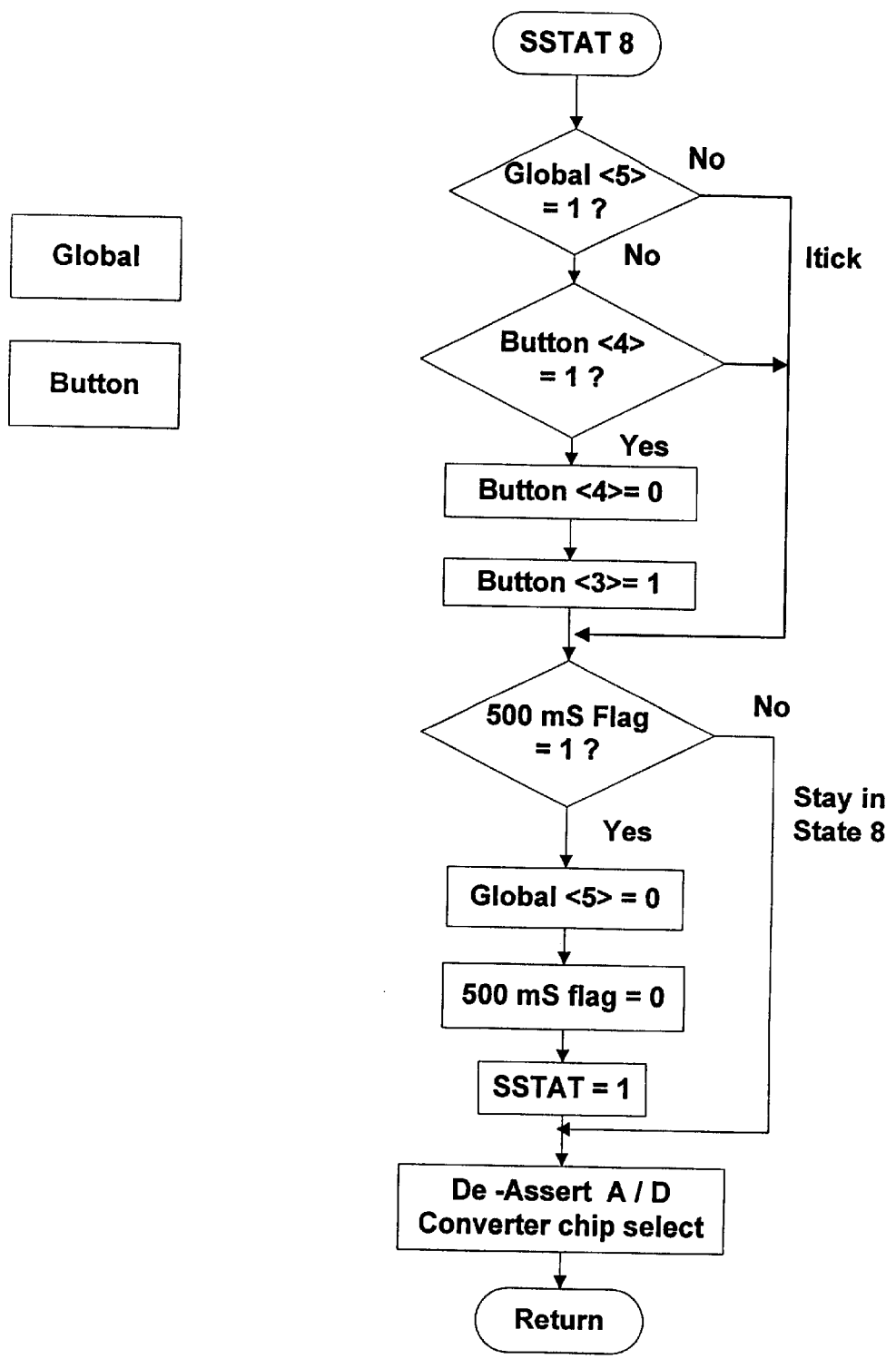

Referring to FIG. 26q, from node SSSTAT8, the flag in global<5> is examined, and if a logic 0, control branches to the LTICK logic. Otherwise, the flag in button<4> is examined and if a logic 0, control branches to the LTICK logic. Otherwise, the flag in button<4> is cleared as acknowledgment, the flag in button<3> is set, and control proceeds to the LTICK logic. The chaining process of sensing one flag and setting another is part of the handling of the Multifunction button when pressed for the thermistor matching process.

The LTICK logic examines the f500 ms flag set in the interrupt routine, and if a logic 0 branches to the state 8 exit code. Otherwise, if the f500 ms flag was set, the flag in variable global<5> is cleared, flagging that calculation is not done, the f500 ms flag is cleared as acknowledgment, the variable SSSTAT is advanced to 1 to start a new thermistor scan, and control proceeds to the state 8 exit code.

State 8 exit code de-asserts the A/D converter chip select and returns to the instruction following the call to SSS-DEVS.

Figure 27:
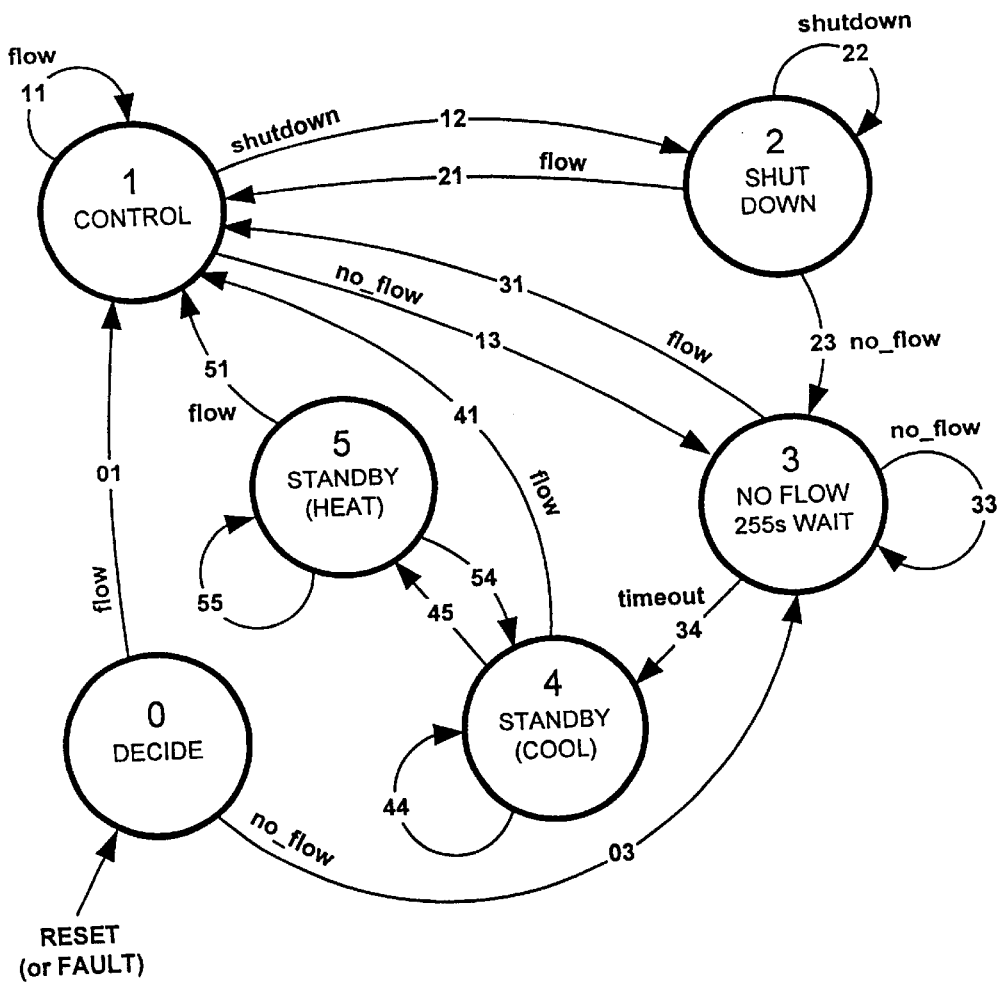
FIG. 27 is a schematic flow diagram of a control state machine.

Next, the CONTROLM module is called, which begins calculations if the global<4> flag is set. Otherwise, execution simply returns to the next module in the MAINL loop. CONTROLM performs the following calculations in sequence:

1. inctime—increment the time log value by 0.5 seconds
2. do_dtn—compute delta T for each of the thermistor values
3. do_avg—compute the average temperature of T1 . . . T4
4. difffit8—differentiate Tavg
5. dot_sp—calculate the setpoint based on the potentiometer reading
6. superv—supervise values and setlclear flags based on thresholds
7. trigger a new log line, unless stalled by incoming characters
8. chth—check the thermistor values
9. clear the control state if any fault
10. cmswitch—call the control state machine
11. signal the A/D reading routine that a new scan is needed
12. signal the power modulator that it's time to alternate the phase Actual calculation of the power level needed to be applied to the element is performed in the CONTROL state of the Control State Machine, described as follows:

Referring to FIG. 27, a schematic flow diagram of a control state machine, according to the preferred embodiment of the invention, is illustrated. The Control State Machine is a software module that defines six unique states for the fluid heater control system, numbered 0 through 5. These states are:

| STATE | DESCRIPTION |
| --- | --- |
| 0 | INDETERMINATE |
| 1 | CONTROL |
| 2 | SHUTDOWN |
| 3 | NO FLOW, WAIT FOR STANDBY |
| 4 | STANDBY, WAIT TO APPLY POWER |
| 5 | STANDBY, APPLY POWER |

Specific conditions cause transitions between states, such as going from a no-flow to a flow condition, or vice-versa. Maintained conditions such as sustained flow, continued no-flow, or a timer not having timed out cause the Control State Machine to remain in the same state.

Table 8 below defines the conditions necessary to make the transition between states. A definition of what criteria are used to set flags is discussed hereinbelow.

TABLE 8

Control State transitions

| TRANSITION | TAKEN IF... |
|---|---|
| 01 | NO-FLOW flag is cleared |
| 03 | NO-FLOW flag is set |
| 11 | SHUTDOWN flag is cleared and MAX GRADIENT flag is cleared |
| 12 | SHUTDOWN flag is set |
| 21 | NO-FLOW flag is cleared and CMTIMER is zero and SHUTDOWN flag is cleared |
| 22 | NO-FLOW flag is cleared and CMTIMER is not zero or SHUTDOWN flag is set |
| 23 | NO-FLOW flag is set |
| 31 | NO-FLOW flag is cleared or CHG FLOW flag is set |
| 33 | NO-FLOW flag is set and FLOW TIMER is not zero or CHGFLOW flag is cleared |
| 34 | FLOW TIMER is zero |
| 44 | NO-FLOW flag is set and MIN GRADIENT flag is set and the COLD flag is cleared |
| 45 | NO-FLOW flag is set and MIN GRADIENT flag is cleared |
| 51 | NO-FLOW flag is cleared |
| 54 | NO-FLOW flag is set and MAX GRADIENT flag is set and COLD flag is cleared |
| 55 | NO-FLOW flag is set and MAX GRADIENT flag is cleared or COLD flag is set |

The control state preferably is updated twice per second by measuring thermistor values, and calculating universally used values such as $T_{AVG}$, and setting or clearing flags.

Subroutines nf (no flow) and sd (shutdown) are called twice per second to examine temperature and other derived values and set or clear global, fault1 and flow flags.

A standby condition is maintained by keeping a small gradient (thermocline) in the second chamber as measured by the difference between th1 and th2. During standby, when the gradient falls below gradmn, heat is applied to the second chamber. When the gradient rises an amount equal to gradmx, heat is turned off. The constant gradmn is equal to 15 or about 1.5° F. and gradmx is equal to 20 or about 2.0° F. above gradmn. The average gradient during standby is about 4° F.

Figure 29:
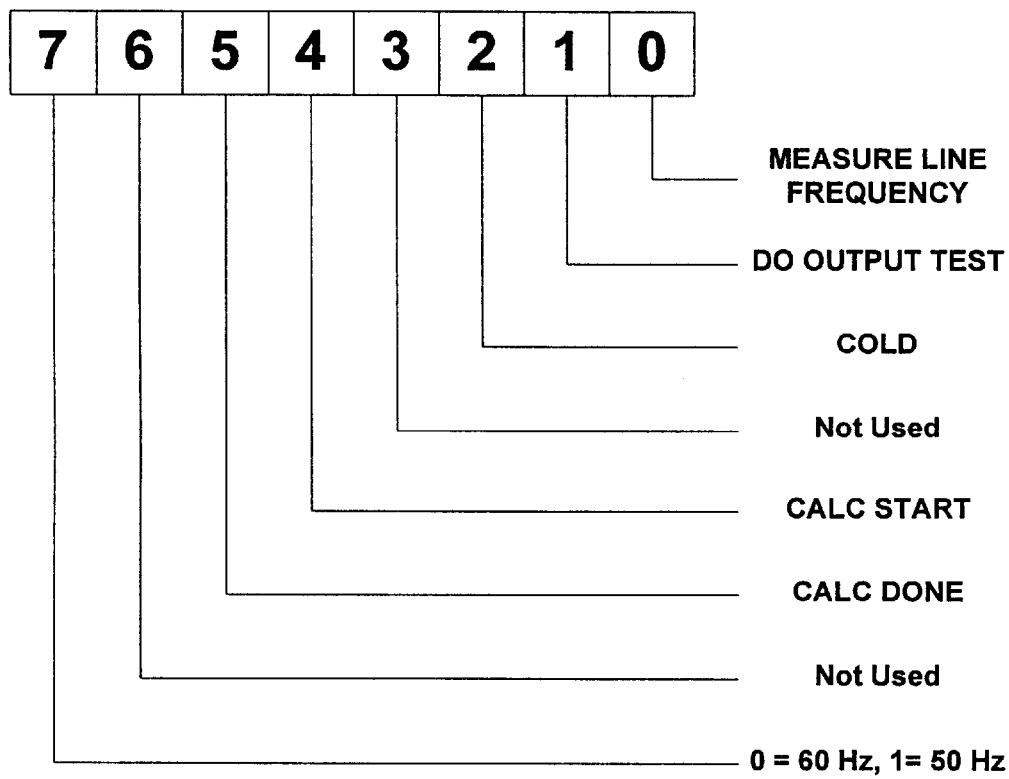
FIG. 29 is a table showing the flag usage within a global variable.
Figure 30:
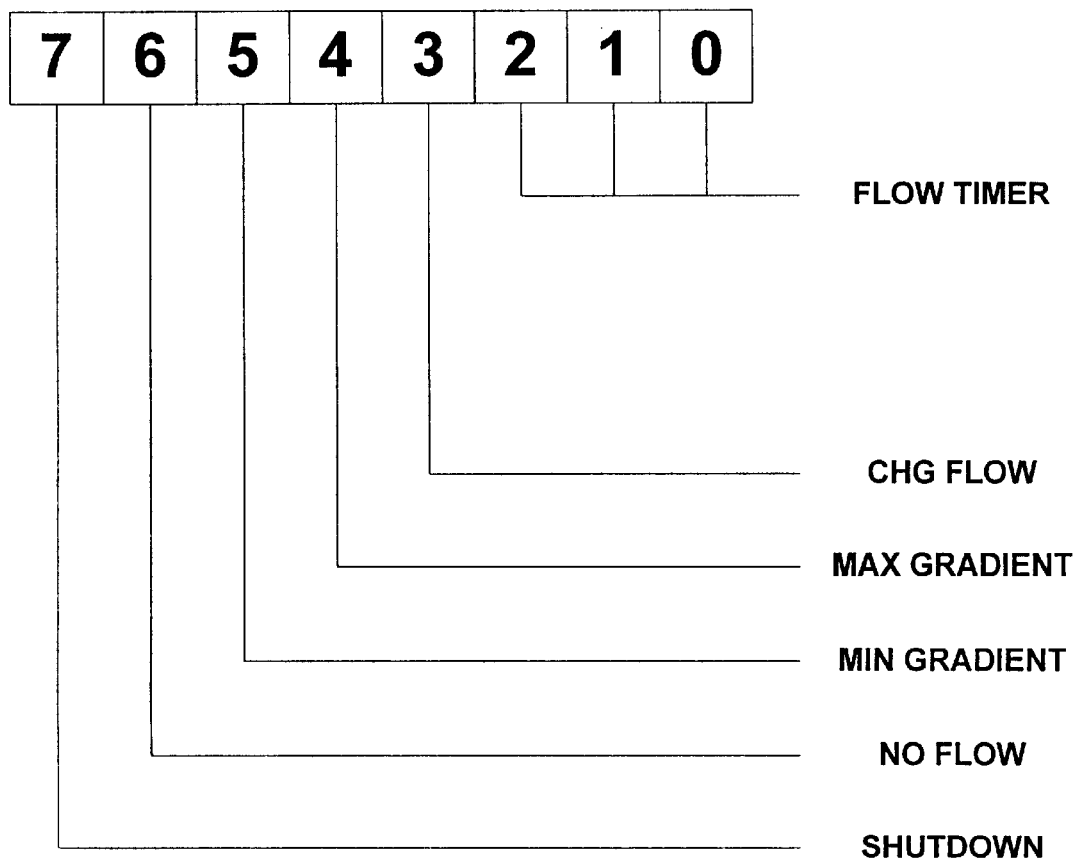
FIG. 30 is a table showing the flag usage within a flow variable.

Referring now to FIGS. 29 and 30. FIG. 29 shows the flag usage within the global variable, and FIG. 30 shows the flag usage within the flow variable.

The COLD flag (global.2) is set if variable tavg is below 40° F., signifying that a small amount of heat should be added to all chambers to prevent freezing.

The FLOW TIMER (flow.2–flow.0) is a three-bit counter which in use is initialized to 7 and counted down to zero.

The CHG FLOW flag (flow.3) is set when the absolute value of the derivative derivt>1 and is cleared otherwise.

The MAX GRADIENT flag (flow.4) is set if(th1−(th2+epsilon)>=gradmn)−gradmx and is cleared otherwise.

The MIN GRADIENT flag (flow.5) is set if th1−(th2+epsilon)>=gradmn and is cleared otherwise.

The NO-FLOW flag (flow.6) is set if th1>=(th2+epsilon), where epsilon is equal to 25 or about 2.5° F. and is cleared otherwise.

The SHUTDOWN flag (flow.7) is set if th1>=tsp and is cleared otherwise. The following is a description of each state:

State 0—Indeterminate

State 0—Indeterminate is entered after the hardware is initialized when power is first applied, or if the software watchdog timer has expired. All elements are turned off. If the NO-FLOW flag was set, State 3—No-Flow is next entered. Otherwise, State 1—Control is next entered.

State 3—No Flow

State 3—No Flow may be entered from any one of three conditions:

State 0—Indeterminate if the NO-FLOW flag was set (03).

State 1—Control if SHUTDOWN flag was cleared and MAX GRADIENT flag was set (01).

State 2—Shutdown if the NO-FLOW flag was set (23).

All elements are turned off. If the NO-FLOW flag was cleared (possible coming only from State 3—Control(33)), then the next state just returns to State 3—Control (33)

If both NO-FLOW and CHG FLOW flags were set, State 1—Control is next entered (31).

If the NO-FLOW flag was set and the CHG FLOW flag was cleared, FLOW TIMER is initialized to 1 and State 4—Standby(cool) is next entered (34)

State 4—Standby (cool)

State 4—Standby (cool) is entered from State 3 as a result of the NO-FLOW flag set and the CHG FLOW flag cleared. If the NO-FLOW flag is now cleared, State 1—Control is next entered (41). Otherwise, the FLOW TIMER is examined to see if it has counted down to zero, and if it has, State 5—Standby (heat) is next entered (45). Otherwise, the state remains in State 4—Standby (cool) (44). If the FLOW TIMER was nonzero, it is decremented (toward zero). If the MAX GRADIENT flag was set, the FLOW TIMER is reinitialized to 7 to allow more time for cooling.

State 4—Standby (cool) is entered from one of two other conditions:

State 3—NO_FLOW when FLOW TIMER goes to zero (34)

State 5—Standby, (heat) NO-FLOW flag was set and the MAX GRADIENT flag was set and the global COLD flag is not set (i.e., the temperature is not approaching freeze threshold) (54).

Otherwise, if the NO-FLOW flag is cleared, State 1—Control is next entered (51).

Otherwise, if the MIN GRADIENT flag was set, the global COLD flag is set and control remains in State 4 (44).

Otherwise, if the MIN GRADIENT flag was cleared, State 4—Standby (heat) is next entered with variable power=1 (45).

State 5—Standby (heat)

State 5—Standby (heat) is entered from State 4—Standby (cool) (45).

If the NO-FLOW flag was cleared, State 1—Control is next entered (51).

Otherwise, if MAX GRADIENT flag was cleared or the global COLD flag is set, control remains in State 5 (55).

Otherwise, there is enough heat and State 4—Standby (cool) is next entered with variable power=0 (54)

State 1—Control

State 1—Control is entered from any one of six states:

State 0—Indeterminate when the NO-FLOW flag is cleared (01).

State 3—No Flow when the NO-FLOW flag is cleared or the CHG FLOW flag is set (31).

State 4—Standby(COOL) when the NO-FLOW flag is cleared (41).

State 5—Standby (HEAT) when the NO-FLOW flag is cleared (51).

State 2—Shutdown when the NO-FLOW flag is cleared and variable cmtimer is zero and the SHUTDOWN flag is cleared (21).

Normally, subroutine control is called inside State 1 to perform the PID loop calculations and deliver the appropriate power to the elements. However, if the SHUTDOWN flag was set, variable cmtimer is initialized to 2, all elements are shut off, and State 2—Shutdown is next entered (12).

Otherwise, if the MAX GRADIENT flag was set, all elements are shut off and State 3—No Flow is next entered (13).

Otherwise, if the MAX GRADIENT flag was cleared, subroutine elemt is called to test the elements, subroutine control is called to perform the PID loop calculations, and control remains in State 1.

State 2—Shutdown

State 2—Shutdown is entered from State 1—Control when the SHUTDOWN flag was set (12).

If the NO-FLOW flag was set, State 3—No Flow is next entered (23).

Otherwise, if variable cmtimer is not yet zero or if the SHUTDOWN flag is set, control remains in State 2 (22).

If variable cmtimer is zero and the SHUTDOWN flag is cleared, State 1—Control is next entered (21).

Next, the CHECKI module is called to check for common heater fault conditions and depression of the Multi function Button. CHECKI begins by sampling the state of the 32.768-kHz signal which drives the level detect circuitry, reading the level detect circuitry output, and waiting for a low-to-high transition of the 32.768-kHz signal. Logic within the CHECKI module processes a Multifunction Button press. It flags a relay test if the high limit switch is open or flags a thermistor matching process if the Multifunction Button was held in for more than about 5 seconds and there are no thermistor faults and Tavg was flat.

Inputs sourced from the +28 volt relay power are sampled at times corresponding to the power line waveform peaks. The CHECKI module also acts as a digital filter with hysteresis, incrementing a counter to a max of FFh when logic zero inputs from the level detect circuitry are received, and decrementing a counter to a minimum of 0 when square wave inputs are received.

Continuing with the flowchart of FIG. 25a, when execution returns from the CHECKI module, the state of the DISABLE switch is sensed. If it was open, control bypasses the MODULATE code via node B to Communications Task of FIG. 25c. Otherwise, control flows via node A to FIG. 25c where a test is made to check if the system EEPROM 128 was configured. If not, control bypasses the MODULATE code as before. Next, the state of the STROBE pin is toggled. When the STROBE signal transitions from a logic low to a logic high level, the hardware watchdog timer is reset, thereby enabling the drive to the relays and heating elements.

Next, the global<6> flag is examined, and if set it means that a relay test is in progress and control branches via node B, bypassing the MODULATE code as before described. Otherwise, then the delayed line crossing flag is sensed, and if cleared, the MODULATE code is bypassed. Otherwise the line crossing flag is cleared as an acknowledgment and control flows to the MODULATE code. The line crossing flag is set by the interrupt routine after the power line waveform has crossed zero. A detailed description of the interrupt routine follows this description of the main loop of the microcontroller program.

The MODULATE module is executed once for every half cycle of the power line waveform. As described in more detail later, it takes into account the desired power level, which of an 8-phase sequence the power line waveform is in and which half-second dc cancellation phase and turns on or off each element for a given half cycle. This process is performed in a manner that allows 120 gradations of power level (or 60 for a two-chamber heater) without inducing light flicker.

The Communications Task module follows the MODULATE code and is responsible for checking for incoming commands on the serial communications line. These commands are formatted in accordance with the predefined command set. End-of-message is sensed by a carriage return (CR) character or buffer full. When any character is received, logging, if activated, is stopped. This "half-duplex" practice is an economy derived from using the same communications buffer for both transmission and reception. Incoming characters are echoed and assembled commands are parsed and executed.

Following the Communications Task module, the F100MS flag is sensed, and if cleared, control branches via node C around all code executed on a 1/10th-second basis. Otherwise, the F100MS flag is cleared as an acknowledgment and the relay timer used in the Relay State Machine, KTIMER, is decremented if nonzero.

Next, the RELAYS module is executed, which enters the Relay State Machine in accordance with the value in the variable kstate. The RELAYS module handles the sequencing of energizing the relays prior to energizing any elements, and de-energizing relays after an appropriate period of heater non-use. When the Multifunction Button activates the relay test, the RELAYS module cycles the relays through their alternating states.

Next, the SIGCODE module is entered which is responsible for blinking codes on the red/green LED and sounding the aural annunciator. It examines the state of the four fault bytes and, if any bits are set, outputs a blink code in red flashes with audible beeps. Special conditions such as Multifunction Button acknowledgment and moisture detection yield different tones. Otherwise, the SIGCODE module keeps the Visual indicator LED blinking green flashes at a 1-Hz "heartbeat" rate.

Figure 25D:
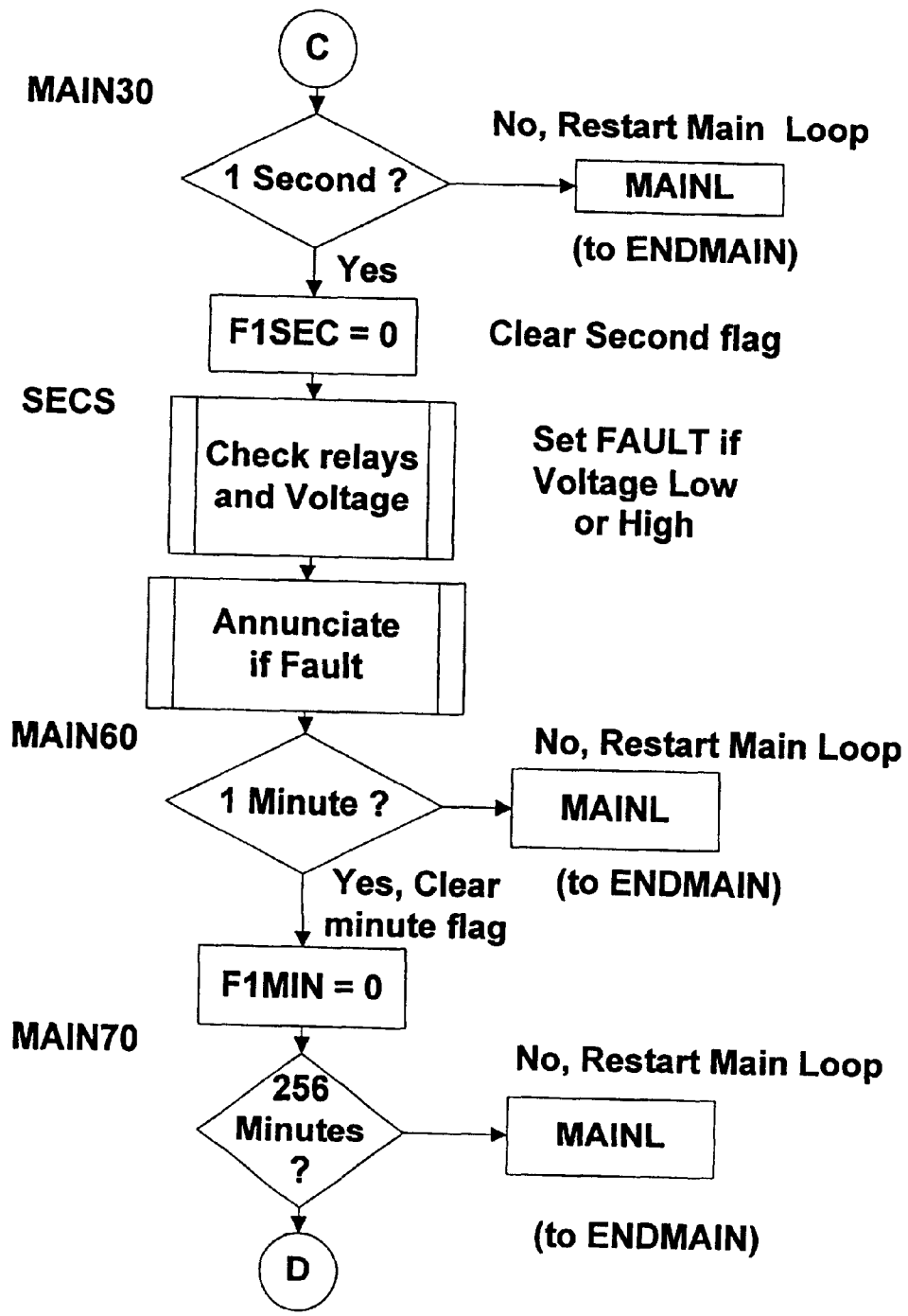

From the SIGCODE module, control flows via node C to FIG. 25d where the F1SEC flag is sensed, and if cleared, the program loops back to the beginning of the MAINL loop. Otherwise, the F1SEC flag is cleared as an acknowledgment and control proceeds to the Check Relays and Voltage module.

In the event that the relays are open, the AC power line voltage is measured by comparing the value in the variable Volts to predetermined limits. This variable was previously updated by a read operation in the A/D module. Fault flag fault2<1> is set for high voltage-greater than about 270V, and flag fault2<2> is set for low voltage—below about 198V. These readings are a function of the nominal control transformer primary voltage (230V), and the ratio of the voltage divider across the unregulated dc bus in the power supply.

Next, the contents of the four fault bytes are examined and parsed into beep and blink codes. It is the interrupt service routine, however, which actually drives the port that outputs an audio frequency square wave to the piezo annunciator driver transistor.

Figure 25E:
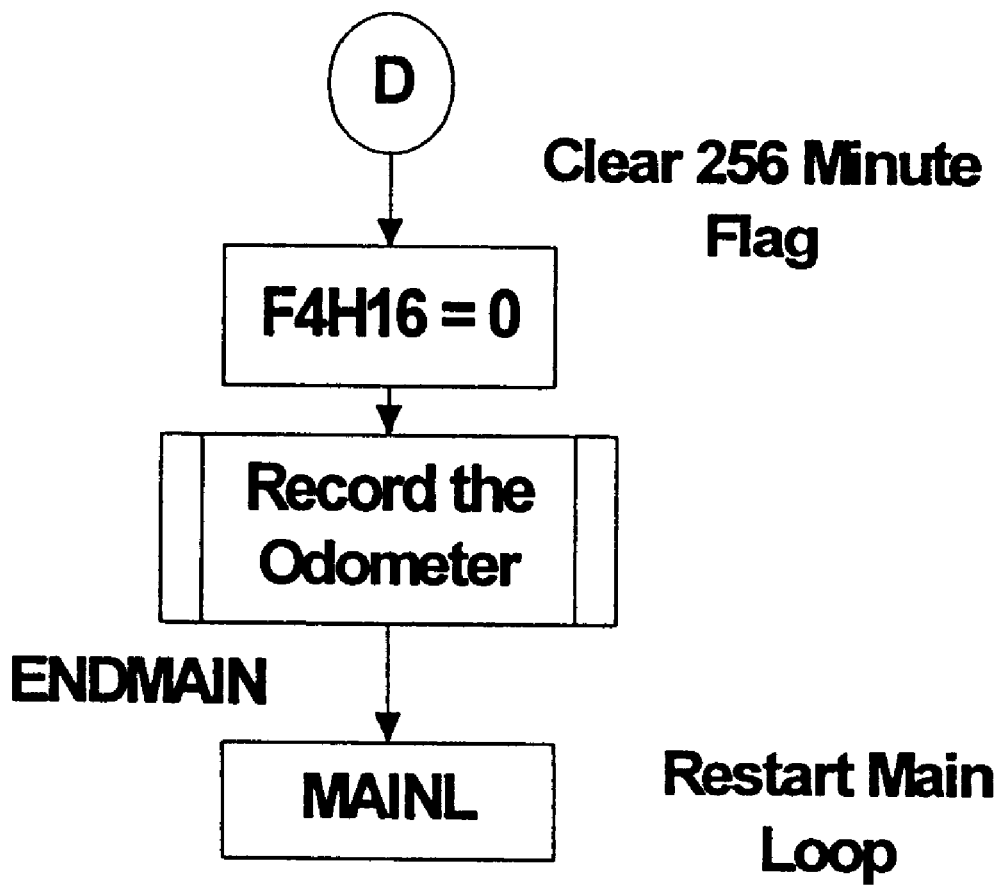

Finally, the F1MIN and F4H16 flags are sensed, and if cleared, the program loops back to the beginning of the MAINL loop. Otherwise, the respective flag(s) is cleared as acknowledgment and the odometer word inf FIG. 25e is read from EEPROM 128, incremented, and written back to EEPROM 128.

Figure 28A:
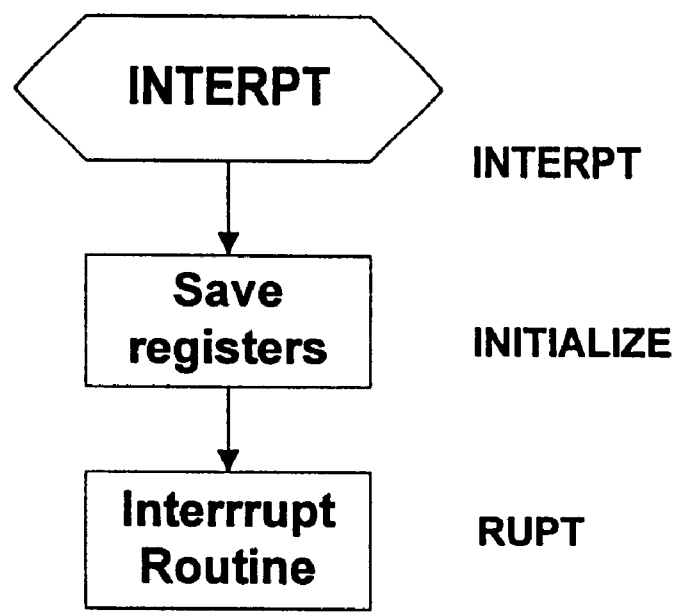
FIGS. 28a–28f are a schematic flow diagram of an interrupt routine, according to the preferred embodiment of the invention.
Figure 28B:
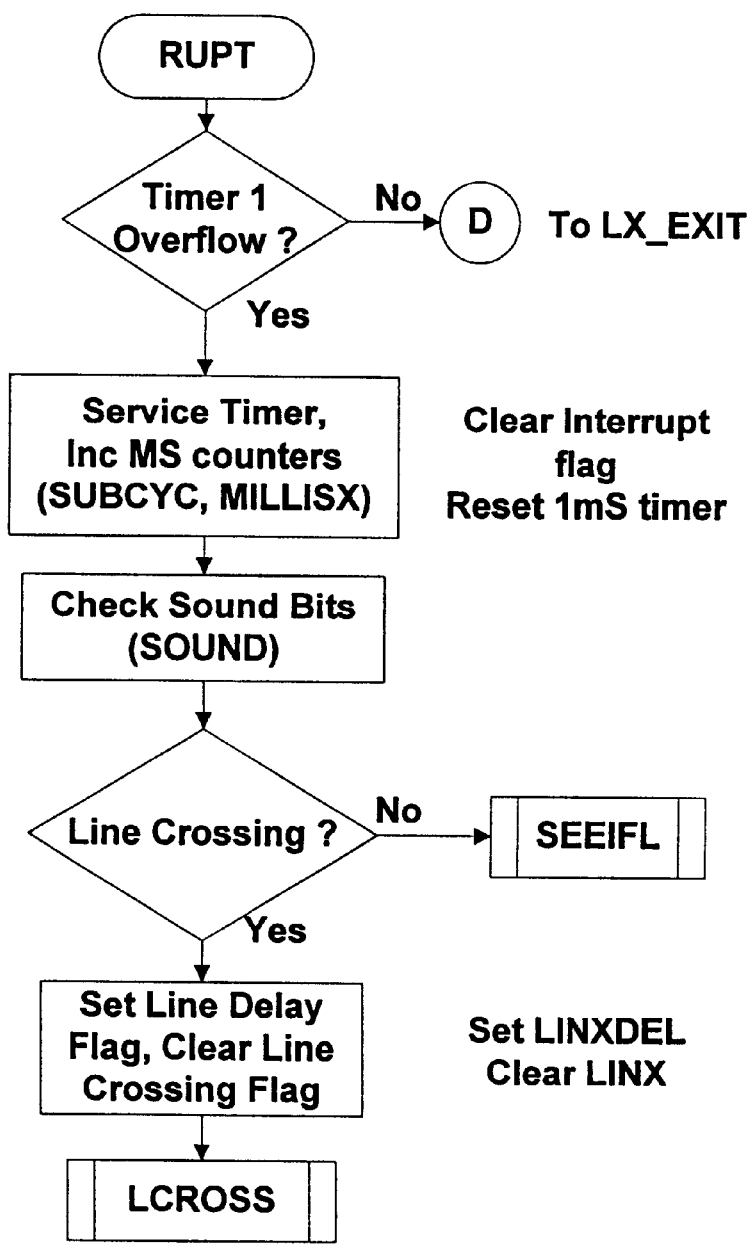
Figure 28C:
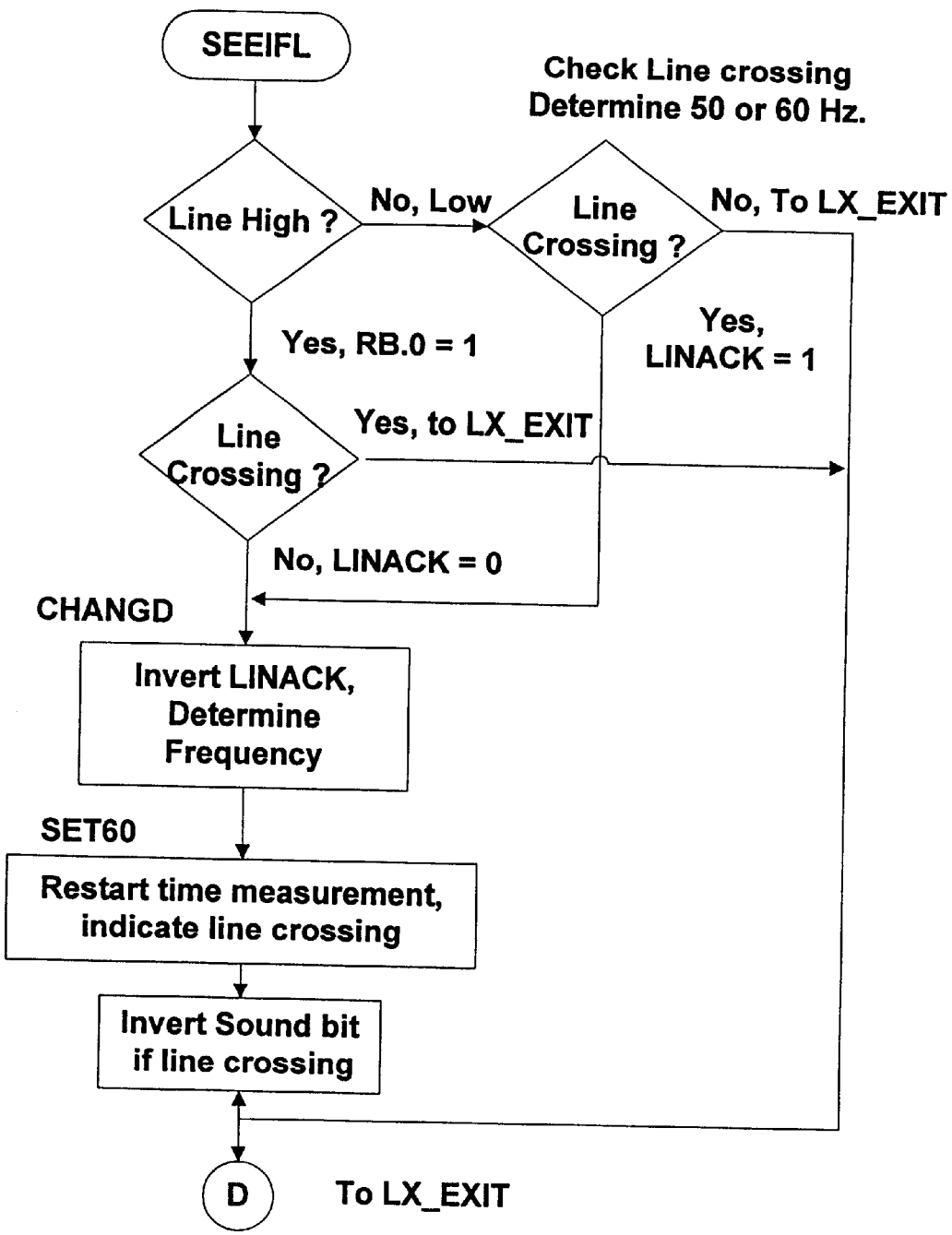
Figure 28D:
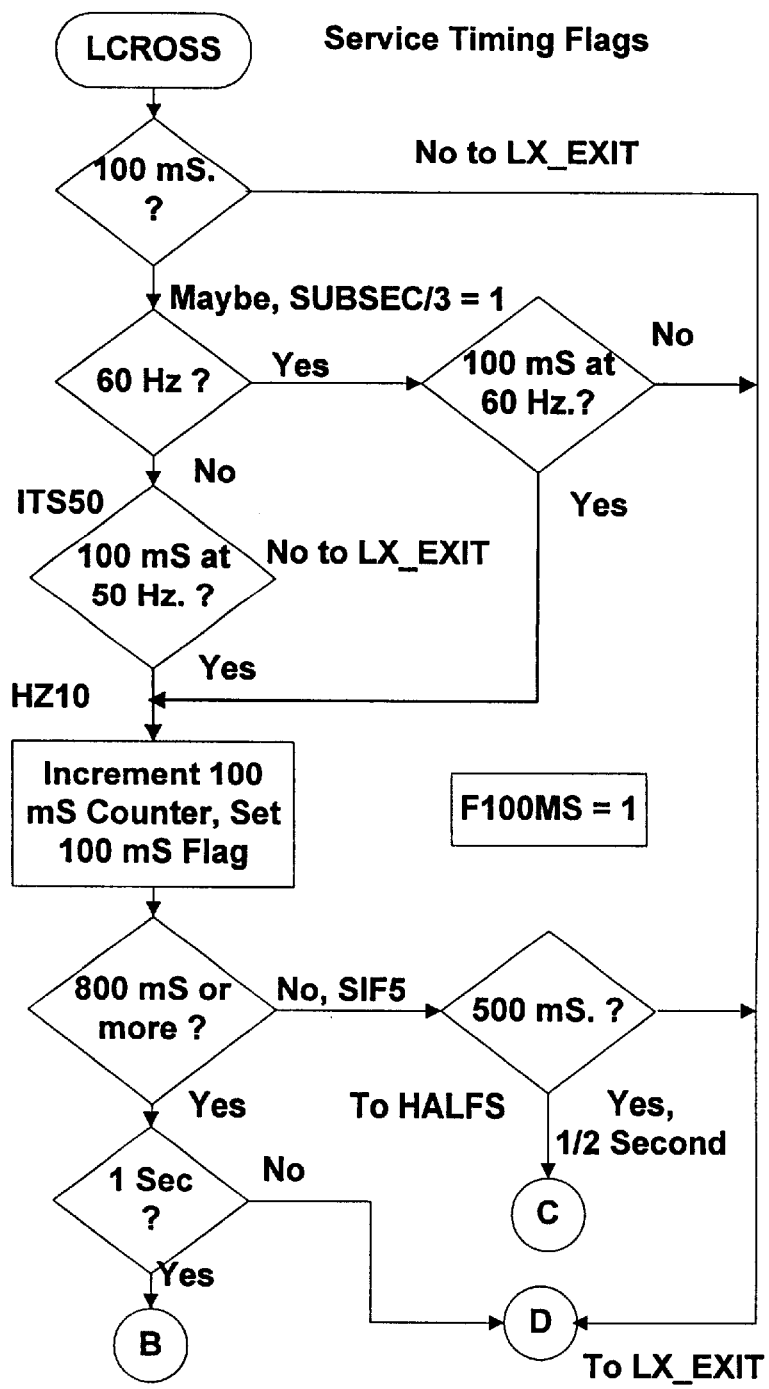

Referring to FIGS. 28a–28f, a schematic flow diagram of an interrupt routine, according to the preferred embodiment of the invention, is illustrated. FIG. 28a shows the beginning of the interrupt service routine. For the heater's microcontroller, interrupts are caused by either a timer expiring or by the communications hardware (USART). When an interrupt is received, the address of the currently executing location of the MAINL program is saved on the return address stack. Next, the microcontroller's W, STATUS, PCLATH, and FSR registers are saved. Special RAM locations are set aside for interrupt usage and communications between the interrupt routine and the MAINL program.

Timer interrupts occur at the rate of approximately 1000 per second. Communications interrupts occur at the rate of approximately 240 per second at 2400 baud. With each instruction taking about 1 μs to execute, an interrupt occurs every 1,000 instructions, so interrupt code is written for speed efficiency. From the interrupt register save routine, control proceeds to the RUPT node on FIG. 28b. The Timer1 flag is sensed, and if cleared, control branches around all timer-related code to node D on FIG. 28f. Otherwise, the Timer1 flag is cleared as an acknowledgment and the millisecond timers are incremented. Special "sub-cycle" software counters are also incremented which allow a power line waveform half-cycle (8.33 ms at 60 Hz or 10 ms at 50 Hz) to be split into smaller time increments.

Next, the SOUND module is executed if the SIGCODE module in the MAINL program has requested sound. The output port leading to the piezo annunciator driver is toggled at one-half, one-quarter, or one-eighth of the interrupt rate for a tone of 500, 250, or 125 Hz. The toggling technique delivers a 50% duty cycle with a strong fundamental tone.

From the SOUND module, the linx flag is sensed to determine if 1 ms has elapsed from the last crossing of the power line waveform. If not, control branches to the SEEIFL module where the power line frequency is continuously measured against the 1 ms timing reference and flag global<7> is cleared for 60 Hz and set for 50 Hz. The subcycle counter is also cleared after each power line crossing. At the completion of the SEEIFL module, control continues through node F to the COMM interrupt handler on FIG. 28f.

Otherwise, if the linx flag was set, control branches instead to the LCROSS module where the subsec counter is incremented and, based on whether the global<7> flag was set, checks for a count of either 12 for 60 Hz or 10 for 50 Hz. When the count is reached, 100 ms of half-cycles of the power line waveform have been counted. Thus, the divided 50- or 60-Hz timing provides 100 ms, 500 ms, one second, etc timing flags, thus assuring that the slower events are synchronized to an exact multiple of the power line frequency.

Figure 28E:
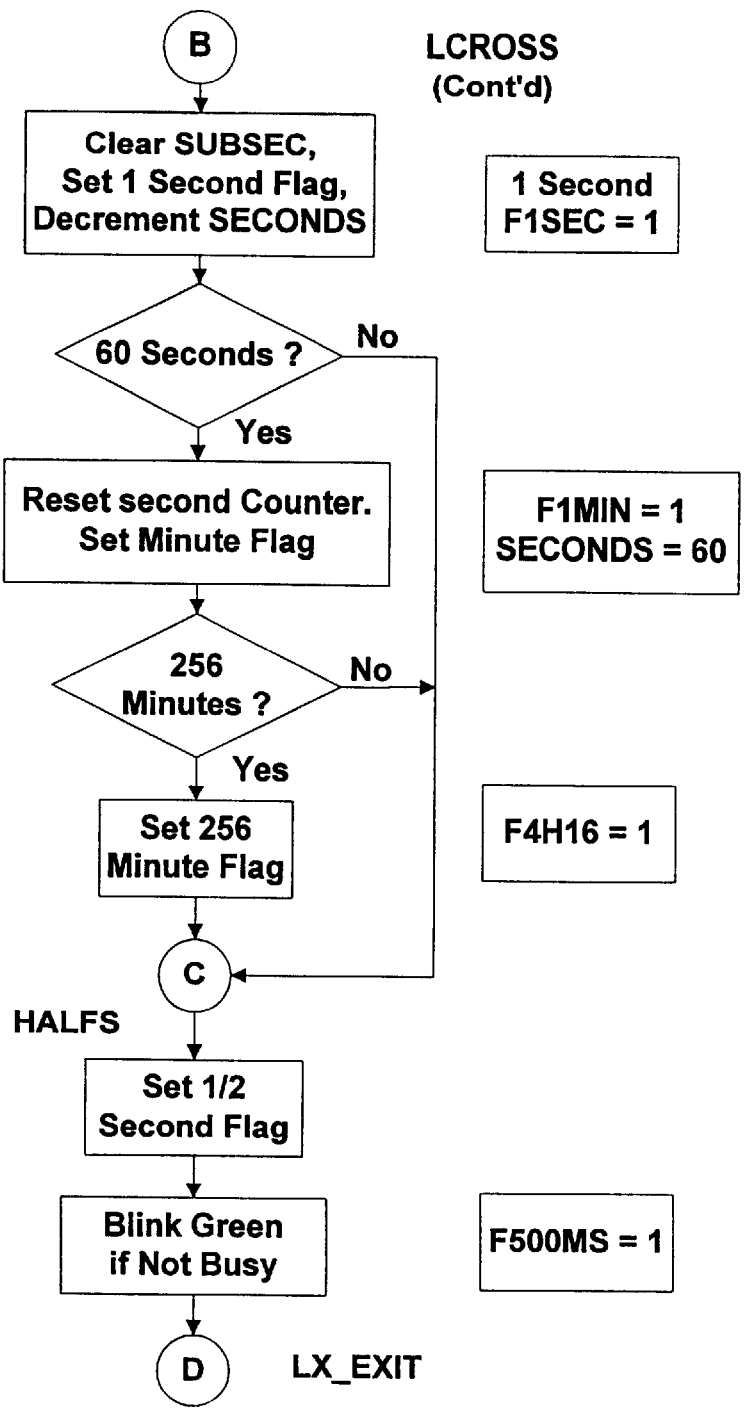
Figure 28F:
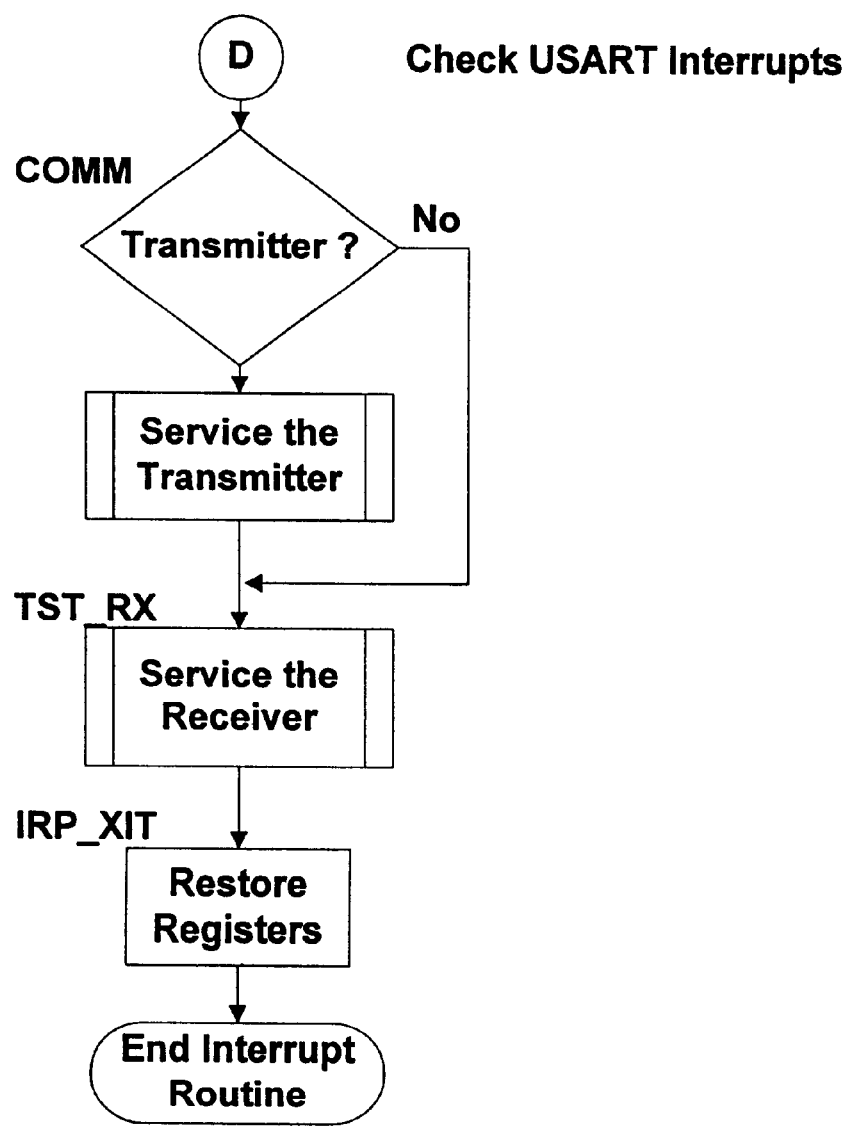

When the one second marker is reached, control flows through node B to FIG. 28e where counting accumulates for the setting of the one minute and 256 minute flags. The one minute flag can be used to send a minute marker at the end of the log line. The 256 minute flag represents a 4 hour, 16 minute period convenient for updating the odometer location without writing the EEPROM 128 excessively. From the one second processing, control continues at node C.

When the 500 ms marker is reached, control flows through node C to FIG. 28e where the f500 ms flag is set and used to start a new thermistor measurement cycle and blink the LED (only if green). From the 500 ms processing, control continues through node D to the COMM interrupt handler on FIG. 28f.

In the COMM interrupt handler, either the transmit or the receive (or both) hardware portion of the USART could have caused an interrupt. The transmit interrupt hardware flag is sensed, and if set, the next character in the communication array is loaded into the USART transmit register. This process continues for each interrupt until the variable xbc (transmit byte count) is decremented to zero. Next, the receive interrupt hardware flag is sensed, and if set, the program stops any transmission in progress, clears the communication array, inputs the character just received from the USART receive register and stores it at the next location in the communication array. If a CR character was received, or if the communication array becomes full, the MAINL program is flagged to process a command line.

Figure 31:
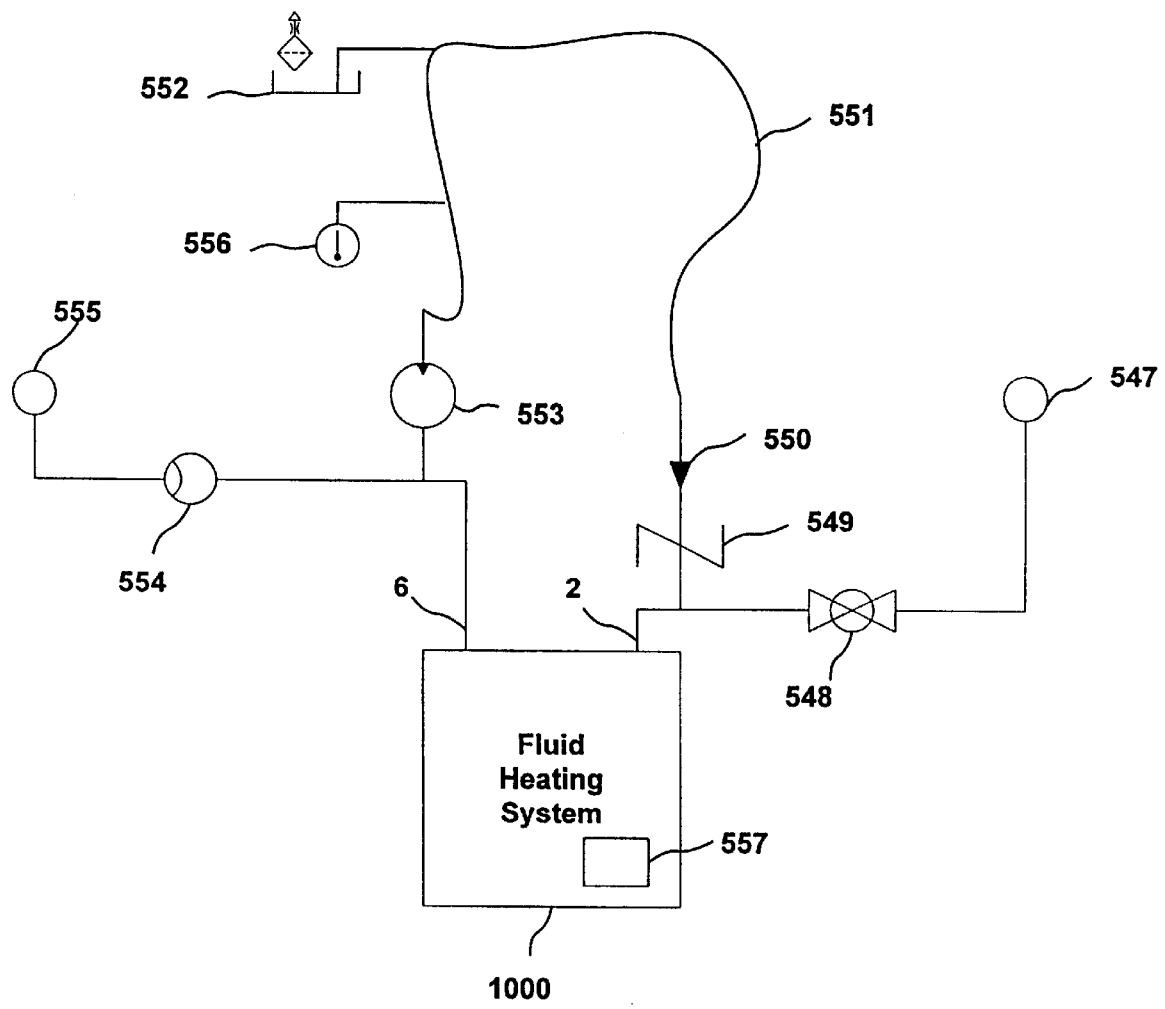
FIG. 31 is a schematic diagram of a recirculating heating system.

FIG. 31 shows a diagram of an example recirculating heating system using the fluid heater. In a system in which heat is supplied to an area for space heating, melting ice, or process warming, the system may be able to heat sufficiently with 118 degree F. water. If this is the case, then the same water that heats the area can be used to supply hot water for other uses. If the space heating application requires a different temperature, then the system needs to know when the differing uses are in operation. In this example, a flow switch is fixed in the outlet line to the house plumbing to indicate when temperature should be suitable for that use. During times of space heating use, the recirculating pump is controlled by a thermostat and the system will make appropriate heat for that use.

Referring to FIG. 31, the cold water inlet 547 is coupled to the system in a normal fashion using a flow shutoff valve 548. The fluid heating system 1000 receives fluid flow to its input port 2, applies the proper energy to heat the fluid to the necessary setpoint A and passes this fluid to its output 6. Recirculating pump 553 causes flow of the fluid to be circulated around the fluid loop 551 that traverses the area to be heated in direction of flow 550. When thermostat 556 indicates to the logic circuit 557 the need for heat, power will be added to meet the necessary temperature rise. Somewhere in the loop, and preferably at the highest point, an automatic float vent valve 552 is installed to remove any residual air from the system. The check valve 549 prevents cold water from circulating in a reverse direction should the pump 553 be off. In normal space-heating operation, the fluid flow sensor will not be indicating any flow to the control logic circuit.

From the COMM interrupt handler, the saved contents of the FSR, PCLATH, STATUS and W microcontroller registers are restored and a RETURN instruction is executed to continue MAINL program execution.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

Figure 32:
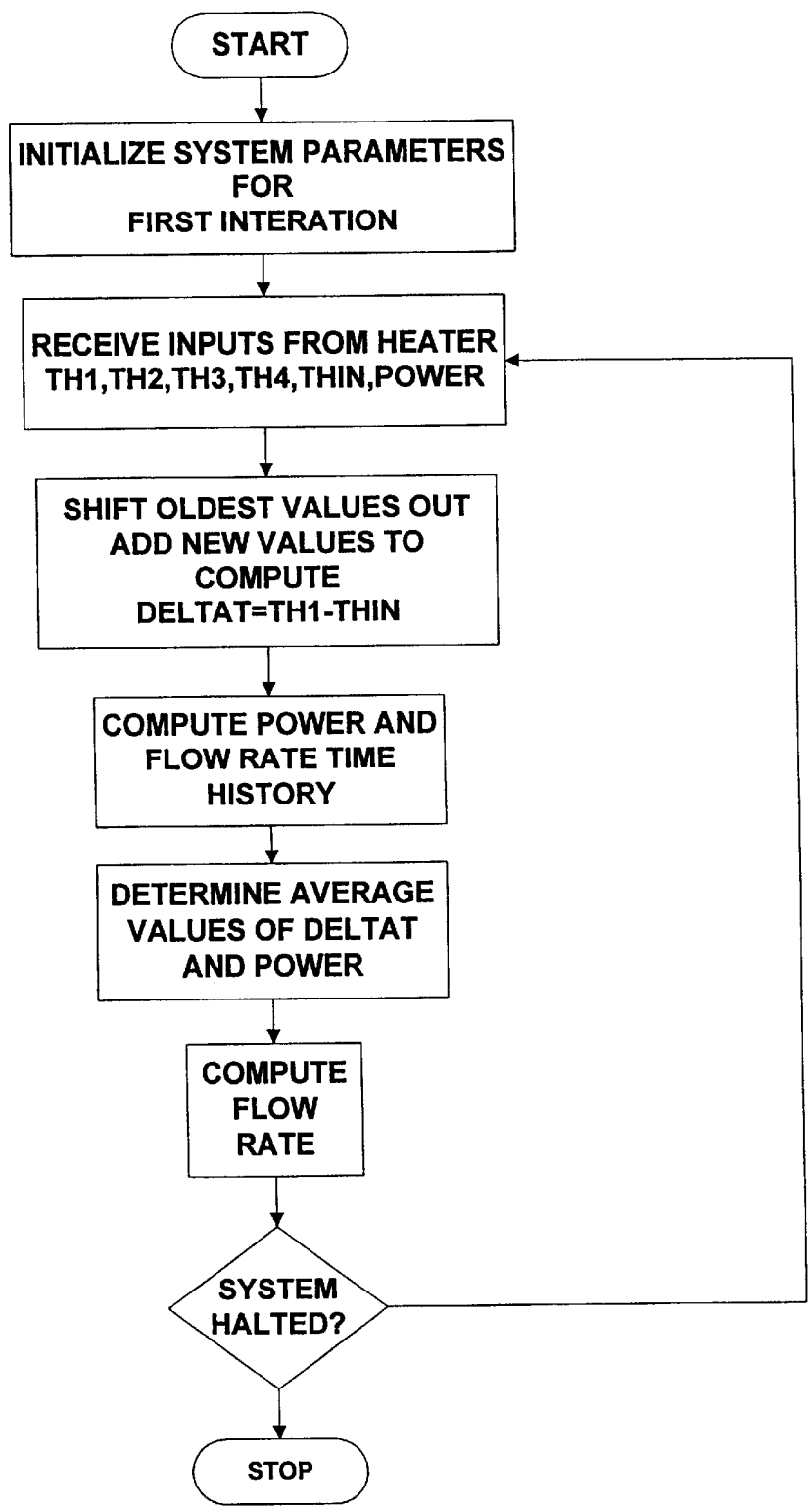
FIG. 32 is a schematic flow diagram of a flow computation program.

FIG. 32 is a flowchart that describes a method of detecting flow rate in a fluid heater using temperature and power data only. A method of indirectly measuring flow was developed by using temperature sensor and heater power data. This method relies on the ability to store a time history of temperature and power data and uses the basic relationship of heat transfer to compute the flow rate.

The thermodynamic equation that provides the basic relationship for the flow calculation is the relationship $$q = m\, c_p (t_2 - t_1)$$

where, q=thermal rating of the system (BTU/Hr)
m=mass flow rate (Lb/Hr)
cp=specific heat of water (1 BTU/Lb degrees. F.)
(t2−t1)=delta temperature (deg F.)

By rearranging terms in the equation and using conversion factors to get the appropriate units to cancel, the relationship can be expressed as follows:

$$\text{Flow rate (lbs/hr)} = \text{Average Heater Power (kW)} * 3.413 / \text{Delta Tavg};$$

where $T_{AVG}$ is the temperature difference based on values for T1 and $T_{in}$ as described herein above. $T_{Pin}$ corresponds to the inlet temperature of the fluid and was chosen for t1 in the equation for q because it is expected to exhibit a fairly stable value during operation of the heater. T1 was chosen for t2 in the equation for q because it is expected to provide the fastest response time in the system to input energy and can be better correlated to the inlet temperature than any of the downstream thermistors in a multi-chamber embodiment of the heater. The computation may involve storing a time history of the data for approximately 10 seconds of operation. An average of the temperature differences between t1 and t2 may be stored and a mean value may be used to smooth the computation over time. The power of the system may be also recorded for 20 seconds of operation.

The average power data may be indexed relative to the flow rate computation to correct for the relative heater response time. In other words, for slower fluid flow rates the earliest stored set of power data may be referenced for determining the mean power input, while for a faster flow rate more recent power data may be reference to determine the mean value of the power input. In this way, open-loop response times are typically accounted for in the system as follows: 0.5 seconds @ 3 g.p.m. (gallons per minute) graduated up to 10 seconds @ no flow. More precise delays can be measured for individual units and methods for adaptively adjusting this parameter may be used.

This flow computation method provides an iterative method for computing the precise flow through the fluid heater. The method is responsive to small changes in operating conditions and tends to be self stabilizing. However for sudden changes to operating conditions such as that exhibited during heater startup, shutdown, or other impulse type changes (e.g. going from low to high flow rates or visa versa) the flow rate computation described is inefficient in providing a quick response. For this reason, a two prioritized control bands were added to the control strategy and were established based on the outlet temperature measurement (T4) which has the highest priority and a secondary priority band placed on T1. Both may be used to respond immediately to the flow rate changes when there is drastic movement away from stable operation. The control band could be automatically adjusted depending on the region of operation. In certain flow situations it may be beneficial to widen the control band to allow for efficient calculation of the flow rate (especially at low flow) to prevent applying a disturbing control impulse if control of the fluid heater is based on flow rate. The longer the heater maintains a stable power level within the "safe" control bands, the better the system can converge and settle on the correct flow rate and self stabilize the heater operation.

Feed-forward heater temperature control optionally may be accomplished by using the computed flow rate to determine the heater power for optimal setpoint $T_{sp}$ adjustment. This adjustment of the heater power may use the following formula:

$$\text{Power (BTU/Hr)} = \text{Computed Flow Rate (Lb/hr)} * (T_{sp} - T_{in})$$

The power to apply may be converted from BTU/Hr to a kWatts value for control of power to the heating elements. One implementation uses cascaded IF tests to determine which of the three control signals are to be used by the water heater. Using a prioritized scheme, a high-gain proportional control method may be used to force a quick response to rapid changes in flow rate. An iterative control method may be used for optimizing the heater power during sustained steady-state fluid-heater operation. When both of the respective sensor indications are within their control band, the system uses its flow-rate computation to perform a feed-forward action. The iterative flow rate computation is refined as operation continues in time and will stabilize very rigidly on the desired setpoint with the system.

Improved heater robustness may be accomplished by utilizing additional sensors and a slightly different control criteria when input data indicates certain failure conditions (e.g. a failed thermistor or a heating element). The average temperature can provide a basis for evaluating failures in the heater and a program may incorporate strategies for stable control after a failure is diagnosed.

The present invention, therefore, is well adapted to carry out the objects and attain the ends and advantages mentioned, as well as others inherent therein. While the present invention has been depicted, described, and is defined by reference to particular preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A fluid heater powered by an alternating current (AC) electric power source, said heater comprising:

a housing having at least one chamber, said housing having a fluid inlet and a fluid outlet;

a plurality of electrically powered heating elements, each of said plurality of heating elements positioned within a respective one of said at least one chamber for heating a flowing fluid;

a power controller for controlling the connection of each of said plurality of heating elements to the AC power source such that each of said plurality of heating elements is connected for at least one half cycle of each of the plurality of power cycle patterns defining a power level, the plurality of power levels at which said plurality of heating elements operate are selected from the group consisting of 0/2x, 12.5/2x, 25/2x, 37.5/2x, 50/2x, 62.5/2x, 75/2x, 87.5/2x and 100/2x, wherein a numerator of each of these fractions represents the number of half cycles of an x Hz AC power source within one second during which said plurality of heating elements are powered, wherein the operation of each of said plurality of heating elements is sequentially timed to substantially reduce switching frequencies which otherwise would cause visually perceptible lighting flicker from the AC power source;

one or more fluid temperatures sensors each responsive to fluid temperature at a selected location within the at least one chamber; and a logic circuit for controlling a desired temperature of the flowing fluid from the fluid outlet, said logic circuit receiving temperature information from the one or more fluid temperature sensors and providing temperature information to said power controller.

2. The fluid heater according to claim 1, wherein a plurality of power levels at which said plurality of heating elements operate are selected from the group consisting of 0/120, 15/120, 30/120, 45/120, 60/120, 75/120, 90/120, 105/120 and 120/120, wherein a numerator of each of these fractions represents the number of half cycles of an AC power source within one second during which said plurality of heating elements are powered.

3. The fluid heater according to claim 2, wherein said plurality of heating elements are connected to the AC power source for generating desired fluid heating power levels by dithering between a smaller one and a larger one of said plurality of power levels such that an average power pattern generated by said plurality of heating elements over a period of time is substantially equal to a desired fluid heating power pattern.

4. The fluid heater according to claim 3, wherein said period of time is less than 15 seconds.

5. The fluid heater according to claim 4, wherein the smaller one of said plurality of power pattern is determined by dividing the desired fluid heating power pattern by twice the period of time and using the integer portion of the result thereof.

6. The fluid according to claim 5, wherein the larger one of said plurality of power patterns is the next larger one after the smaller one of said plurality of power patterns.

7. The fluid heater according to claim 1, wherein the said plurality of heating elements are connected to the AC power source for substantially the same number of even and odd half-cycles of said plurality of power cycle patterns, thereby minimizing a DC component in the AC power.

8. The fluid heater according to claim 7, wherein each of said plurality of power cycle patterns has four cycles.

9. The fluid heater according to claim 1, wherein said at least one chamber is an integer multiple of two chambers.

10. The fluid heater according to claim 9, wherein said at least one chamber is four chambers.

11. The fluid heater according to claim 1, wherein said at least one chamber is an integer multiple of three chambers.

12. The fluid heater according to claim 1, wherein said at least one chamber is at least two chambers each having at least one heating element positioned therein.

13. The fluid heater according to claim 1, wherein said at least one chamber is four chambers each having at least one heating element positioned therein.

14. The fluid heater according to claim 1, wherein said logic circuit receives a signal representing a temperature setpoint, and wherein said logic circuit sends a desired power pattern to said power controller which controls the connection of said plurality of heater element s such that the temperature of the heated fluid from the fluid outlet is maintained at substantially the setpoint temperature.

15. The fluid heater according to claim 14, wherein said one or more temperature sensors include a plurality of temperature sensors each located at one of the fluid inlet, the fluid outlet and the at least one chamber, said plurality of temperature sensors being connected to said logic circuit such that said logic circuit calculates a deviation from the setpoint temperature using temperature information from said plurality of temperature sensors.

16. A fluid heater powered by an alternating current (AC) electric power source, said heater comprising:

a housing having at least one chamber, said housing having a fluid inlet and a fluid outlet;

a plurality of electrically powered heating elements, each of said plurality of heating elements positioned within a respective one of said at least one chamber for heating a flowing fluid;

a power controller for controlling the connection of each of said plurality of heating elements to the AC power source such that each of said plurality of heating elements is connected for at least one half cycle of each of a plurality of power cycle groups, defining a power level wherein the connection of each of said plurality of heating elements is sequentially timed to substantially reduce switching frequencies which otherwise would cause visually perceptible lighting flicker from the AC power source;

a logic circuit for controlling a desired temperature of the flowing fluid from the fluid outlet, said logic circuit receiving temperature information from the one or more fluid temperature sensors and providing temperature information to said power controller;

said logic circuit calculates a deviation by determining a calculated setpoint and subtracting the sum of temperatures measured by said plurality of temperature sensors;

the calculated setpoint is equal to the sum of the integers from 1 to the number of chambers divided by the number of chambers times $T_{rise}$ plus $T_{in}$ times the number of chambers, where $T_{in}$ is the fluid inlet temperature, and $T_{rise}$ is the difference between the desired fluid outlet temperature and $T_{in}$;

the deviation is equal to the calculated setpoint minus the sum of the temperatures measured by said plurality of temperature sensors; and if the deviation is a positive value then said logic circuit causes said power controller to increase power to said plurality of heating elements, and if the deviation is a negative value then said logic circuit causes said power controller to decrease power to said plurality of heating elements.

17. A fluid heater powered by an alternating current (AC) electric power by source, said fluid heater comprising:

a housing having at least one chamber, said housing having a fluid inlet and a fluid outlet;

at least one electrically powered heating element positioned within said at least one chamber for heating a fluid flowing through said at least one chamber;

a fluid level detection and shutdown circuit including a fluid level electrode positioned in the upper portion of said at least one chamber in contact with the fluid, a capacitor having a first end connected to the fluid level electrode, a resistor having a first end connected to a capacitor second end, said resistor having a second end connected to a square wave frequency source of a higher frequency than the AC power source, and a voltage comparator having an input connected to the second end of the capacitor and the first end of the resistor, such that if a voltage at the comparator input is greater than a predetermined value because the fluid level electrode is in contact with the fluid than an output of the voltage comparator is at a first logic level, and if the voltage at the comparator input is lower than or equal to the predetermined value then the output of the voltage comparator is at a second logic level because said fluid level electrode is not in contact with the fluid, and a logic circuit for disconnecting said at least one heating element from the AC power source if the output of said voltage comparator is at an inconsistent logic level.

18. A fluid heater powered by an alternating current (AC) electric power source, said heater comprising:
    a housing having at least one chamber, said housing having a fluid inlet and a fluid outlet;
    at least one electrically powered heating element, said at least one heating element positioned within said at least one chamber for heating a flowing fluid;
    a power controller for controlling the connection of each of said plurality of heating elements to the AC power source such that each of said plurality of heating elements is connected for at least one half cycle of each of a plurality of heating elements is sequentially timed to substantially reduce switching frequencies which otherwise would cause visually perceptible lightening flicker from the AC power source;
    one ore more fluid temperature sensors each responsive to fluid temperature at a selected location within the at least one chamber;
    a logic circuit for controlling a desired temperature of the flowing fluid from the fluid outlet, said logic circuit receiving temperature information from the one or more fluid temperature sensors and providing temperature information to said power controller; and
    a fluid leak detection circuit for generating an alarm when fluid is detected outside of said at least one chamber, said fluid leak detection circuit including a fluid sensor located outside of and proximate to a lower portion of said at least one chamber, and a fluid sensor detection circuit connected to said fluid sensor.

19. The fluid heater according to claim 18, further comprising:
    a watchdog circuit for preventing the connection of said at least one heating element to the AC power source if said logic circuit operates improperly, said watchdog circuit including a timing circuit having an input connected to said logic circuit and an output connected so as to control said at least one heating element when said timing circuit output is at a first logic level and turning off said at least one element when at a second logic level, using a capacitor connected between said timing circuit input and a heartbeat output from said logic circuit, wherein if there is a stream of pulses from said heartbeat output then said watchdog circuit output is at the first logic level, and if there is not a continuous stream of pulses from said heartbeat output then said watchdog circuit output is at the second logic level.

20. The fluid heater according to claim 18, further comprising:
    a low power standby circuit, including at least one upper temperature sensor positioned in an upper portion of said at least one chamber, and at least one lower temperature sensor positioned in a lower portion of said at least one chamber such that low power is applied to said at least one heating element so as to create a thermocline to indicate when there is fluid flow in said at least one chamber, said at least one upper temperature sensor and said at least one lower temperature sensor indicating flow or no flow, whereby said logic circuit and said power controller control heating power to said at least one heating element.

21. A heating system using a circulating heated fluid, said heating system comprising:
    a closed loop piping system running through an area to be heated, said closed loop piping system having heated fluid flowing therethrough;
    a circulation pump for pumping the heated fluid through the closed loop piping system; and
    a fluid heater powered by an alternating current (AC) electric power source, said heater including a housing having at least one chamber, said housing having a fluid inlet and a fluid outlet, at least one electrically powered heating element, said at least one heating element positioned within a respective one of said at least one chamber and adapted for heating the flowing fluid, a power controller adapted for controlling the connection of said at least one heating element to the AC power source such that each of said at least one heating element is connected for at least one half cycle of each of a plurality of power cycle groups, wherein the connection of said at least one heating element is sequentially timed so as to substantially reduce switching frequencies which otherwise would cause visually perceptible lighting flicker from the AC power source, and
    a logic circuit for controlling a desired temperature of the flowing fluid, said logic circuit connected to and sending temperature control information to said power controller.

22. The heating system according to claim 21 wherein the temperature of said flowing fluid is controllable by its usage.

23. A fluid heater powered by an alternating current (AC) electric power source, said heater comprising:
    a housing having an integer multiple of three chambers, said housing having a fluid inlet and a fluid outlet;
    a plurality of electrically powered heating elements, each of said plurality of heating elements positioned within a respective one of said at least one chamber for heating a flowing fluid;
    a power controller for controlling the connection of each of said plurality of heating elements to the AC power source such that each of said plurality of heating elements is connected for at least one half cycle of each of the plurality of power cycle patterns defining a power level wherein the operation of each of said plurality of heating elements is sequentially timed to substantially reduce switching frequencies which otherwise would cause visually perceptible lighting flicker from the AC power source;
    one or more fluid temperatures sensors each responsive to fluid temperature at a selected location within the at least one chamber; and
    a logic circuit for controlling a desired temperature of the flowing fluid from the fluid outlet, said logic circuit receiving temperature information from the one or more fluid temperature sensors and providing temperature information to said power controller.

24. The fluid heater according to claim 23, wherein a plurality of power levels at which said plurality of heating elements operate are selected from the group consisting of 0/120, 15/120, 30/120, 45/120, 60/120, 75/120, 90/120, 105/120 and 120/120, wherein a numerator of each of these fractions represents the number of half cycles of an AC power source within one second during which said plurality of heating elements are powered.

25. The fluid heater according to claim 23, wherein said plurality of heating elements are connected to the AC power source for substantially the same number of even and odd half-cycles of said plurality of power cycle patterns, thereby minimizing a DC component in the AC power.

26. The fluid heater according to claim 23, wherein said at least one chamber is an integer multiple of two chambers.

27. A fluid heater powered by an alternating current (AC) electric power source, said heater comprising:

a housing having at least one chamber, said housing having a fluid inlet and a fluid outlet;

a plurality of electrically powered heating elements, each of said plurality of heating elements positioned within a respective one of said at least one chamber for heating a flowing fluid;

a power controller for controlling the connection of each of said plurality of heating elements to the AC power source such that each of said plurality of heating elements is connected for at least one half cycle of each of the plurality of power cycle patterns defining a power level wherein the operation of each of said plurality of heating elements is sequentially timed to substantially reduce switching frequencies which otherwise would cause visually perceptible lighting flicker from the AC power source;

one or more fluid temperatures sensors each responsive to fluid temperature at a selected location within the at least one chamber;

a logic circuit for controlling a desired temperature of the flowing fluid from the fluid outlet, said logic circuit receiving temperature information from the one or more fluid temperature sensors and providing temperature information to said power controller; and said logic circuit receives a signal representing a temperature setpoint, and wherein said logic circuit sends a desired power pattern to said power controller which controls the connection of said plurality of heater elements such that the temperature of the heated fluid from the fluid outlet is maintained at substantially the setpoint temperature.

28. The fluid heater according to claim 27, wherein a plurality of power levels at which said plurality of heating elements operate are selected from the group consisting of 0/120, 15/120, 30/120, 45/120, 60/120, 75/120, 90/120, 105/120 and 120/120, wherein a numerator of each of these fractions represents the number of half cycles of an AC power source within one second during which said plurality of heating elements are powered.

29. The fluid heater according to claim 27, wherein said plurality of heating elements are connected to the AC power source for substantially the same number of even and odd half-cycles of said plurality of power cycle groups, thereby minimizing a DC component in the AC power.

* * * * *